US012619582B1

(12) United States Patent
Rothschilds et al.

(10) Patent No.: US 12,619,582 B1
(45) Date of Patent: May 5, 2026

(54) MANAGING FILE SYSTEM TRANSACTION DEPENDENCIES

(71) Applicant: Qumulo, Inc., Seattle, WA (US)

(72) Inventors: Thomas Gregory Rothschilds, Seattle, WA (US); Graham Edwin Ellis, Seattle, WA (US); Aaron James Passey, San Rafael, CA (US)

(73) Assignee: Qumulo, Inc., Seattle, WA (US)

( * ) Notice: Subject to any disclaimer, the term of this patent is extended or adjusted under 35 U.S.C. 154(b) by 0 days.

(21) Appl. No.: 19/406,733

(22) Filed: Dec. 2, 2025

(51) Int. Cl.
*G06F 16/18* (2019.01)

(52) U.S. Cl.
CPC ...... *G06F 16/1865* (2019.01); *G06F 16/1858* (2019.01)

(58) Field of Classification Search
CPC .......................... G06F 16/1865; G06F 16/1858
See application file for complete search history.

(56) References Cited

U.S. PATENT DOCUMENTS

| | | |
|---|---|---|
| 5,165,031 A | 11/1992 | Pruul et al. |
| 5,283,875 A | 2/1994 | Gibson et al. |
| 5,319,773 A | 6/1994 | Britton et al. |
| 5,410,684 A | 4/1995 | Ainsworth et al. |
| 5,410,719 A | 4/1995 | Shackleford |
| 5,442,561 A | 8/1995 | Yoshizawa et al. |
| 5,953,719 A | 9/1999 | Kleewein et al. |

| | | |
|---|---|---|
| 6,049,809 A | 4/2000 | Raman et al. |
| 6,236,996 B1 | 5/2001 | Bapat et al. |
| 6,385,641 B1 | 5/2002 | Jiang et al. |

(Continued)

FOREIGN PATENT DOCUMENTS

| | | |
|---|---|---|
| CN | 116647491 A | 8/2023 |
| EP | 1217551 A2 | 6/2002 |

(Continued)

OTHER PUBLICATIONS

Office Communication for U.S. Appl. No. 19/048,348 mailed Dec. 31, 2025, 26 Pages.

(Continued)

*Primary Examiner* — Jensen Hu
(74) *Attorney, Agent, or Firm* — John W. Branch; Branch Partners PLLC

(57) ABSTRACT

Embodiments manage file system transaction dependencies in distributed file systems. A transaction log containing log entries is obtained, where each log entry represents a transaction with file system operations, execution times, and associated inodes. Dependency graphs are constructed based on shared inode references between log entries. Each inode stores the last modified transaction log key, which serves as a root into the dependency graph of all dependent transactions. Depth-first search traversal identifies leaf log entries ready for application. These leaf entries are communicated to target file systems for replay. Independent subgraphs are identified and processed in parallel to maximize throughput. In-flight windows with bounded capacity prevent deadlock conditions by ensuring dependencies fit within available buffer space. Log entries from multiple subgraphs may be combined into single communication messages to optimize network efficiency across geographically distributed file system infrastructure.

20 Claims, 18 Drawing Sheets

(56) References Cited

U.S. PATENT DOCUMENTS

| | | |
|---|---|---|
| 6,415,283 B1 | 7/2002 | Conklin |
| 6,496,944 B1 | 12/2002 | Hsiao et al. |
| 6,529,998 B1 | 3/2003 | Yochai et al. |
| 6,560,615 B1 | 5/2003 | Zayas et al. |
| 6,772,435 B1 | 8/2004 | Thexton et al. |
| 6,874,130 B1 | 3/2005 | Baweja et al. |
| 6,892,211 B2 | 5/2005 | Hitz et al. |
| 6,965,903 B1 | 11/2005 | Agarwal et al. |
| 6,965,936 B1 | 11/2005 | Wipfel et al. |
| 7,072,911 B1 | 7/2006 | Doman et al. |
| 7,165,158 B1 | 1/2007 | Yagawa |
| 7,213,040 B1 | 5/2007 | Stokes et al. |
| 7,330,948 B2 | 2/2008 | Deguchi et al. |
| 7,467,333 B2 | 12/2008 | Keeton et al. |
| 7,594,138 B2 | 9/2009 | Abdulvahid |
| 7,636,743 B2 | 12/2009 | Erofeev |
| 7,693,876 B2 | 4/2010 | Hackworth et al. |
| 7,757,056 B1 | 7/2010 | Fair |
| 7,761,456 B1 | 7/2010 | Cram et al. |
| 7,844,580 B2 | 11/2010 | Srivastava et al. |
| 7,933,870 B1 | 4/2011 | Webster |
| 7,937,421 B2 | 5/2011 | Mikesell et al. |
| 7,956,293 B2 | 6/2011 | Echigo et al. |
| 7,958,304 B1 | 6/2011 | Goel et al. |
| 7,962,709 B2 | 6/2011 | Agrawal |
| 7,966,293 B1 | 6/2011 | Owara et al. |
| 8,027,827 B2 | 9/2011 | Bitar et al. |
| 8,046,378 B1 | 10/2011 | Zhuge et al. |
| 8,108,429 B2 | 1/2012 | Sim-Tang et al. |
| 8,296,312 B1 | 10/2012 | Leung et al. |
| 8,341,540 B1 | 12/2012 | Haynes et al. |
| 8,353,044 B1 | 1/2013 | Jones et al. |
| 8,355,407 B2 | 1/2013 | Wookey et al. |
| 8,364,648 B1 | 1/2013 | Sim-Tang |
| 8,423,733 B1 | 4/2013 | Ozdemir |
| 8,423,821 B1 | 4/2013 | Keith, Jr. |
| 8,448,170 B2 | 5/2013 | Wipfel et al. |
| 8,463,825 B1 | 6/2013 | Harty et al. |
| 8,489,656 B2 | 7/2013 | Erofeev |
| 8,504,733 B1 | 8/2013 | Iyer et al. |
| 8,515,911 B1 | 8/2013 | Zhou et al. |
| 8,612,404 B2 | 12/2013 | Bone et al. |
| 8,612,488 B1 | 12/2013 | Subramanya et al. |
| 8,645,323 B2 | 2/2014 | Jackiewicz et al. |
| 8,661,447 B1 | 2/2014 | Olliff et al. |
| 8,725,691 B1 | 5/2014 | Natanzon |
| 8,776,050 B2 | 7/2014 | Plouffe et al. |
| 8,782,655 B2 | 7/2014 | Blanding et al. |
| 8,805,786 B1 | 8/2014 | Natanzon |
| 8,806,154 B1 | 8/2014 | Gupta et al. |
| 8,838,887 B1 | 9/2014 | Burke et al. |
| 8,838,931 B1 | 9/2014 | Marshak et al. |
| 8,849,754 B2 | 9/2014 | Craggs |
| 8,849,764 B1 | 9/2014 | Long et al. |
| 8,849,809 B1 | 9/2014 | Seshadri |
| 8,868,797 B1 | 10/2014 | Kirac et al. |
| 8,924,364 B1 | 12/2014 | Zhong et al. |
| 8,972,694 B1 | 3/2015 | Dolan et al. |
| 9,015,214 B2 | 4/2015 | Nishida et al. |
| 9,026,765 B1 | 5/2015 | Marshak et al. |
| 9,031,994 B1 | 5/2015 | Cao et al. |
| 9,032,170 B2 | 5/2015 | Vaghani et al. |
| 9,047,017 B1 | 6/2015 | Dolan et al. |
| 9,141,633 B1 | 9/2015 | Li et al. |
| 9,143,379 B1 | 9/2015 | Berger et al. |
| 9,158,653 B2 | 10/2015 | Gold |
| 9,171,145 B2 | 10/2015 | Dash et al. |
| 9,244,975 B2 | 1/2016 | Das et al. |
| 9,244,976 B1 | 1/2016 | Zhang et al. |
| 9,361,187 B2 | 6/2016 | Jarvis |
| 9,384,252 B2 | 7/2016 | Akirav et al. |
| 9,396,202 B1 | 7/2016 | Drobychev et al. |
| 9,459,804 B1 | 10/2016 | Natanzon et al. |
| 9,501,487 B1 | 11/2016 | Yuan et al. |
| 9,519,664 B1 | 12/2016 | Kharatishvili et al. |
| 9,547,560 B1 | 1/2017 | Lee |
| 9,600,193 B2 | 3/2017 | Ahrens et al. |
| 9,613,120 B1 | 4/2017 | Kharatishvili et al. |
| 9,727,432 B1 | 8/2017 | Cutforth et al. |
| 9,747,171 B2 | 8/2017 | Beeken et al. |
| 9,753,782 B2 | 9/2017 | Fang et al. |
| 9,753,932 B1 | 9/2017 | Brow et al. |
| 9,753,987 B1 | 9/2017 | Dolan et al. |
| 9,785,377 B2 | 10/2017 | Shin et al. |
| 9,836,480 B2 | 12/2017 | Okun et al. |
| 9,846,698 B1 | 12/2017 | Panidis et al. |
| 10,073,856 B1 | 9/2018 | Cooper et al. |
| 10,095,708 B2 | 10/2018 | Passey et al. |
| 10,095,709 B2 | 10/2018 | Okun et al. |
| 10,095,729 B2 | 10/2018 | Taron et al. |
| 10,140,185 B1 | 11/2018 | Lopez et al. |
| 10,162,980 B1 | 12/2018 | Bernotavicius et al. |
| 10,261,868 B2 | 4/2019 | Brown et al. |
| 10,275,493 B1 | 4/2019 | Mostak |
| 10,303,561 B2 | 5/2019 | Beeken et al. |
| 10,318,401 B2 | 6/2019 | Rothschilds et al. |
| 10,318,494 B2 | 6/2019 | Krasnow et al. |
| 10,339,101 B1 | 7/2019 | Gupta |
| 10,346,355 B2 | 7/2019 | Godman |
| 10,387,810 B1 | 8/2019 | Kalush et al. |
| 10,409,784 B1 | 9/2019 | Krasnow et al. |
| 10,423,609 B1 | 9/2019 | Strauss |
| 10,437,509 B1 | 10/2019 | Alexeev et al. |
| 10,447,779 B2 | 10/2019 | Dieterich et al. |
| 10,459,884 B1 | 10/2019 | Godman |
| 10,459,892 B2 | 10/2019 | Godman et al. |
| 10,460,122 B1 | 10/2019 | Kirby et al. |
| 10,474,635 B1 | 11/2019 | Unger et al. |
| 10,534,758 B1 | 1/2020 | Carpenter et al. |
| 10,540,662 B2 | 1/2020 | Barlett et al. |
| 10,545,986 B2 | 1/2020 | Tappan et al. |
| 10,552,373 B2 | 2/2020 | Brow et al. |
| 10,606,812 B2 | 3/2020 | Cooper et al. |
| 10,614,033 B1 | 4/2020 | Rothschilds et al. |
| 10,614,241 B1 | 4/2020 | Kirby et al. |
| 10,621,057 B2 | 4/2020 | Tripathi et al. |
| 10,621,147 B1 | 4/2020 | Liang et al. |
| 10,628,391 B1 | 4/2020 | Bent et al. |
| 10,664,408 B2 | 5/2020 | Chatterjee et al. |
| 10,678,663 B1 | 6/2020 | Sharma et al. |
| 10,678,671 B2 | 6/2020 | Rothschilds et al. |
| 10,725,977 B1 | 7/2020 | Chmiel et al. |
| 10,795,796 B1 | 10/2020 | Bai et al. |
| 10,860,372 B1 | 12/2020 | Bai et al. |
| 10,860,414 B1 | 12/2020 | Urban et al. |
| 10,860,546 B2 | 12/2020 | Ye et al. |
| 10,860,547 B2 | 12/2020 | Passey et al. |
| 10,877,942 B2 | 12/2020 | Okun et al. |
| 10,936,538 B1 | 3/2021 | Unger et al. |
| 10,936,551 B1 | 3/2021 | Unger et al. |
| 10,938,650 B1 | 3/2021 | Hermoni et al. |
| 10,938,661 B1 | 3/2021 | Pignataro et al. |
| 11,023,535 B1 | 6/2021 | Greenwood et al. |
| 11,132,126 B1 | 9/2021 | Chmiel et al. |
| 11,132,336 B2 | 9/2021 | Passey et al. |
| 11,150,823 B2 | 10/2021 | Gao et al. |
| 11,151,001 B2 | 10/2021 | Su et al. |
| 11,151,092 B2 | 10/2021 | Chmiel et al. |
| 11,157,458 B1 | 10/2021 | Carter et al. |
| 11,249,907 B1 | 2/2022 | Brewer |
| 11,256,682 B2 | 2/2022 | Taron et al. |
| 11,265,262 B1 | 3/2022 | Makie et al. |
| 11,290,425 B2 | 3/2022 | Newell et al. |
| 11,294,604 B1 | 4/2022 | McMullan et al. |
| 11,294,718 B2 | 4/2022 | Bai et al. |
| 11,347,699 B2 | 5/2022 | Carpenter et al. |
| 11,354,273 B1 | 6/2022 | O'Neill et al. |
| 11,360,936 B2 | 6/2022 | Haber et al. |
| 11,372,735 B2 | 6/2022 | Su et al. |
| 11,372,819 B1 | 6/2022 | Carter et al. |
| 11,435,901 B1 | 9/2022 | Chmiel et al. |
| 11,461,241 B2 | 10/2022 | Carpenter et al. |
| 11,461,286 B2 | 10/2022 | Godman et al. |
| 11,567,660 B2 | 1/2023 | Chmiel et al. |

(56)                References Cited

U.S. PATENT DOCUMENTS

| | | |
|---|---|---|
| 11,599,508 B1 | 3/2023 | Harward et al. |
| 11,630,832 B2 | 4/2023 | Choi et al. |
| 11,669,255 B2 | 6/2023 | Hansen et al. |
| 11,722,150 B1 | 8/2023 | Fachan et al. |
| 11,729,269 B1 | 8/2023 | Meernik et al. |
| 11,734,147 B2 | 8/2023 | Bai et al. |
| 11,775,481 B2 | 10/2023 | Unger et al. |
| 11,921,677 B1 * | 3/2024 | Kirby .................. G06F 16/1734 |
| 11,934,660 B1 | 3/2024 | McMullan et al. |
| 11,966,592 B1 | 4/2024 | Bai |
| 12,019,875 B1 | 6/2024 | McMullan et al. |
| 12,038,877 B1 | 7/2024 | Kirby et al. |
| 12,222,903 B1 * | 2/2025 | Rothschilds ........ G06F 16/1774 |
| 12,292,853 B1 | 5/2025 | Ellis et al. |
| 12,346,290 B2 | 7/2025 | Haber et al. |
| 12,443,559 B2 | 10/2025 | Ellis et al. |
| 12,443,568 B1 | 10/2025 | Bhageshpur et al. |
| 12,481,625 B1 | 11/2025 | Bhageshpur et al. |
| 2001/0039622 A1 | 11/2001 | Hitz et al. |
| 2002/0059439 A1 | 5/2002 | Arroyo et al. |
| 2002/0065835 A1 | 5/2002 | Fujisaki |
| 2002/0083073 A1 | 6/2002 | Vaidya et al. |
| 2002/0099691 A1 | 7/2002 | Lore et al. |
| 2002/0178271 A1 | 11/2002 | Graham et al. |
| 2003/0033308 A1 | 2/2003 | Patel et al. |
| 2003/0145009 A1 | 7/2003 | Forman et al. |
| 2003/0177379 A1 | 9/2003 | Hori et al. |
| 2003/0182313 A1 | 9/2003 | Federwisch et al. |
| 2004/0030727 A1 | 2/2004 | Armangau et al. |
| 2004/0093474 A1 | 5/2004 | Lin et al. |
| 2004/0098425 A1 | 5/2004 | Wiss et al. |
| 2004/0153479 A1 | 8/2004 | Mikesell et al. |
| 2004/0255048 A1 | 12/2004 | Lev Ran et al. |
| 2005/0015674 A1 | 1/2005 | Haugh |
| 2005/0027748 A1 | 2/2005 | Kisley |
| 2005/0065986 A1 | 3/2005 | Bixby et al. |
| 2005/0091663 A1 | 4/2005 | Bagsby |
| 2005/0114593 A1 | 5/2005 | Cassell et al. |
| 2005/0114726 A1 | 5/2005 | Ouchi |
| 2005/0119996 A1 | 6/2005 | Ohata et al. |
| 2005/0154866 A1 | 7/2005 | Steely, Jr. et al. |
| 2005/0182992 A1 | 8/2005 | Land et al. |
| 2005/0187992 A1 | 8/2005 | Prahlad et al. |
| 2005/0195660 A1 | 9/2005 | Kavuri et al. |
| 2005/0223019 A1 | 10/2005 | Das et al. |
| 2006/0004890 A1 | 1/2006 | Semple et al. |
| 2006/0053139 A1 | 3/2006 | Marzinski et al. |
| 2006/0089982 A1 | 4/2006 | Abbott et al. |
| 2006/0090036 A1 | 4/2006 | Zohar et al. |
| 2006/0123005 A1 | 6/2006 | Burnett et al. |
| 2006/0173842 A1 | 8/2006 | Horvitz et al. |
| 2006/0271604 A1 | 11/2006 | Shoens |
| 2007/0005297 A1 | 1/2007 | Beresniewicz et al. |
| 2007/0011302 A1 | 1/2007 | Groner et al. |
| 2007/0027985 A1 | 2/2007 | Ramany et al. |
| 2007/0061783 A1 | 3/2007 | Prakash |
| 2007/0100855 A1 | 5/2007 | T. Kohl |
| 2007/0106706 A1 | 5/2007 | Ahrens et al. |
| 2007/0118561 A1 | 5/2007 | Idicula et al. |
| 2007/0143371 A1 | 6/2007 | Kottomtharayil et al. |
| 2008/0028006 A1 | 1/2008 | Liu et al. |
| 2008/0059399 A1 | 3/2008 | Delorme et al. |
| 2008/0059541 A1 | 3/2008 | Fachan et al. |
| 2008/0082593 A1 | 4/2008 | Komarov et al. |
| 2008/0162608 A1 | 7/2008 | Torii et al. |
| 2008/0172366 A1 | 7/2008 | Hannel et al. |
| 2008/0228772 A1 | 9/2008 | Plamondon |
| 2008/0250357 A1 | 10/2008 | Lee et al. |
| 2008/0256474 A1 | 10/2008 | Chakra et al. |
| 2008/0270469 A1 | 10/2008 | Myerson et al. |
| 2008/0270928 A1 | 10/2008 | Chakra et al. |
| 2008/0282244 A1 | 11/2008 | Wu et al. |
| 2008/0288306 A1 | 11/2008 | MacIntyre et al. |
| 2008/0301256 A1 | 12/2008 | McWilliams et al. |
| 2008/0313217 A1 | 12/2008 | Dunsmore et al. |
| 2009/0077087 A1 | 3/2009 | Urano et al. |
| 2009/0138500 A1 | 5/2009 | Yuan et al. |
| 2009/0199190 A1 | 8/2009 | Chen et al. |
| 2009/0222509 A1 | 9/2009 | King et al. |
| 2009/0240539 A1 | 9/2009 | Slawson et al. |
| 2009/0274047 A1 | 11/2009 | Kruys et al. |
| 2009/0319566 A1 | 12/2009 | Wald et al. |
| 2009/0327642 A1 | 12/2009 | Ogihara et al. |
| 2010/0030825 A1 | 2/2010 | Matsuzawa et al. |
| 2010/0036895 A1 | 2/2010 | Boyd et al. |
| 2010/0088317 A1 | 4/2010 | Bone et al. |
| 2010/0161557 A1 | 6/2010 | Anderson et al. |
| 2010/0179959 A1 | 7/2010 | Shoens |
| 2010/0217948 A1 | 8/2010 | Mason et al. |
| 2010/0241668 A1 | 9/2010 | Susanto et al. |
| 2010/0281214 A1 | 11/2010 | Jernigan, IV |
| 2010/0287512 A1 | 11/2010 | Gan et al. |
| 2011/0004914 A1 | 1/2011 | Ennis et al. |
| 2011/0039622 A1 | 2/2011 | Levenson |
| 2011/0066668 A1 | 3/2011 | Guarraci |
| 2011/0082836 A1 | 4/2011 | Wang et al. |
| 2011/0125799 A1 | 5/2011 | Kandasamy et al. |
| 2011/0125973 A1 | 5/2011 | Lev et al. |
| 2011/0153560 A1 | 6/2011 | Bryant et al. |
| 2011/0161381 A1 | 6/2011 | Wang et al. |
| 2011/0161964 A1 | 6/2011 | Piazza et al. |
| 2011/0196833 A1 | 8/2011 | Drobychev et al. |
| 2011/0196899 A1 | 8/2011 | Hughes et al. |
| 2011/0202925 A1 | 8/2011 | Banerjee et al. |
| 2011/0246724 A1 | 10/2011 | Marathe et al. |
| 2011/0302357 A1 | 12/2011 | Sullivan |
| 2012/0036463 A1 | 2/2012 | Krakovsky et al. |
| 2012/0066179 A1 | 3/2012 | Saika |
| 2012/0096059 A1 | 4/2012 | Shimizu et al. |
| 2012/0116478 A1 | 5/2012 | Buhlmann et al. |
| 2012/0136843 A1 | 5/2012 | Bone et al. |
| 2012/0151438 A1 | 6/2012 | Bach et al. |
| 2012/0166478 A1 | 6/2012 | Das et al. |
| 2012/0179886 A1 | 7/2012 | Prahlad et al. |
| 2012/0204060 A1 | 8/2012 | Swift et al. |
| 2012/0216005 A1 | 8/2012 | Naito et al. |
| 2012/0317079 A1 | 12/2012 | Shoens et al. |
| 2013/0019072 A1 | 1/2013 | Strasser et al. |
| 2013/0024609 A1 | 1/2013 | Gorobets et al. |
| 2013/0031232 A1 | 1/2013 | Clymer et al. |
| 2013/0073819 A1 | 3/2013 | Havewala et al. |
| 2013/0086121 A1 | 4/2013 | Preslan |
| 2013/0091168 A1 | 4/2013 | Bhave et al. |
| 2013/0103778 A1 | 4/2013 | Hayashi et al. |
| 2013/0110787 A1 | 5/2013 | Garimella et al. |
| 2013/0145471 A1 | 6/2013 | Richard et al. |
| 2013/0191355 A1 | 7/2013 | Bone et al. |
| 2013/0212579 A1 | 8/2013 | Ben-Shaul et al. |
| 2013/0227236 A1 | 8/2013 | Flynn et al. |
| 2013/0254163 A1 | 9/2013 | Savage et al. |
| 2013/0268650 A1 | 10/2013 | Faitelson et al. |
| 2013/0275391 A1 | 10/2013 | Batwara et al. |
| 2013/0304903 A1 | 11/2013 | Mick et al. |
| 2013/0310726 A1 | 11/2013 | Miller et al. |
| 2013/0311454 A1 | 11/2013 | Ezzat |
| 2013/0318194 A1 | 11/2013 | Timbs |
| 2013/0325806 A1 | 12/2013 | Bachar et al. |
| 2013/0325808 A1 | 12/2013 | Bachar et al. |
| 2013/0339406 A1 | 12/2013 | Kanfi |
| 2014/0006354 A1 | 1/2014 | Parkison et al. |
| 2014/0040199 A1 | 2/2014 | Golab et al. |
| 2014/0040693 A1 | 2/2014 | Kim et al. |
| 2014/0059158 A1 | 2/2014 | Chen et al. |
| 2014/0089278 A1 | 3/2014 | Lovinger et al. |
| 2014/0089649 A1 | 3/2014 | Chaganti |
| 2014/0095249 A1 | 4/2014 | Tarakad et al. |
| 2014/0095505 A1 | 4/2014 | Blanchflower et al. |
| 2014/0095560 A1 | 4/2014 | Ikai et al. |
| 2014/0095582 A1 | 4/2014 | Eshel et al. |
| 2014/0101389 A1 | 4/2014 | Nellans et al. |
| 2014/0156956 A1 | 6/2014 | Ezra |
| 2014/0181441 A1 | 6/2014 | Kottomtharayil et al. |
| 2014/0189257 A1 | 7/2014 | Aritome |
| 2014/0189267 A1 | 7/2014 | Qi et al. |

(56)                References Cited

U.S. PATENT DOCUMENTS

| | | | |
|---|---|---|---|
| 2014/0195847 A1 | 7/2014 | Webman et al. | |
| 2014/0237193 A1 | 8/2014 | Shivashankaraiah | |
| 2014/0258609 A1 | 9/2014 | Cui et al. | |
| 2014/0258657 A1 | 9/2014 | Schott et al. | |
| 2014/0280485 A1 | 9/2014 | A Hummaida et al. | |
| 2014/0280889 A1 | 9/2014 | Nispel et al. | |
| 2014/0281307 A1 | 9/2014 | Peterson et al. | |
| 2014/0281411 A1 | 9/2014 | Abdallah | |
| 2014/0344222 A1 | 11/2014 | Morris et al. | |
| 2014/0358356 A1 | 12/2014 | Jones et al. | |
| 2014/0372384 A1 | 12/2014 | Long et al. | |
| 2014/0372607 A1 | 12/2014 | Gladwin et al. | |
| 2014/0373032 A1 | 12/2014 | Merry et al. | |
| 2015/0006226 A1 | 1/2015 | Smith et al. | |
| 2015/0012656 A1 | 1/2015 | Phillips et al. | |
| 2015/0012666 A1 | 1/2015 | Pannese et al. | |
| 2015/0067086 A1 | 3/2015 | Adriaens et al. | |
| 2015/0067142 A1 | 3/2015 | Renkema | |
| 2015/0106145 A1 | 4/2015 | Hamilton et al. | |
| 2015/0135331 A1 | 5/2015 | Das | |
| 2015/0143026 A1 | 5/2015 | Reddy et al. | |
| 2015/0149736 A1 | 5/2015 | Kwon et al. | |
| 2015/0186217 A1 | 7/2015 | Eslami Sarab | |
| 2015/0186410 A1 | 7/2015 | Petculescu et al. | |
| 2015/0186483 A1 | 7/2015 | Tappan et al. | |
| 2015/0186527 A1 | 7/2015 | Rao et al. | |
| 2015/0186529 A1 | 7/2015 | Rope et al. | |
| 2015/0193317 A1 | 7/2015 | Firley | |
| 2015/0193347 A1 | 7/2015 | Kluesing et al. | |
| 2015/0215405 A1 | 7/2015 | Baek et al. | |
| 2015/0234716 A1 | 8/2015 | Brooker et al. | |
| 2015/0234879 A1 | 8/2015 | Baldwin et al. | |
| 2015/0242263 A1 | 8/2015 | Klose | |
| 2015/0248253 A1 | 9/2015 | Kim et al. | |
| 2015/0269203 A1 | 9/2015 | Baldwin et al. | |
| 2015/0278282 A1 | 10/2015 | Sardina et al. | |
| 2015/0278329 A1 | 10/2015 | Hrle et al. | |
| 2015/0310034 A1 | 10/2015 | Godman et al. | |
| 2015/0310035 A1 | 10/2015 | Godman et al. | |
| 2015/0310054 A1 | 10/2015 | Passey et al. | |
| 2015/0347126 A1 | 12/2015 | Tibble et al. | |
| 2016/0034356 A1 | 2/2016 | Aron et al. | |
| 2016/0034481 A1 | 2/2016 | Kumarasamy et al. | |
| 2016/0071233 A1 | 3/2016 | Macko et al. | |
| 2016/0110105 A1 | 4/2016 | Karamcheti et al. | |
| 2016/0139836 A1 | 5/2016 | Nallathambi et al. | |
| 2016/0139952 A1 | 5/2016 | Geng et al. | |
| 2016/0147654 A1 | 5/2016 | Zhao et al. | |
| 2016/0164916 A1 | 6/2016 | Satish et al. | |
| 2016/0224430 A1 | 8/2016 | Long et al. | |
| 2016/0239185 A1 | 8/2016 | Balimidi et al. | |
| 2016/0246816 A1 | 8/2016 | Abiri et al. | |
| 2016/0269501 A1 | 9/2016 | Usgaonkar et al. | |
| 2016/0292013 A1 | 10/2016 | Li et al. | |
| 2016/0292429 A1 | 10/2016 | Manville et al. | |
| 2016/0306810 A1 | 10/2016 | Ni et al. | |
| 2016/0314046 A1 | 10/2016 | Kumarasamy | |
| 2016/0335278 A1 | 11/2016 | Tabaaloute et al. | |
| 2016/0350363 A1 | 12/2016 | Raja et al. | |
| 2016/0357677 A1 | 12/2016 | Hooker et al. | |
| 2016/0359859 A1 | 12/2016 | Capone | |
| 2016/0371296 A1 | 12/2016 | Passey et al. | |
| 2016/0371297 A1* | 12/2016 | Okun .................. G06F 16/185 | |
| 2016/0380878 A1 | 12/2016 | Bugenhagen et al. | |
| 2016/0380913 A1 | 12/2016 | Morgan et al. | |
| 2017/0024152 A1 | 1/2017 | Bhagi et al. | |
| 2017/0032006 A1 | 2/2017 | Anglin et al. | |
| 2017/0046143 A1 | 2/2017 | Kochhar et al. | |
| 2017/0052898 A1 | 2/2017 | Ash et al. | |
| 2017/0078164 A1 | 3/2017 | Hildebrand et al. | |
| 2017/0091046 A1 | 3/2017 | Bangalore et al. | |
| 2017/0118287 A1 | 4/2017 | Beck | |
| 2017/0123883 A1 | 5/2017 | Hall | |
| 2017/0123935 A1 | 5/2017 | Pandit et al. | |
| 2017/0163728 A1 | 6/2017 | Chawla et al. | |
| 2017/0201582 A1 | 7/2017 | Zhang et al. | |
| 2017/0206231 A1 | 7/2017 | Binder et al. | |
| 2017/0270180 A1 | 9/2017 | State | |
| 2017/0286455 A1 | 10/2017 | Li et al. | |
| 2017/0316321 A1 | 11/2017 | Whitney et al. | |
| 2017/0336983 A1 | 11/2017 | Roh et al. | |
| 2017/0344598 A1 | 11/2017 | Constantinescu et al. | |
| 2017/0344905 A1 | 11/2017 | Hack et al. | |
| 2017/0366609 A1 | 12/2017 | Dieterich et al. | |
| 2018/0040029 A1 | 2/2018 | Zeng et al. | |
| 2018/0059946 A1 | 3/2018 | Kunii et al. | |
| 2018/0089031 A1 | 3/2018 | Mitkar et al. | |
| 2018/0101546 A1 | 4/2018 | Krasnow et al. | |
| 2018/0129443 A1 | 5/2018 | Karve et al. | |
| 2018/0165300 A1 | 6/2018 | Okun et al. | |
| 2018/0165321 A1 | 6/2018 | Taron et al. | |
| 2018/0176082 A1 | 6/2018 | Katz et al. | |
| 2018/0176120 A1 | 6/2018 | Katz et al. | |
| 2018/0181583 A1 | 6/2018 | Godman | |
| 2018/0203798 A1 | 7/2018 | Hughes et al. | |
| 2018/0232386 A1 | 8/2018 | Brow et al. | |
| 2018/0276078 A1 | 9/2018 | Blea et al. | |
| 2018/0288057 A1 | 10/2018 | Varadamma et al. | |
| 2018/0307579 A1 | 10/2018 | Rothchilds et al. | |
| 2018/0314423 A1 | 11/2018 | Gong et al. | |
| 2018/0357291 A1 | 12/2018 | Choi et al. | |
| 2018/0365115 A1 | 12/2018 | Fang et al. | |
| 2019/0087770 A1 | 3/2019 | Walsh et al. | |
| 2019/0088153 A1 | 3/2019 | Bader-Natal et al. | |
| 2019/0095112 A1 | 3/2019 | Lingarajappa | |
| 2019/0102700 A1 | 4/2019 | Babu et al. | |
| 2019/0163589 A1 | 5/2019 | Mcbride et al. | |
| 2019/0163591 A1 | 5/2019 | Ouyang et al. | |
| 2019/0196879 A1 | 6/2019 | Dutta et al. | |
| 2019/0212921 A1 | 7/2019 | Liang et al. | |
| 2019/0220189 A1 | 7/2019 | Yang et al. | |
| 2019/0243818 A1 | 8/2019 | Taron et al. | |
| 2019/0251065 A1 | 8/2019 | Passey et al. | |
| 2019/0251066 A1 | 8/2019 | Okun et al. | |
| 2019/0286521 A1 | 9/2019 | Okpotse et al. | |
| 2019/0286528 A1 | 9/2019 | Wu et al. | |
| 2019/0286543 A1 | 9/2019 | Rothschilds et al. | |
| 2019/0294591 A1 | 9/2019 | Krasnow et al. | |
| 2019/0311049 A1* | 10/2019 | Bhargava M R ... G06F 16/9024 | |
| 2019/0332576 A1 | 10/2019 | Godman | |
| 2019/0332579 A1 | 10/2019 | Cooper et al. | |
| 2019/0377802 A1 | 12/2019 | Haber et al. | |
| 2019/0384640 A1 | 12/2019 | Swamy et al. | |
| 2020/0004977 A1 | 1/2020 | Araujo et al. | |
| 2020/0026438 A1 | 1/2020 | Peleg et al. | |
| 2020/0034077 A1 | 1/2020 | Haravu et al. | |
| 2020/0050391 A1 | 2/2020 | Meyerowitz et al. | |
| 2020/0142878 A1 | 5/2020 | Varadarajan et al. | |
| 2020/0174692 A1 | 6/2020 | Dave et al. | |
| 2020/0201824 A1 | 6/2020 | Nishimoto et al. | |
| 2020/0210385 A1 | 7/2020 | Carpenter et al. | |
| 2020/0242075 A1 | 7/2020 | Davis et al. | |
| 2020/0242082 A1* | 7/2020 | Chmiel ............. H04L 67/1097 | |
| 2020/0286270 A1 | 9/2020 | Lymperopoulos et al. | |
| 2020/0341689 A1 | 10/2020 | Smith | |
| 2020/0387315 A1 | 12/2020 | Sterns et al. | |
| 2020/0396287 A1 | 12/2020 | Kasi et al. | |
| 2020/0409583 A1 | 12/2020 | Kusters et al. | |
| 2021/0004355 A1 | 1/2021 | Iwase | |
| 2021/0042263 A1 | 2/2021 | Zdornov et al. | |
| 2021/0042282 A1 | 2/2021 | Cseri et al. | |
| 2021/0056074 A1 | 2/2021 | Zhu | |
| 2021/0110150 A1 | 4/2021 | Kakrana et al. | |
| 2021/0117868 A1 | 4/2021 | Sriharsha | |
| 2021/0132824 A1 | 5/2021 | Furuta et al. | |
| 2021/0173588 A1 | 6/2021 | Kannan et al. | |
| 2021/0191650 A1 | 6/2021 | Vansteenkiste et al. | |
| 2021/0232427 A1 | 7/2021 | Bai et al. | |
| 2021/0232464 A1* | 7/2021 | Su ......................... G06F 16/178 | |
| 2021/0232481 A1 | 7/2021 | Bai et al. | |
| 2021/0240393 A1 | 8/2021 | Jo et al. | |
| 2021/0240678 A1 | 8/2021 | Patel et al. | |
| 2021/0279187 A1 | 9/2021 | Puder et al. | |
| 2021/0311841 A1 | 10/2021 | McNutt | |

(56) References Cited

U.S. PATENT DOCUMENTS

| | | |
|---|---|---|
| 2021/0374105 A1 | 12/2021 | Kodama et al. |
| 2022/0019361 A1 | 1/2022 | Kurata et al. |
| 2022/0035716 A1 | 2/2022 | Su et al. |
| 2022/0035831 A1 | 2/2022 | Beers |
| 2022/0058055 A1 | 2/2022 | Amemiya et al. |
| 2022/0066882 A1 | 3/2022 | Wang et al. |
| 2022/0091739 A1 | 3/2022 | Kumar et al. |
| 2022/0100705 A1 | 3/2022 | Unger et al. |
| 2022/0107729 A1 | 4/2022 | Hua |
| 2022/0124152 A1 | 4/2022 | Gallego et al. |
| 2022/0138150 A1 | 5/2022 | Chmiel et al. |
| 2022/0283956 A1 | 9/2022 | Carpenter et al. |
| 2022/0300155 A1 | 9/2022 | Chmiel et al. |
| 2022/0300159 A1 | 9/2022 | Chmiel et al. |
| 2023/0004312 A1 | 1/2023 | Hansen et al. |
| 2023/0057068 A1 | 2/2023 | Bhandarkar et al. |
| 2023/0057600 A1 | 2/2023 | Malley et al. |
| 2023/0069434 A1 | 3/2023 | Cheng et al. |
| 2023/0106208 A1 | 4/2023 | Nossenson et al. |
| 2023/0342053 A1 | 10/2023 | Varghese et al. |
| 2024/0020268 A1 | 1/2024 | Haber et al. |
| 2024/0028596 A1 | 1/2024 | Lakshman et al. |
| 2025/0147924 A1 | 5/2025 | Ellis et al. |
| 2025/0245193 A1 | 7/2025 | Ellis et al. |

FOREIGN PATENT DOCUMENTS

| | | |
|---|---|---|
| EP | 1498829 A1 | 1/2005 |
| EP | 3311312 A1 | 12/2016 |
| EP | 3333732 A1 | 6/2018 |
| EP | 3361397 A1 | 8/2018 |
| EP | 3361397 B1 | 11/2020 |
| EP | 3333732 B1 | 3/2023 |
| WO | 99/44145 A1 | 9/1999 |
| WO | 00/72201 A1 | 11/2000 |
| WO | 2009/007250 A2 | 1/2009 |
| WO | 2012/029259 A1 | 3/2012 |
| WO | 2016/205752 A1 | 12/2016 |
| WO | 2021/151107 A1 | 7/2021 |
| WO | 2021/189055 A2 | 9/2021 |
| WO | 2025/101416 A1 | 5/2025 |
| WO | 2025/101465 A1 | 5/2025 |

OTHER PUBLICATIONS

Office Communication for U.S. Appl. No. 18/070,705 mailed Feb. 22, 2024, 7 Pages.
Office Communication for U.S. Appl. No. 18/070,705 mailed Mar. 5, 2024, 2 Pages.
Office Communication for U.S. Appl. No. 17/115,529 mailed Mar. 26, 2024, 27 Pages.
Office Communication for U.S. Appl. No. 18/583,746 mailed May 14, 2024, 21 Pages.
Office Communication for U.S. Appl. No. 18/590,088 mailed Apr. 24, 2024, 18 Pages.
Office Communication for U.S. Appl. No. 18/590,088 mailed May 2, 2024, 13 Pages.
Office Communication for U.S Appl. No. 17/864,190 mailed Jun. 4, 2024, 12 Pages.
Marcus Jurgens, "Aggregated Data in Tree-Based Index Structures" in Index Structures for Data Warehouses, LNCS 1859, Springer, Year: 2002, pp. 43-62.
Office Communication for U.S. Appl. No. 18/503,082 mailed Feb. 29, 2024, 26 Pages.
Office Communication for U.S. Appl. No. 18/503,082 mailed May 15, 2024, 27 Pages.
Office Communication for U.S. Appl. No. 18/503,082 mailed Jun. 25, 2024, 4 Pages.
Office Communication for U.S. Appl. No. 18/503,082 mailed Sep. 6, 2024, 27 Pages.
Office Communication for U.S. Appl. No. 18/799,431 mailed Oct. 23, 2024, 30 Pages.

Office Communication for U.S. Appl. No. 18/799,431 mailed Nov. 6, 2024, 27 Pages.
Office Communication for U.S. Appl. No. 17/864,190 mailed Dec. 6, 2024, 8 Pages.
Office Communication for U.S. Appl. No. 18/503,082 mailed Jan. 28, 2025, 8 Pages.
Office Communication for U.S. Appl. No. 18/945,379 mailed Feb. 21, 2025, 18 Pages.
Office Communication for U.S. Appl. No. 18/945,343 mailed Feb. 24, 2025, 25 Pages.
International Search Report and Written Opinion for International Patent Application No. PCT/US2024/053881 mailed Jan. 21, 2025, 14 Pages.
International Search Report and Written Opinion for International Patent Application No. PCT/US2024/054442 mailed Feb. 10, 2025, 8 Pages.
Ryousei Takano, File System Ext2/Ext3, Software Design, No. 161, Mar. 18, 2004, 16 pages with English translation.
Naohiro Aota, "F2FS optimized for flash memory", NIKKEI Linux, vol. 17 No. 3, Mar. 3, 2015, 7 pages with English translation.
Office Communication for U.S. Appl. No. 18/945,379 mailed Jun. 4, 2025, 8 Pages.
Office Communication for U.S. Appl. No. 18/945,379 mailed Jun. 11, 2025, 5 Pages.
Office Communication for U.S. Appl. No. 18/945,343 mailed Jun. 25, 2025, 20 Pages.
Office Communication for U.S. Appl. No. 19/183,475 mailed Jun. 6, 2025, 18 Pages.
Office Communication for U.S. Appl. No. 18/945,343 mailed Aug. 8, 2025, 3 Pages.
Office Communication for U.S. Appl. No. 18/945,343 mailed Oct. 20, 2025, 27 Pages.
International Search Report and Written Opinion for International Patent Application No. PCT/US2025/036658 mailed Oct. 14, 2025, 13 Pages.
Office Communication for U.S. Appl. No. 17/062,500 mailed Jun. 13, 2023, 8 Pages.
Office Communication for U.S. Appl. No. 18/070,705 mailed Jun. 20, 2023, 16 Pages.
Office Communication for U.S. Appl. No. 18/070,705 mailed Feb. 23, 2023, 14 Pages.
Office Communication for U.S. Appl. No. 17/062,500 mailed Feb. 27, 2023, 23 Pages.
Office Communication for U.S. Appl. No. 17/954,640 mailed Mar. 15, 2023, 9 Pages.
Office Communication for U.S Patent Application No. 17/864, 190 mailed Apr. 28, 2023, 5 Pages.
Office Communication for U.S. Appl. No. 17/973,944 mailed May 10, 2023, 9 Pages.
Office Communication for U.S. Appl. No. 17/115,529 mailed May 22, 2023, 25 Pages.
Office Communication for U.S Patent Application No. 17/864, 190 mailed Jan. 24, 2023, 12 Pages.
Office Communication for U.S Patent Application No. 17/588, 120 mailed Feb. 1, 2023, 15 Pages.
Office Communication for U.S Patent Application No. 17/864, 190 mailed Sep. 19, 2022, 10 Pages.
Office Communication for U.S. Appl. No. 17/062,500 mailed Oct. 5, 2022, 4 Pages.
Office Communication for U.S. Appl. No. 17/203,452 mailed Oct. 19, 2022, 9 Pages.
Office Communication for U.S Patent Application No. 17/588, 120 mailed Oct. 21, 2022, 5 Pages.
Office Communication for U.S. Appl. No. 17/203,452 mailed Nov. 9, 2022, 2 Pages.
Office Communication for U.S. Appl. No. 17/588,895 mailed Nov. 9, 2022, 11 Pages.
Office Communication for U.S. Appl. No. 17/954,640 mailed Nov. 30, 2022, 10 Pages.
Office Communication for U.S. Appl. No. 17/115,529 mailed Dec. 9, 2022, 21 Pages.
Office Communication for U.S. Appl. No. 17/484,167 mailed May 17, 2022, 3 Pages.

(56) References Cited

OTHER PUBLICATIONS

Office Communication for U.S. Appl. No. 17/484,167 mailed Jun. 10, 2022, 5 Pages.

Office Communication for U.S. Appl. No. 17/203,452 mailed Jun. 22, 2022, 22 Pages.

Office Communication for U.S. Appl. No. 14/595,598 mailed Jul. 13, 2022, 9 Pages.

Office Communication for U.S. Appl. No. 17/062,500 mailed Jul. 26, 2022, 20 Pages.

Office Communication for U.S. Appl. No. 17/588,120 mailed Jul. 27, 2022, 34 Pages.

Office Communication for U.S. Appl. No. 17/190,653 mailed Aug. 2, 2022, 8 Pages.

Office Communication for U.S. Appl. No. 17/115,529 mailed Aug. 8, 2022, 21 Pages.

Office Communication for U.S. Appl. No. 17/588,895 mailed Aug. 12, 2022, 12 Pages.

Office Communication for U.S. Appl. No. 17/203,452 mailed Sep. 8, 2022, 4 Pages.

Office Communication for U.S. Appl. No. 17/504,289 mailed Mar. 28, 2022, 9 Pages.

Office Communication for U.S. Appl. No. 17/588,120 mailed Apr. 11, 2022, 36 Pages.

Office Communication for U.S. Appl. No. 17/588,895 mailed Apr. 27, 2022, 6 Pages.

Office Communication for U.S. Appl. No. 17/190,653 mailed Apr. 28, 2022, 13 Pages.

Office Communication for U.S. Appl. No. 17/510,043 mailed Apr. 29, 2022, 10 Pages.

Office Communication for U.S. Appl. No. 17/115,529 mailed Apr. 29, 2022, 4 Pages.

Office Communication for U.S. Appl. No. 17/190,653 mailed Dec. 21, 2021, 12 Pages.

Office Communication for U.S. Appl. No. 14/595,598 mailed Dec. 29, 2021, 19 Pages.

Office Communication for U.S. Appl. No. 17/062,500 mailed Jan. 7, 2022, 4 Pages.

Office Communication for U.S. Appl. No. 16/741,567 mailed Jan. 11, 2022, 6 Pages.

Office Communication for U.S. Appl. No. 17/203,452 mailed Jan. 14, 2022, 4 Pages.

Office Communication for U.S. Appl. No. 17/510,043 mailed Jan. 21, 2022, 13 Pages.

Office Communication for U.S. Appl. No. 16/741,567 mailed Feb. 7, 2022, 8 Pages.

Office Communication for U.S. Appl. No. 17/530,420 mailed Feb. 10, 2022, 24 Pages.

Office Communication for U.S. Appl. No. 16/004,182 mailed Feb. 18, 2022, 11 Pages.

Office Communication for U.S. Appl. No. 17/115,529 mailed Feb. 18, 2022, 20 Pages.

Office Communication for U.S. Appl. No. 17/203,452 mailed Feb. 24, 2022, 14 Pages.

Office Communication for U.S. Appl. No. 17/484,167 mailed Mar. 11, 2022, 11 Pages.

Office Communication for U.S. Appl. No. 17/062,500 mailed Mar. 22, 2022, 19 Pages.

Office Communication for U.S. Appl. No. 16/152,277 mailed Oct. 18, 2021, 5 Pages.

International Search Report and Written Opinion for International Patent Application No. PCT/US2021/023525 mailed Oct. 12, 2021, 6 Pages.

Office Communication for U.S. Appl. No. 17/115,529 mailed Oct. 22, 2021, 20 Pages.

International Search Report and Written Opinion for International Patent Application No. PCT/US2021/023531 mailed Jul. 6, 2021, 6 Pages.

Office Communication for U.S. Appl. No. 17/062,500 mailed Jul. 12, 2021, 18 Pages.

Office Communication for U.S. Appl. No. 16/775,041 mailed Jul. 21, 2021, 11 Pages.

Office Communication for U.S. Appl. No. 17/114,384 mailed Aug. 3, 2021, 4 Pages.

Office Communication for U.S. Appl. No. 14/595,598 mailed Aug. 6, 2021, 20 Pages.

Office Communication for U.S. Appl. No. 17/115,529 mailed Aug. 12, 2021, 4 Pages.

Office Communication for U.S. Appl. No. 17/190,653 mailed Aug. 27, 2021, 11 Pages.

Office Communication for U.S. Appl. No. 17/114,384 mailed Sep. 2, 2021, 5 Pages.

Office Communication for U.S. Appl. No. 16/152,277 mailed Sep. 3, 2021, 4 Pages.

Office Communication for U.S. Appl. No. 16/004,182 mailed Sep. 10, 2021, 4 Pages.

Office Communication for U.S. Appl. No. 16/004,182 mailed Sep. 29, 2021, 11 Pages.

Office Communication for U.S. Appl. No. 17/491,017 mailed Dec. 23, 2021, 41 Pages.

Office Communication for U.S. Appl. No. 17/491,017 mailed May 12, 2022, 50 Pages.

Office Communication for U.S. Appl. No. 17/491,017 mailed Sep. 15, 2022, 55 Pages.

Office Communication for U.S. Appl. No. 17/491,017 mailed Feb. 10, 2023, 55 Pages.

Office Communication for U.S. Appl. No. 17/491,017 mailed Aug. 8, 2023, 13 Pages.

Office Communication for U.S. Appl. No. 14/595,598 mailed May 16, 2019, 18 Pages.

Office Communication for U.S. Appl. No. 16/152,277 mailed Oct. 26, 2021, 2 Pages.

Office Communication for U.S. Appl. No. 16/004,182 mailed Mar. 17, 2022, 3 Pages.

Office Communication for U.S. Appl. No. 16/226,587 mailed Jan. 27, 2020, 13 Pages.

Office Communication for U.S. Appl. No. 16/741,567 mailed Feb. 24, 2022, 2 Pages.

Office Communication for U.S. Appl. No. 16/234,334 mailed Oct. 11, 2019, 16 Pages.

Office Communication for U.S. Appl. No. 16/262,790 mailed Nov. 8, 2019, 5 Pages.

Office Communication for U.S. Appl. No. 17/504,289 mailed Apr. 20, 2022, 2 Pages.

Office Communication for U.S. Appl. No. 16/659,488 mailed May 6, 2020, 8 Pages.

International Preliminary Report on Patentability Chapter I for International Patent Application No. PCT/US2021/023531 mailed Aug. 4, 2022, 5 Pages.

International Preliminary Report on Patentability Chapter I for International Patent Application No. PCT/US2021/023525 mailed Aug. 4, 2022, 5 Pages.

International Preliminary Report on Patentability Chapter I for International Patent Application No. PCT/US2016/038242 mailed Dec. 28, 2017, 8 Pages.

Office Action for European Patent Application No. 17206518.7 mailed Mar. 15, 2022, 5 Pages.

Intention to Grant for European Patent Application No. 17206518.7 mailed Sep. 30, 2022, 6 Pages.

Office Communication for U.S. Appl. No. 17/508,869 mailed Mar. 8, 2022, 2 Pages.

Office Communication for U.S. Appl. No. 17/508,869 mailed Jan. 5, 2022, 3 Pages.

Office Communication for U.S. Appl. No. 17/508,869 mailed Dec. 22, 2021, 9 Pages.

Office Communication for U.S. Appl. No. 17/530,420 mailed May 4, 2022, 3 Pages.

Office Communication for U.S. Appl. No. 17/530,420 mailed May 12, 2022, 3 Pages.

Office Communication for European Patent Application No. 16812585.4 mailed Apr. 1, 2021, 9 pages.

Intention to Grant for European Patent Application No. 18155779.4 mailed Jun. 12, 2020, 10 Pages.

(56) References Cited

OTHER PUBLICATIONS

Office Communication for U.S. Appl. No. 17/115,529 mailed Sep. 12, 2023, 25 Pages.
Office Communication for U.S. Appl. No. 17/491,017 mailed May 4, 2023, 6 Pages.
Office Communication for U.S. Appl. No. 17/491,017 mailed Aug. 17, 2022, 5 Pages.
Office Communication for U.S. Appl. No. 17/864,190 mailed Aug. 25, 2023, 12 Pages.
Office Communication for U.S. Appl. No. 18/070,705 mailed Sep. 7, 2023, 5 Pages.
Office Communication for European Patent Application No. 18155779.4 mailed Apr. 17, 2018, 4 Pages.
Office Communication for U.S. Appl. No. 17/864,190 mailed Nov. 17, 2023, 12 Pages.
Office Communication for U.S. Appl. No. 17/115,529 mailed Dec. 13, 2023, 4 Pages.
Office Communication for U.S. Appl. No. 17/115,529 mailed Jan. 12, 2024, 26 Pages.
Office Communication for U.S. Appl. No. 18/503,791 mailed Jan. 4, 2024, 27 Pages.
Office Communication for U.S. Appl. No. 17/864,190 mailed Feb. 8, 2024, 5 Pages.
Office Communication for U.S. Appl. No. 18/503,918 mailed Jan. 24, 2024, 12 Pages.
Office Communication for U.S. Appl. No. 18/503,918 mailed Jan. 31, 2024, 8 Pages.
Office Communication for U.S. Appl. No. 14/859,114 mailed Jun. 27, 2018, 33 pages.
Office Communication for U.S. Appl. No. 14/859,114 mailed Nov. 19, 2018, 35 Pages.
Office Communication for U.S. Appl. No. 14/859,114 mailed Jan. 31, 2019, 4 Pages.
Office Communication for U.S. Appl. No. 14/859,114 mailed Mar. 7, 2019, 32 Pages.
Office Communication for U.S. Appl. No. 14/859,114 mailed Jun. 26, 2019, 21 Pages.
Office Communication for U.S. Appl. No. 14/859,114 mailed Sep. 13, 2019, 6 Pages.
Office Communication for U.S. Appl. No. 14/859,114 mailed Nov. 26, 2019, 21 Pages.
Office Communication for U.S. Appl. No. 15/288,853 mailed Sep. 19, 2018, 13 pages.
Chimera, Richard, "Value Bars: An Information Visualization and Navigation Tool for Multi-attribute Listings", CHI '92, Monterey, CA, May 3-7, 1992, pp. 293-294.
Office Communication for U.S. Appl. No. 15/288,853 mailed Mar. 25, 2019, 25 Pages.
Cudre-Mauroux, Philippe et al., "TrajStore An Adaptive Storage System for Very Lar ie Trajecto1y Sets", ICDE 2010, Long Beach, CA, Mar. 1-6, 2010, pp. 109-120.
Office Communication for U.S. Appl. No. 16/436,825 mailed Jul. 11, 2019, 9 Pages.
Office Communication for U.S. Appl. No. 15/474,047 mailed Sep. 18, 2017, 14 Pages.
Office Communication for U.S. Appl. No. 15/474,047 mailed Mar. 9, 2018, 8 Pages.
Office Communication for U.S. Appl. No. 15/474,047 mailed Jun. 11, 2018, 6 Pages.
Office Communication for U.S. Appl. No. 15/474,047 mailed Aug. 15, 2018, 11 Pages.
Office Communication for U.S. Appl. No. 15/957,809 mailed Jun. 28, 2018, 27 Pages.
Office Communication for U.S. Appl. No. 15/957,809 mailed Jan. 24, 2019, 11 Pages.
Office Communication for U.S. Appl. No. 16/434,157 mailed Jul. 25, 2019, 8 Pages.
Office Communication for U.S. Appl. No. 15/854,447 mailed May 6, 2019, 9 pages.

Office Communication for U.S. Appl. No. 16/505,562 mailed Aug. 30, 2019, 11 Pages.
Extended European Search Report for European Patent Application No. 17206518.7 mailed Apr. 5, 2018, 8 Pages.
Karatza et al., "Epoch Load Sharing in a Network of Workstations," Simulation Symposium, 2001. Proceedings. 34th Annual Apr. 22-26, 2001, Piscataway, NJ, USA, IEEE, XP010541274, ISBN: 978-0-7695-1092-7, pp. 36-42.
Office Communication for U.S. Appl. No. 16/004,182 mailed Jan. 7, 2020, 46 Pages.
Office Communication for U.S. Appl. No. 16/125,573 mailed Nov. 21, 2019, 13 Pages.
Office Communication for U.S. Appl. No. 16/226,587 mailed Oct. 24, 2019, 4 Pages.
Office Communication for U.S. Appl. No. 16/262,790 mailed Dec. 12, 2019, 10 Pages.
Office Communication for U.S. Appl. No. 16/234,334 mailed Jan. 16, 2020, 8 Pages.
Office Communication for U.S. Appl. No. 15/694,604 mailed Nov. 20, 2019, 8 Pages.
Office Communication for U.S. Appl. No. 16/262,756 mailed Jan. 28, 2020, 21 Pages.
Office Communication for U.S. Appl. No. 16/434,157 mailed Jan. 29, 2020, 9 Pages.
Office Communication for U.S. Appl. No. 16/262,790 mailed Feb. 6, 2020, 8 Pages.
Office Communication for U.S. Appl. No. 14/859,114 mailed Mar. 13, 2020, 21 Pages.
Office Communication for U.S. Appl. No. 16/752,451 mailed Mar. 12, 2020, 14 Pages.
Office Communication for U.S. Appl. No. 16/775,041 mailed Mar. 11, 2020, 8 pages.
Office Communication for U.S. Appl. No. 16/779,362 mailed Mar. 26, 2020, 10 Pages.
Wikipedia clustered file system page from elate Jul. 9, 2019, retrieved using the WayBackMachine, From https//web.archive.org/web/20190709083400/tlhttps://en.wikipedia.org/wiki/Clustered_file_system (Year: 2019), pp. 1-6.
Wikipedia raft page from date Jul. 16, 2019, retrieved using the WayBackMachine, from tlhttps://web.archive.org/web/20190716115001/https://en.wikipedia.org/wiki/Raft (computer_science) (Year: 2019), pp. 1-4.
Office Communication for U.S. Appl. No. 16/004,182 mailed Mar. 23, 2020, 4 Pages.
Office Communication for U.S. Appl. No. 16/752,509 mailed Apr. 2, 2020, 8 Pages.
Office Communication for U.S. Appl. No. 16/152,277 mailed Apr. 3, 2020, 10 Pages.
Office Communication for U.S. Appl. No. 16/004,182 mailed Apr. 28, 2020, 51 Pages.
Office Communication for U.S. Appl. No. 16/152,259 mailed Apr. 29, 2020, 19 Pages.
Office Communication for U.S. Appl. No. 14/859,114 mailed Jun. 5, 2020, 5 Pages.
Office Communication for U.S. Appl. No. 16/262,756 mailed Jun. 8, 2020, 22 Pages.
Office Communication for U.S. Appl. No. 14/595,598 mailed Jul. 9, 2020, 19 Pages.
Office Communication for U.S. Appl. No. 16/752,451 mailed Jul. 23, 2020, 8 Pages.
Office Communication for U.S. Appl. No. 14/859,114 mailed Jul. 23, 2020, 21 Pages.
Office Communication for U.S. Appl. No. 16/152,615 mailed Aug. 6, 2020, 7 Pages.
Office Communication for U.S. Appl. No. 16/779,362 mailed Aug. 7, 2020, 11 Pages.
Office Communication for U.S. Appl. No. 17/062,500 mailed Oct. 27, 2021, 17 Pages.
Office Communication for U.S. Appl. No. 14/595,598 mailed Oct. 28, 2021, 6 Pages.
Office Communication for U.S. Appl. No. 16/741,567 mailed Oct. 28, 2021, 11 Pages.

(56) References Cited

OTHER PUBLICATIONS

Office Communication for U.S. Appl. No. 17/203,452 mailed Nov. 2, 2021, 13 Pages.
Office Communication for U.S. Appl. No. 17/190,653 mailed Nov. 10, 2021, 6 Pages.
Office Communication for U.S. Appl. No. 17/484,167 mailed Nov. 18, 2021, 15 Pages.
Office Communication for U.S. Appl. No. 17/504,289 mailed Dec. 7, 2021, 15 Pages.
Office Communication for U.S. Appl. No. 17/114,384 mailed Dec. 14, 2021, 7 Pages.
Office Communication for U.S. Appl. No. 16/226,587 mailed Aug. 5, 2019, 46 Pages.
Office Communication for U.S. Appl. No. 16/228,716 mailed Jun. 24, 2019, 10 Pages.
Office Communication for U.S. Appl. No. 16/231,354 mailed Jul. 10, 2019, 8 Pages.
Office Communication for U.S. Appl. No. 16/262,756 mailed Aug. 5, 2019, 35 Pages.
Office Communication for U.S. Appl. No. 15/967,499 mailed Jun. 27, 2018, 16 Pages.
Office Communication for U.S. Appl. No. 16/226,587 mailed Feb. 25, 2019, 43 Pages.
Office Communication for U.S. Appl. No. 16/228,716 mailed Feb. 28, 2019, 15 Pages.
Office Communication for U.S. Appl. No. 16/231,354 mailed Mar. 25, 2019, 10 Pages.
Office Communication for U.S. Appl. No. 16/262,756 mailed Apr. 2, 2019, 29 Pages.
Office Communication for U.S. Appl. No. 16/262,790 maned Aug. 23, 2019, 16 Pages.
Office Communication for U.S. Appl. No. 16/262,790 mailed Apr. 18, 2019, 14 Pages.
Office Communication for U.S. Appl. No. 16/262,756 mailed Oct. 25, 2019, 4 Pages.
Office Communication for U.S. Appl. No. 16/659,488 mailed Dec. 30, 2019, 6 Pages.
Office Communication for U.S. Appl. No. 14/595,598 mailed Dec. 31, 2019, 16 Pages.
Office Communication for U.S. Appl. No. 16/004,208 mailed Aug. 27, 2018, 11 Pages.
Office Communication for U.S. Appl. No. 16/234,395 mailed Aug. 8, 2019, 10 Pages.
Office Communication for U.S. Appl. No. 16/234,334 mailed Apr. 5, 2019, 15 Pages.
Office Communication for U.S. Appl. No. 16/234,395 mailed Mar. 28, 2019, 10 Pages.
Kappes, Giorgos et al., "Dike: Virtualization-awarn Access Control for Multitenant Filesystems", Feb. 18, 2013, pp. 1-6.
Hitz, Dave et al., "Merging NT and UNIX filesystem Permissions", Proceedings of the 2nd USENIX Windows NT Symposium, Seattle, Washington, Aug. 3-4, 1998, pp. 1-10.
Office Communication for U.S. Appl. No. 15/473,051 mailed Jun. 30, 2017, 23 Pages.
Extended European Search Report for European Patent Application No. 18155779.4 mailed Apr. 17, 2018, 15 Pages.
Office Communication for U.S. Appl. No. 16/004,182 mailed Aug. 23, 2018, 43 Pages.
Office Communication for U.S. Appl. No. 16/004,182 mailed Mar. 5, 2019, 46 Pages.
Office Communication for U.S. Appl. No. 16/004,182 mailed Jul. 3, 2019, 45 Pages.
Office Communication for U.S. Appl. No. 15/694,604 mailed Jun. 3, 2019, 8 Pages.
Office Communication for U.S. Appl. No. 16/004,182 mailed May 22, 2019, 4 Pages.
Office Communication for U.S. Appl. No. 14/595,043 mailed May 4, 2017, 30 Pages.
Office Communication for U.S. Appl. No. 14/595,043 mailed Feb. 23, 2018, 16 Pages.

Office Communication for U.S. Appl. No. 14/595,043 mailed May 25, 2018, 7 Pages.
Office Communication for U.S. Appl. No. 14/595,043 mailed Oct. 5, 2018, 17 Pages.
Office Communication for U.S. Appl. No. 14/595,043 mailed Jun. 7, 2019, 19 Pages.
Office Communication for U.S. Appl. No. 14/595,043 mailed Aug. 27, 2019, 17 Pages.
Office Communication for U.S. Appl. No. 14/658,015 mailed Apr. 27, 2017, 7 Pages.
Office Communication for U.S. Appl. No. 14/658,015 mailed Jan. 4, 2018, 28 Pages.
Office Communication for U.S. Appl. No. 14/658,015 mailed Jul. 13, 2018, 8 Pages.
Office Communication for U.S. Appl. No. 14/859,061 mailed Sep. 22, 2017, 16 Pages.
Office Communication for U.S. Appl. No. 15/831,236 mailed Mar. 30, 2018, 8 Pages.
Office Communication for U.S. Appl. No. 15/831,236 mailed Aug. 15, 2018, 14 Pages.
Office Communication for U.S. Appl. No. 14/859,114 mailed Jul. 24, 2017, 41 Pages.
Office Communication for U.S. Appl. No. 14/859,114 mailed Feb. 21, 2018, 25 Pages.
Office Communication for U.S. Appl. No. 14/859,114 mailed May 11, 2018, 5 Pages.
Office Communication for U.S. Appl. No. 16/883,922 mailed Aug. 7, 2020, 13 Pages.
Office Communication for U.S. Appl. No. 16/775,041 mailed Aug. 18, 2020, 9 Pages.
Office Communication for U.S. Appl. No. 16/883,879 mailed Sep. 1, 2020, 11 Pages.
Extended European Search Report for European Patent Application No. 16812585.4 mailed Nov. 7, 2018, 9 Pages.
Comer, Douglas, "The Ubiquitous B-Tree," Computing Surveys, vol. 11, No. 2, Jun. 1979. Computer Science Department, Purdue University, West Lafayette, Indiana 47907, pp. 121-137.
Office Communication for European Patent Application No. 16812585.4 mailed Jan. 2, 2020, 6 Pages.
International Search Report and Written Opinion for International Patent Application No. PCT/US2016/038242 mailed Oct. 11, 2016, 9 Pages.
Office Communication for U.S. Appl. No. 14/595,598 mailed Jul. 31, 2019, 5 Pages.
Office Communication for U.S. Appl. No. 14/595,598 mailed Sep. 20, 2018, 18 Pages.
Office Communication for U.S. Appl. No. 14/595,598 mailed Dec. 15, 2017, 18 Pages.
Office Communication for U.S. Appl. No. 14/595,598 mailed Feb. 24, 2017, 8 Pages.
Office Communication for U.S. Appl. No. 14/595,598 mailed Apr. 19, 2018, 5 Pages.
Bloom, Burton H., "Space/Time Trade-offs in Hash Coding with Allowable Errors," Communications of the ACM, vol. 13, No. 7, Jul. 1970. Computer Usage Company, Newton Upper Falls, Massachusetts, pp. 422-426.
Office Communication for U.S. Appl. No. 16/262,756 mailed Aug. 24, 2020, 7 Pages.
Office Communication for European Patent Application No. 18155779.4 mailed Oct. 8, 2019, 4 Pages.
Office Communication for U.S. Appl. No. 16/152,259 mailed Aug. 28, 2020, 5 Pages.
Office Communication for U.S. Appl. No. 16/752,509 mailed Aug. 11, 2020, 7 Pages.
Office Communication for U.S. Appl. No. 14/595,598 mailed Sep. 25, 2020, 7 Pages.
Office Communication for U.S. Appl. No. 16/152,277 mailed Oct. 16, 2020, 10 Pages.
Office Communication for U.S. Appl. No. 16/152,615 mailed Oct. 20, 2020, 7 Pages.
Office Communication for U.S. Appl. No. 16/775,041 mailed Nov. 3, 2020, 5 Pages.

(56)         References Cited

OTHER PUBLICATIONS

Office Communication for U.S. Appl. No. 17/062,500 mailed Nov. 12, 2020, 12 Pages.
Office Communication for U.S. Appl. No. 16/004,182 mailed Nov. 30, 2020, 55 Pages.
Office Communication for U.S. Appl. No. 14/859,114 mailed Dec. 1, 2020, 24 Pages.
Office Communication for U.S. Appl. No. 16/883,922 mailed Dec. 2, 2020, 9 Pages.
Office Communication for U.S. Appl. No. 16/883,879 mailed Dec. 8, 2020, 5 Pages.
Office Communication for U.S. Appl. No. 16/152,277 mailed Dec. 28, 2020, 5 Pages.
Office Communication for U.S. Appl. No. 16/004,182 mailed Jan. 28, 2021, 4 Pages.
Office Communication for U.S. Appl. No. 14/595,598 mailed Feb. 4, 2021, 19 Pages.
Office Communication for U.S. Appl. No. 17/115,529 mailed Feb. 8, 2021, 15 Pages.
Office Communication for U.S. Appl. No. 16/262,756 mailed Feb. 10, 2021, 19 Pages.
Office Communication for U.S. Appl. No. 17/114,384 mailed Feb. 17, 2021, 12 Pages.
Office Action for European Patent Application No. 17206518.7 mailed Feb. 23, 2021, 6 Pages.
Office Communication for U.S. Appl. No. 14/859,114 mailed Mar. 8, 2021, 4 Pages.
Office Communication for U.S. Appl. No. 16/004,182 mailed Mar. 8, 2021, 60 Pages.

Office Communication for U.S. Appl. No. 17/062,500 mailed Mar. 9, 2021, 17 Pages.
Office Communication for U.S. Appl. No. 16/152,277 mailed Mar. 18, 2021, 10 Pages.
Office Communication for U.S. Appl. No. 17/160,698 mailed Mar. 18, 2021, 11 Pages.
Office Communication for U.S. Appl. No. 17/062,500 mailed May 18, 2021, 4 Pages.
Office Communication for U.S. Appl. No. 17/203,371 mailed May 20, 2021, 10 Pages.
Office Communication for U.S. Appl. No. 17/115,529 mailed May 25, 2021, 18 Pages.
Office Communication for U.S. Appl. No. 14/859,114 mailed May 26, 2021, 11 Pages.
Office Communication for U.S. Appl. No. 16/262,756 mailed May 27, 2021, 7 Pages.
Office Communication for U.S. Appl. No. 17/114,384 mailed May 27, 2021, 13 Pages.
Office Communication for U.S. Appl. No. 17/190,653 mailed May 27, 2021, 11 Pages.
Office Communication for U.S. Appl. No. 16/741,567 mailed Jun. 8, 2021, 5 Pages.
Office Communication for U.S. Appl. No. 17/203,452 mailed Jun. 23, 2021, 11 Pages.
Office Communication for U.S. Appl. No. 16/152,277 mailed Jun. 25, 2021, 10 Pages.
Office Communication for U.S. Appl. No. 16/004,182 mailed Jul. 1, 2021, 58 Pages.
Office Communication for U.S. Appl. No. 17/160,698 mailed Jul. 2, 2021, 12 Pages.

* cited by examiner

*103*

*104*

*100*

Laptop Computer

Mobile Computer

*105*

*102*

*108*

Tablet Computer

WIRELESS
NETWORK

Client
Computer

WIDE AREA
NETWORK/
LOCAL AREA
NETWORK –
(NETWORK)

*110*

*118*

*116*

File System Management
Server Computer

Application Server Computer

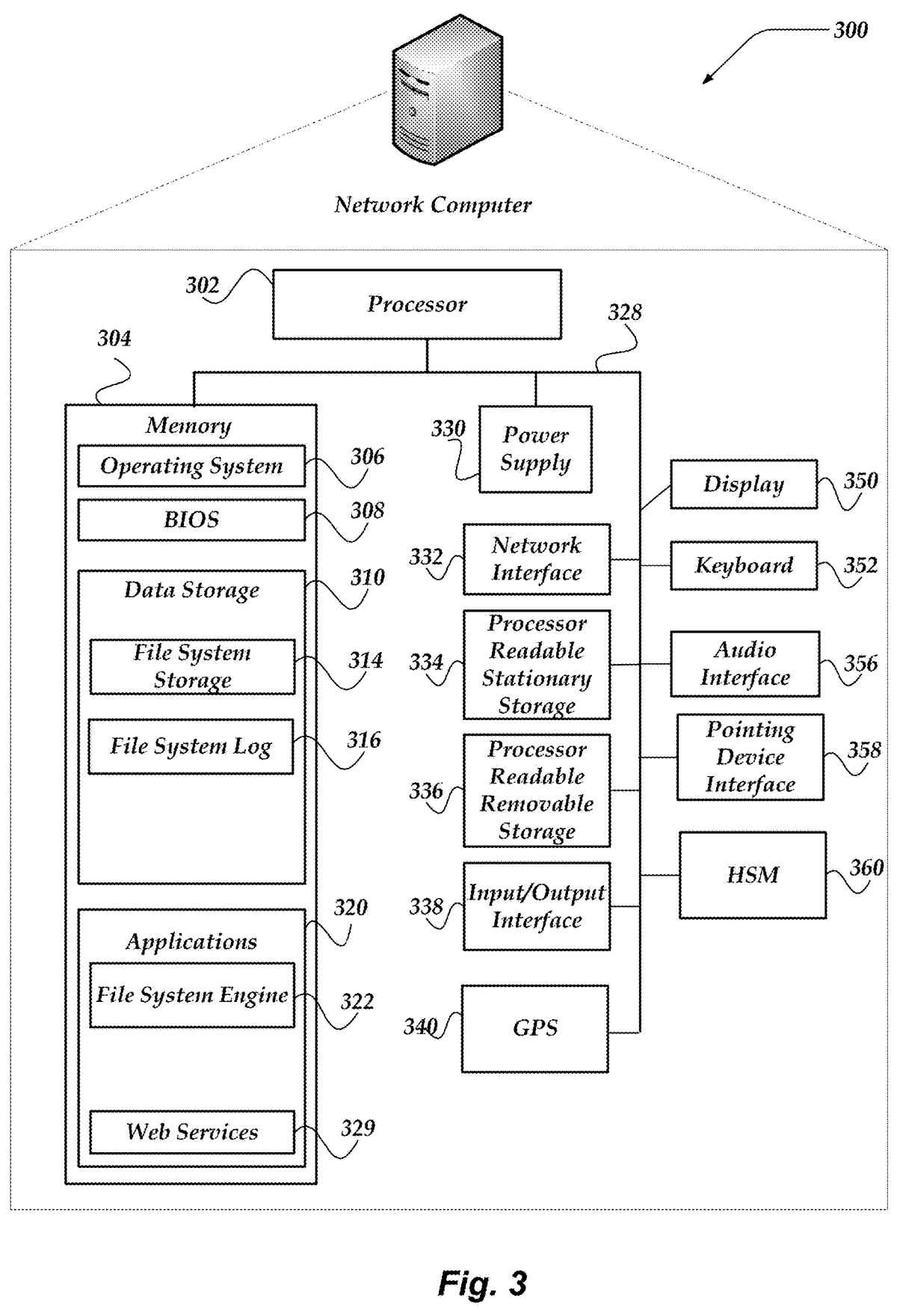

*300*

*Network Computer*

302 Processor

328

304

Memory

Operating System — 306

BIOS — 308

Data Storage — 310

File System Storage — 314

File System Log — 316

320 Applications

File System Engine — 322

Web Services — 329

330 Power Supply

332 Network Interface

334 Processor Readable Stationary Storage

336 Processor Readable Removable Storage

338 Input/Output Interface

340 GPS

Display — 350

Keyboard — 352

Audio Interface — 356

Pointing Device Interface — 358

HSM — 360

*Fig. 3*

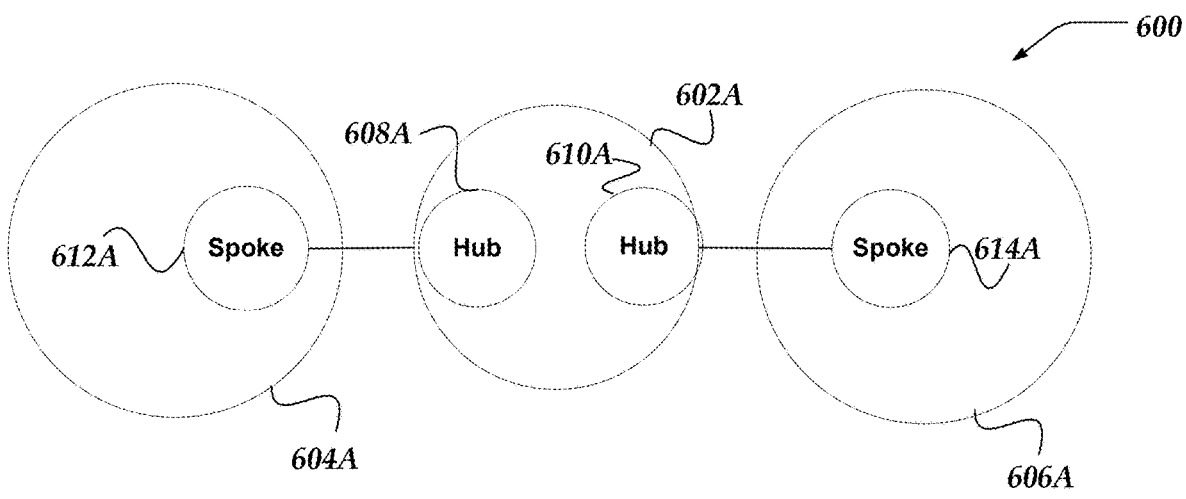
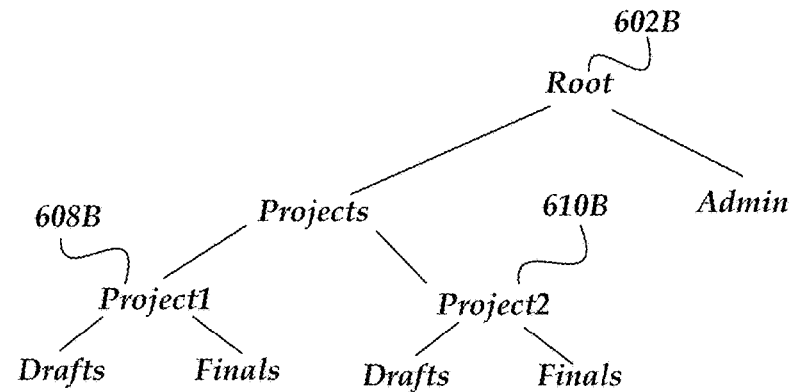
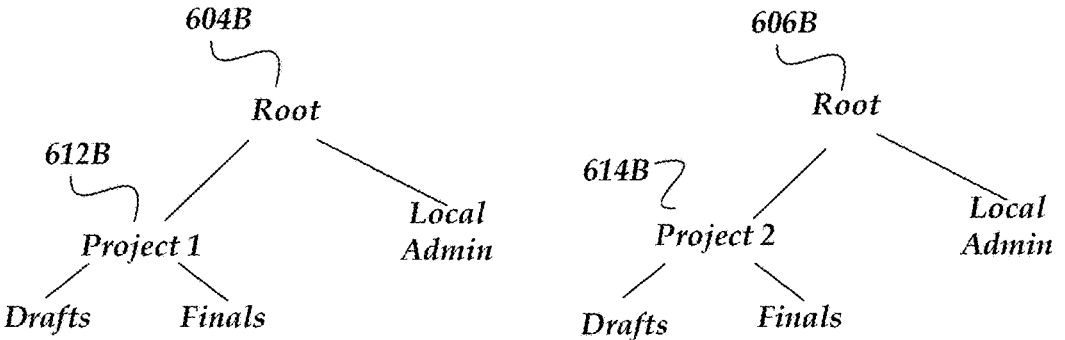
*Fig. 6*

Fig. 7

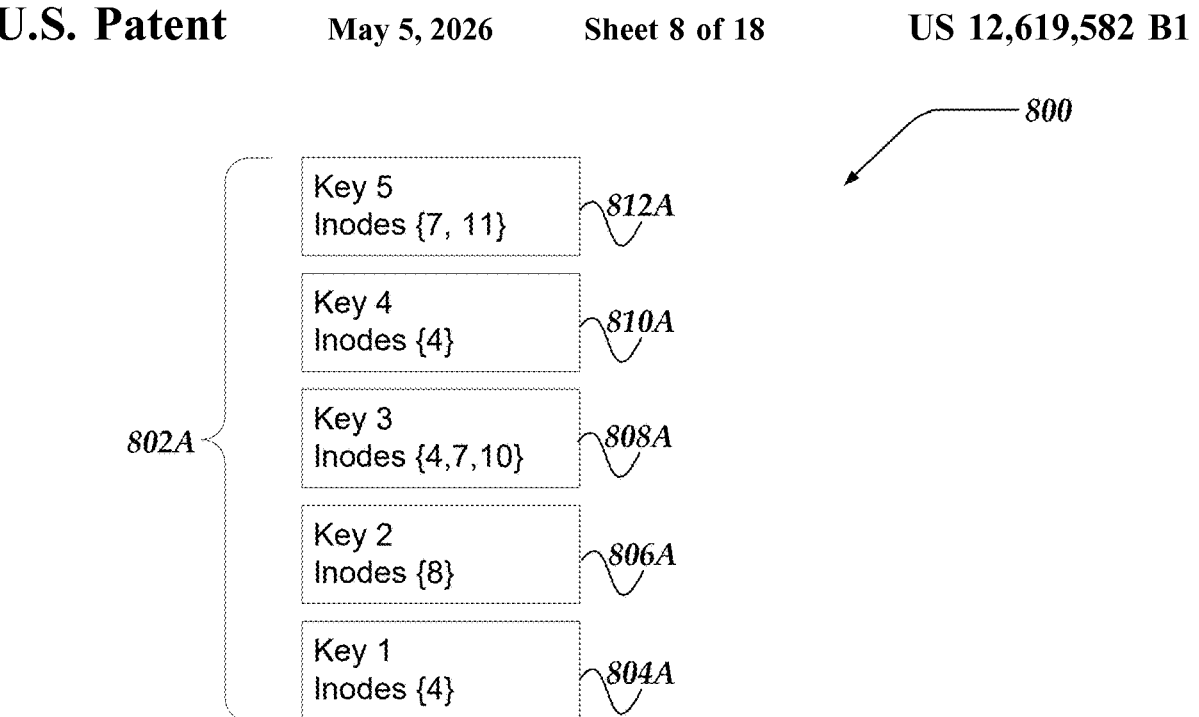
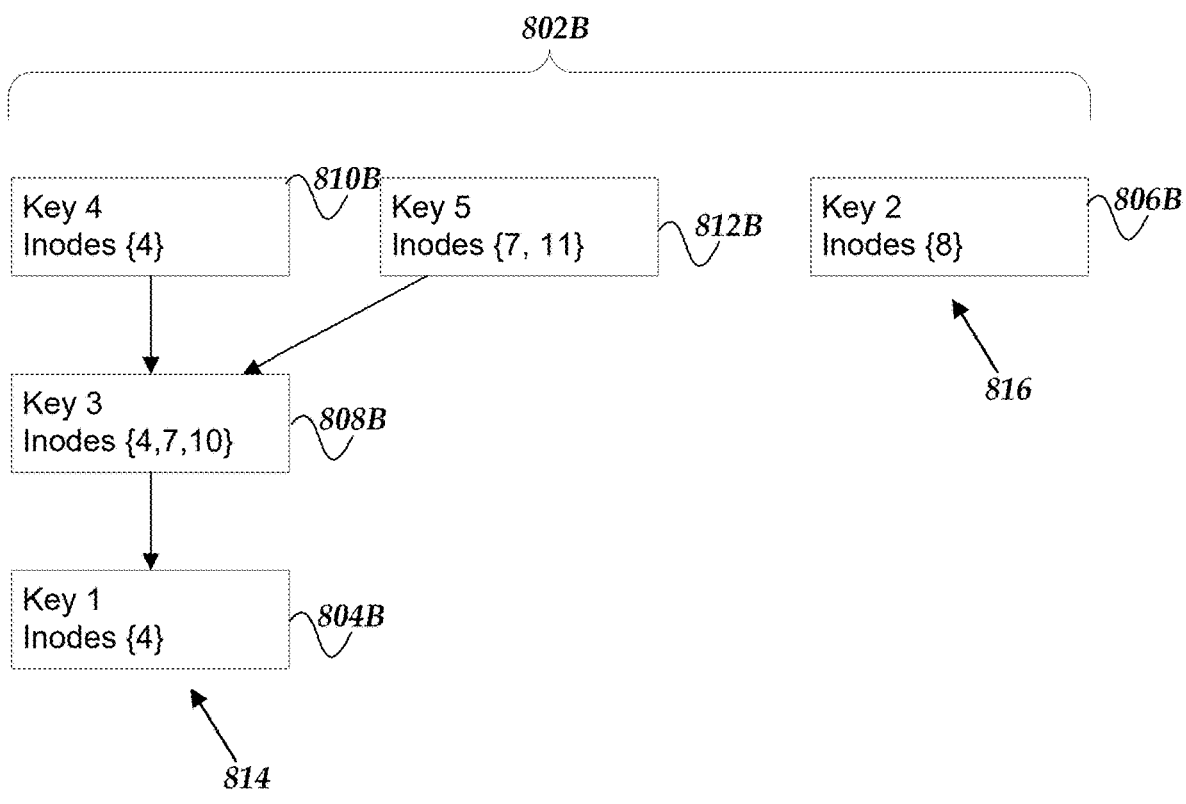
*Fig. 8*

*1200*

START

OBTAIN FILE SYSTEM OPERATION
TRANSACTION EXECUTED ON
SPOKE/SHARED FILE SYSTEM — 1202

OBTAIN NEW LOG ENTRY — 1204

DETERMINE LOG ENTRY KEY — 1206

DETERMINE INODES ASSOCIATED
WITH TRANSACTION — 1208

INCLUDE LOG ENTRY KEY AND
INODES IN LOG ENTRY — 1210

STORE LOG ENTRY IN
TRANSACTION LOG — 1212

UPDATE INODES TO REFERENCE
LOG ENTRY KEY — 1214

RETURN

*1800*

START

MONITOR USER INTERACTIONS WITH APPLICATION    *1802*

MONITOR DISPLAY ORIENTATION/CHARACTERISTICS    *1804*

GENERATE TELEMETRY INFORMATION AND TELEMETRY METRICS    *1806*

PROVIDE TELEMETRY INFORMATION AND TELEMETRY METRICS TO FILE SYSTEM ENGINE    *1808*

MODIFY VISUAL APPEARANCE OF USER INTERFACE(S) BASED ON TELEMETRY INFORMATION OR TELEMETRY METRICS    *1810*

NO

TERMINATE?    *1812*

YES

RETURN

MANAGING FILE SYSTEM TRANSACTION DEPENDENCIES

TECHNICAL FIELD

The present invention relates generally to file systems, and more particularly, but not exclusively, to managing file system transaction dependencies.

BACKGROUND

Modern computing often requires the collection, processing, or storage of very large data sets or file systems. Accordingly, to accommodate the capacity requirements as well as other requirements, such as, high availability, redundancy, latency/access considerations, or the like, modern file systems may be very large or distributed across multiple hosts, networks, or data centers, and so on. Further, reliable or highly-available file systems may be expected to perform various actions to operate, recover from errors, perform backups, rebalancing data, or the like, all the while maintaining file system consistency across the entirety of the file system.

Further, more recently organizations are increasingly relying on distributed resources, including distributed/work-from-home employees, geographically distant work centers, geographically distant data centers, and so on. Often these distant/separate resources need to share data. Using a central file system may enable some shared access across far distances, however, in many data intensive workflows, relying on distantly located file systems may have various disadvantages, including poor responsiveness, redundant data copying, dependence on unreliable long distance communication, connectivity, excess network resource consumption, or the like. Thus, it is with respect to these considerations and others that the present invention has been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of Various Embodiments, which is to be read in association with the accompanying drawings, wherein:

FIG. 3 illustrates a schematic embodiment of a network computer;

FIG. 6 illustrates a logical schematic of a distributed file system for managing file system transaction dependencies in accordance with one or more of the various embodiments;

FIG. 7 illustrates a logical schematic for a system for managing file system transaction dependencies in accordance with one or more of the various embodiments;

FIG. 8 illustrates a logical schematic for a system for managing file system transaction dependencies in accordance with one or more of the various embodiments;

DETAILED DESCRIPTION OF VARIOUS EMBODIMENTS

Figure 1:
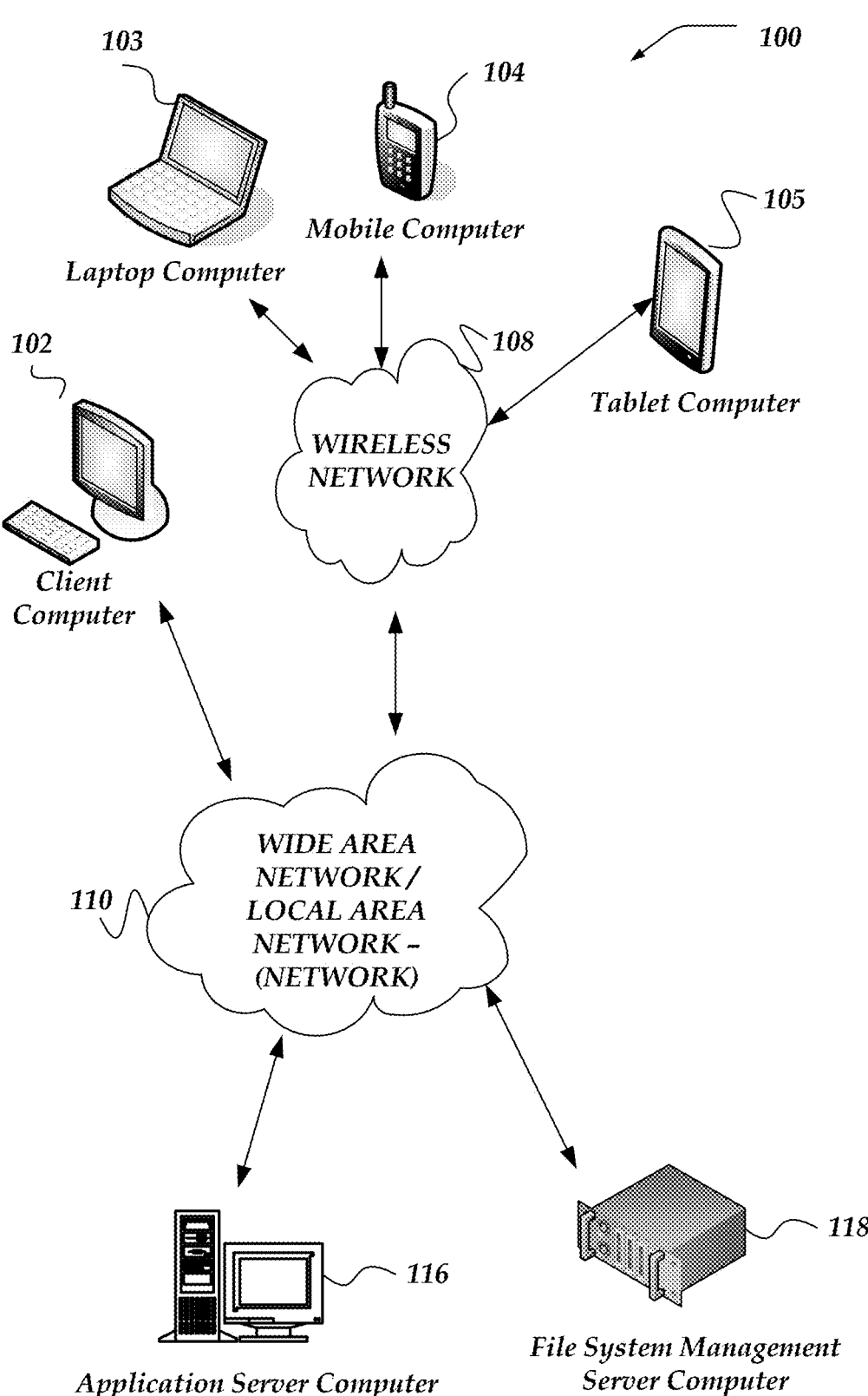
FIG. 1 illustrates a system environment in which various embodiments may be implemented.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example, embodiments, the following terms are also used herein according to the corresponding meaning, unless the context clearly dictates otherwise.

As used herein the term, "engine" refers to logic embodied in hardware or software instructions, which can be written in a programming language, such as C, C++, Objective-C, COBOL, Java™, PUP, Perl, JavaScript, Ruby, VBScript, Microsoft .NET™ languages such as C#, or the like. An engine may be compiled into executable programs or written in interpreted programming languages. Software engines may be callable from other engines or from themselves. Engines described herein refer to one or more logical modules that can be merged with other engines or applications, or can be divided into sub-engines. The engines can be stored in non-transitory computer-readable medium or computer storage devices and be stored on and executed by one or more general purpose computers, thus creating a special purpose computer configured to provide the engine.

As used herein the terms "data block," "file system block," refer to the portions of data used to store data in a file system. For example, small sized items such as, directories or small files may be comprised of a single block. Whereas larger files, such as large document files may be comprised of many blocks. Blocks usually are arranged to have a fixed size to simplify the management of a file system. This may include fixing blocks to a particular size based on requirements associated with underlying storage hardware, such as, solid state drives (SSDs) or hard disk drives (HDDs), cloud-based block storage, or the like. However, files or other items stored in file systems may be of various sizes, comprised of the number of blocks necessary to represent or contain the data or meta-data for the item.

As used herein the term "block storage" refers to storage device or storage system that stores or manages data using data block-level protocols that enable data to be accessed referenced in terms of fixed size portions. Block storage typically supports random access and often may provide a (in some cases modifiable) fixed capacity. Cloud computing providers may provide one or more block storage services for managing data in a cloud computing environment.

As used herein the term "object store" refers to a storage system that stores or manages data using objects. Objects may be individually sized based on the amount of data they are holding. In most cases, objects in object stores may be considered immutable such that updating a portion of the data included in an object may require the entire object to be replaced in the object store.

As used herein the term "inode" refers to a data structure used by a file system to store information, meta-data, pointers to data, or the like, that file systems may employ to organize or manage file system items stored in the file system. Different file systems may organize or arrange inodes differently, but they generally serve similar purposes across different types of file systems, including providing low-level representations of file system items.

As used herein the term "transaction log" refers to a data structure that persistently records file system operations as log entries to enable high-performance file system consistency across nodes, clusters, or geographically distributed file systems. Transaction logs may be organized using various data structures, such as files, arrays, linked lists, B-trees, log-structured merge trees, database tables, or the like, that enable efficient append operations for new log entries while supporting ordered traversal of existing log entries. Transaction logs may be located on nodes in file system clusters and may be used to replay file system operations on target file systems to maintain consistency across distributed or shared file system infrastructure.

As used herein the term "dependency graph" refers to a directed acyclic graph (DAG) representation of transaction dependencies within a transaction log that enables ordered processing of file system operations across distributed file systems. Dependency graphs may be constructed by treating each log entry as a node in the graph with edges representing dependency relationships between log entries. In some embodiments, a log entry may be considered dependent on another log entry if both log entries reference at least one common inode such that the log entry with the earlier log entry key value serves as a dependency of the log entry with the later log entry key value. Dependency graphs may be represented using various data structures, such as maps keyed by log entry key values with adjacency lists that identify related log entries. Among other things, dependency graphs may enable file system engines to identify independent subgraphs that may be processed in parallel, determine leaf nodes representing log entries with no remaining unapplied dependencies, maintain transaction ordering requirements while maximizing throughput across geographically distributed file system infrastructure, or the like.

As used herein the term "configuration information" refers to information that may include rule based policies, pattern matching, scripts (e.g., computer readable instructions), or the like, that may be provided from various sources, including, configuration files, databases, user input, built-in defaults, or the like, or combination thereof.

As used herein the term "log entry" refers to a data structure in a transaction log that represents a transaction executed on a file system and includes sufficient information to enable the transaction to be replayed on one or more target file systems. Log entries may include a log entry key value that establishes transaction ordering, a list of one or more inodes that were accessed or modified during the transaction (including both read and write operations), and references to transaction data or operation information. Log entries may include various fields or attributes, such as transaction identifiers, operation types, file system addresses, data payloads, timestamps, logical time indicators, dependency information, or the like.

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to managing file system transaction dependencies. In one or more of the various embodiments, a transaction log that includes a plurality of log entries may be obtained such that each log entry may be associated with a transaction that includes one or more file system operations and such that each log entry corresponds to an execution time and one or more inodes associated with its associated transaction.

In one or more of the various embodiments, one or more graphs may be collected based on one or more of the plurality of log entries such that each log entry in a graph shares at least one inode with at least one adjacent log entry in the same graph and such that a root log entry of the graph may be associated with a latest execution time in the graph.

In one or more of the various embodiments, one or more leaf log entries may be collected based on one or more traversals of the one or more graphs.

In one or more of the various embodiments, the one or more leaf log entries may be communicated to a target file system such that the target file system applies each communicated transaction associated with the communicated leaf log entries to execute each file system operation associated with each communicated transaction on the target file system.

In one or more of the various embodiments, a user interface may be obtained that includes one or more display panels for content that includes a transaction log performance metrics and other information associated with the file system such that the content may be dynamically transformed and arranged for display to a user based on one or more of user interaction telemetry, user feedback or a metric.

In one or more of the various embodiments, the traversal of the one or more graphs may include: visiting a number of log entries in each graph until a traversal threshold may be reached; collecting a continuation key associated with a next log entry in each graph; suspending the traversal at each next log entry; resuming the traversal from each next log entry based on the continuation key such that the continuation key enables traversal of each graph.

In one or more of the various embodiments, one or more first log entries may be collected from a first graph of the one or more graphs. In one or more of the various embodiments, one or more second log entries may be collected from a second graph of the one or more graphs such that the first graph and the second graph may be independent based on an intersection of log entry keys in the first graph and the second graph being empty. In one or more of the various embodiments, the one or more first log entries and the one or more second log entries may be communicated to the target file system in parallel such that the target file system applies one or more transactions associated with the one or more first log entries and one or more other transactions associated with the one or more second log entries in parallel.

In one or more of the various embodiments, one or more read operations for another transaction may be collected based on one or more first inodes that may be accessed without modification during the other transaction. In one or more of the various embodiments, one or more write operations for the other transaction may be collected based on one or more second inodes that are modified during the other transaction such that the one or more read operations and the one or more write operations are included in a log entry associated with the other transaction.

In one or more of the various embodiments, an in-flight window that includes a bounded capacity for tracking one or more in-flight log entries pending communication to the target file system may be obtained. In one or more of the various embodiments, one or more candidate log entries for communication to the target file system may be collected. In one or more of the various embodiments, the in-flight window may be used to perform further actions, including: collecting one or more dependency log entries associated with each candidate log entry; adding the one or more candidate log entries to the in-flight window based on the capacity of the in-flight window accommodating the one or more candidate log entries and the one or more dependency log entries to avoid one or more deadlock conditions; or the like.

In one or more of the various embodiments, a first group of one or more log entries may be collected from a first graph of the one or more graphs. In one or more of the various embodiments, a second group of one or more log entries may be collected from a second graph of the one or more graphs. In one or more of the various embodiments, the first group of one or more log entries and the second group of one or more log entries may be combined into a single communication message, wherein the single communication message is communicated to the target file system.

In one or more of the various embodiments, one or more inodes associated with each log entry may be updated to include an associated key value such that the associated key value enables selective collection of one or more log entries associated with a particular inode.

Illustrated Operating Environment

FIG. 1 shows components of one embodiment of an environment in which embodiments of the invention may be practiced. Not all of the components may be required to practice the invention, and variations in the arrangement and type of the components may be made without departing from the spirit or scope of the invention. As shown, system 100 of FIG. 1 includes local area networks (LANs)/wide area networks (WANs)—(network) 110, wireless network 108, client computers 102-105, application server computer 116, file system management server computer 118, or the like.

At least one embodiment of client computers 102-105 is described in more detail below in conjunction with FIG. 2. In one embodiment, at least some of client computers 102-105 may operate over one or more wired or wireless networks, such as networks 108, or 110. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, firewall, client application, media player, mobile telephone, game console, desktop computer, or the like. However, client computers 102-105 are not constrained to these services and may also be employed, for example, as for end-user computing in other embodiments. It should be recognized that more or less client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A web-enabled client computer may include a browser application that is configured to send requests and receive responses over the web. The browser application may be configured to receive and display graphics, text, multimedia, and the like, employing virtually any web-based language. In one embodiment, the browser application is enabled to employ JavaScript, HyperText Markup Language (HTML), eXtensible Markup Language (XML), JavaScript Object Notation (JSON), Cascading Style Sheets (CSS), or the like, or combination thereof, to display and send a message. In one embodiment, a user of the client computer may employ the browser application to perform various activities over a network (online). However, another application may also be used to perform various online activities.

Client computers 102-105 also may include at least one other client application that is configured to receive or send content between another computer. The client application may include a capability to send or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), a client certificate, or other device identifier. Such information may be provided in one or more network packets, or the like, sent between other client computers, application server computer 116, file system management server computer 118, or other computers.

Client computers 102-105 may further be configured to include a client application that enables an end-user to log into an end-user account that may be managed by another computer, such as application server computer 116, file system management server computer 118, or the like. Such an end-user account, in one non-limiting example, may be configured to enable the end-user to manage one or more online activities, including in one non-limiting example, project management, software development, system administration, configuration management, search activities, social networking activities, browse various websites, communicate with other users, or the like. Also, client computers may be arranged to enable users to display reports, interactive user-interfaces, or results provided by application server computer 116, file system management server computer 118, or the like.

Wireless network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client computers 103-105 and another computer, network, a cloud-based network, a cloud instance, or the like.

Network 110 is configured to couple network computers with other computers, including, application server computer 116, file system management server computer 118, client computers 102, and client computers 103-105 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, Ethernet port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information of an Internet Protocol (IP).

Additionally, communication media typically embodies computer readable instructions, data structures, program modules, or other transport mechanisms and includes any information non-transitory delivery media or transitory delivery media. By way of example, communication media includes wired media such as twisted pair, coaxial cable, fiber optics, wave guides, and other wired media and wireless media such as acoustic, RF, infrared, and other wireless media.

Also, one embodiment of file system management server computer 118 is described in more detail below in conjunction with FIG. 3. Although FIG. 1 illustrates file system management server computer 118, or the like, each as a single computer, the innovations or embodiments are not so limited. For example, one or more functions of file system management server computer 118, or the like, may be distributed across one or more distinct network computers. Moreover, in one or more embodiments, file system management server computer 118 may be implemented using a plurality of network computers. Further, in one or more of the various embodiments, file system management server computer 118, or the like, may be implemented using one or more cloud instances in one or more cloud networks. Accordingly, these innovations and embodiments are not to be construed as being limited to a single environment, and other configurations, and other architectures are also envisaged.

Illustrative Client Computer

Figure 2:
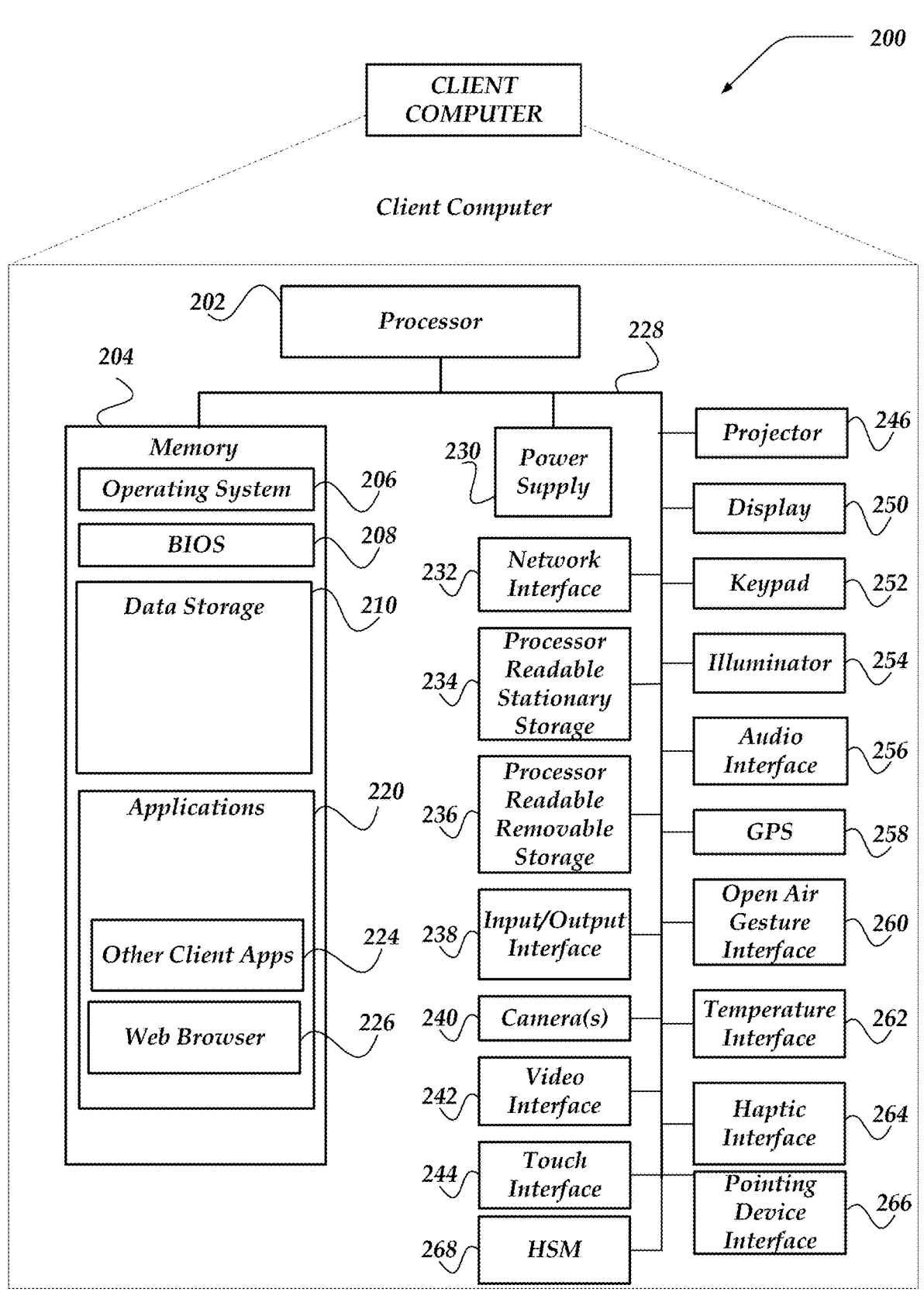
FIG. 2 illustrates a schematic embodiment of a client computer.

FIG. 2 shows one embodiment of client computer 200 that may include many more or less components than those shown. Client computer 200 may represent, for example, one or more embodiments of mobile computers or client computers shown in FIG. 1.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope may be employed within client computer 200 to measure or maintain an orientation of client computer 200.

Power supply 230 may provide power to client computer 200. A rechargeable or non-rechargeable battery may be used to provide power. The power may also be provided by an external power source, such as an AC adapter or a powered docking cradle that supplements or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, EDGE, WCDMA, LTE, UMTS, OFDM, CDMA2000, EV-DO, HSDPA, 5G, or any of a variety of other wireless communication protocols. Network interface 232 is sometimes known as a transceiver, transceiving device, or network interface card (NIC).

Audio interface 256 may be arranged to produce and receive audio signals such as the sound of a human voice. For example, audio interface 256 may be coupled to a speaker and microphone (not shown) to enable telecommunication with others or generate an audio acknowledgment for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication or provide light. Illuminator 254 may remain active for specific periods of time or in response to event messages. For example, when illuminator 254 is active, it may back-light the buttons on keypad 252 and stay on while the client computer is powered. Also, illuminator 254 may back-light these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing or using security/cryptographic information such as, keys, digital certificates, passwords, passphrases, two-factor authentication information, or the like. In some embodiments, hardware security modules may be employed to support one or more standard public key infrastructures (PKI), and may be employed to generate, manage, or store keys pairs, or the like. In some embodiments, HSM 268 may be a stand-alone computer, in other cases, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, virtual reality headsets, display screen glasses, remote speaker system, remote speaker and microphone system, and the like. Input/output interface 238 can utilize one or more technologies, such as Universal Serial Bus (USB), Infrared, WiFi, WiMax, Bluetooth™, and the like.

Input/output interface 238 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to client computer 200.

Haptic interface 264 may be arranged to provide tactile feedback to a user of the client computer. For example, the haptic interface 264 may be employed to vibrate client computer 200 in a particular way when another user of a computer is calling. Temperature interface 262 may be used to provide a temperature measurement input or a temperature changing output to a user of client computer 200. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

GPS transceiver 258 can determine the physical coordinates of client computer 200 on the surface of the Earth, which typically outputs a location as latitude and longitude values. GPS transceiver 258 can also employ other geopositioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In one or more embodiments, however, client computer 200 may, through other components, provide other information that may be employed to determine a physical location of the client computer, including for example, a Media Access Control (MAC) address, IP address, and the like.

In at least one of the various embodiments, applications, such as, operating system 206, other client apps 224, web browser 226, or the like, may be arranged to employ geo-location information to select one or more localization features, such as, time zones, languages, currencies, calendar formatting, or the like. Localization features may be used in display objects, data models, data objects, userinterfaces, reports, as well as internal processes or databases. In at least one of the various embodiments, geo-location information used for selecting localization information may be provided by GPS 258. Also, in some embodiments, geolocation information may include information provided using one or more geolocation protocols over the networks, such as, wireless network 108 or network 111.

Human interface components can be peripheral devices that are physically separate from client computer 200, allowing for remote input or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that is configured to receive and to send web pages, web-based messages, graphics, text, multimedia, and the like. The client computer's browser application may employ virtually any programming language, including a wireless application protocol messages (WAP), and the like. In one or more embodiments, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 204 may include RAM, ROM, or other types of memory. Memory 204 illustrates an example of computer-readable storage media (devices) for storage of information such as computer-readable instructions, data structures, program modules or other data. Memory 204 may store BIOS 208 for controlling low-level operation of client computer 200. The memory may also store operating system 206 for controlling the operation of client computer 200. It will be appreciated that this component may include a general-purpose operating system such as a version of UNIX, or Linux®, or a specialized client computer communication operating system such as Windows Phone™, or the Symbian® operating system. The operating system may include, or interface with a Java virtual machine module that enables control of hardware components or operating system operations via Java application programs.

Memory 204 may further include one or more data storage 210, which can be utilized by client computer 200 to store, among other things, applications 220 or other data. For example, data storage 210 may also be employed to store information that describes various capabilities of client computer 200. The information may then be provided to another device or computer based on any of a variety of methods, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by a processor, such as processor 202 to execute and perform actions. In one embodiment, at least some of data storage 210 might also be stored on another component of client computer 200, including, but not limited to, nontransitory processor-readable removable storage device 236, processor-readable stationary storage device 234, or even external to the client computer. In some embodiments, processor-readable stationary storage device 234 or processor-readable removable storage device 236 may be considered a processor or computer readable non-transitory storage media that includes instructions configured for obtaining dynamic investigation playbooks in a computing environment such that execution of the instructions by one or more processors on one or more network computers performs actions described herein.

Applications 220 may include computer executable instructions which, when executed by client computer 200, transmit, receive, or otherwise process instructions and data. Applications 220 may include, for example, other client applications 224, web browser 226, or the like. Client computers may be arranged to exchange communications with one or more servers.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, visualization applications, and so forth.

Additionally, in one or more embodiments (not shown in the figures), client computer 200 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic 16 to perform actions. Also, in one or more embodiments (not shown in the figures), client computer 200 may include one or more hardware micro-controllers instead of CPUs. In one or more embodiments, the one or more micro-controllers may directly execute their own embedded logic to perform actions and access its own internal memory and its own external Input and Output Interfaces (e.g., hardware pins or wireless transceivers) to perform actions, such as System On a Chip (SOC), or the like.

Illustrative Network Computer

FIG. 3 shows one embodiment of network computer 300 that may be included in a system implementing one or more of the various embodiments. Network computer 300 may include many more or less components than those shown in FIG. 3. However, the components shown are sufficient to disclose an illustrative embodiment for practicing these innovations. Network computer 300 may represent, for example, one or more embodiments of a file system management server computer such as file system management server computer 118, or the like, of FIG. 1.

Network computers, such as, network computer 300 may include a processor 302 that may be in communication with a memory 304 via a bus 328. In some embodiments, processor 302 may be comprised of one or more hardware processors, or one or more processor cores. In some cases, one or more of the one or more processors may be specialized processors designed to perform one or more specialized actions, such as, those described herein. Network computer 300 also includes a power supply 330, network interface 332, audio interface 356, display 350, keyboard 352, input/output interface 338, processor-readable stationary storage device 334, and processor-readable removable storage device 336. Power supply 330 provides power to network computer 300. In some embodiments, processor-readable stationary storage device 334 or processor-readable removable storage device 336 may be considered a processor readable or computer readable non-transitory storage media that includes instructions configured for obtaining dynamic investigation playbooks in a computing environment such that execution of the instructions by one or more processors on one or more network computers performs actions described herein.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra-wide band (UWB), IEEE 802.16 Worldwide Interoperability for Microwave Access (WiMax), Session Initiation Protocol/Real-time Transport Protocol (SIP/RTP), 5G, or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others or generate an audio acknowledgment for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. In some embodiments, display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi, WiMax, Thunderbolt™, Infrared, Bluetooth™, Zigbee™, serial port, parallel port, and the like.

Also, input/output interface 338 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to network computer 300. Human interface components can be physically separate from network computer 300, allowing for remote input or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

GPS transceiver 340 can determine the physical coordinates of network computer 300 on the surface of the Earth, which typically outputs a location as latitude and longitude values. GPS transceiver 340 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 340 can determine a physical location for network computer 300. In one or more embodiments, however, network computer 300 may, through other components, provide other information that may be employed to determine a physical location of the client computer, including for example, a Media Access Control (MAC) address, IP address, and the like.

In at least one of the various embodiments, applications, such as, operating system 306, file system engine 322, web services 329, or the like, may be arranged to employ geo-location information to select one or more localization features, such as, time zones, languages, currencies, currency formatting, calendar formatting, or the like. Localization features may be used in user interfaces, dashboards, reports, as well as internal processes or databases. In at least one of the various embodiments, geo-location information used for selecting localization information may be provided by GPS 340. Also, in some embodiments, geolocation information may include information provided using one or more geolocation protocols over the networks, such as, wireless network 108 or network 111.

Memory 304 may include Random Access Memory (RAM), Read-Only Memory (ROM), or other types of memory. Memory 304 illustrates an example of computer-readable storage media (devices) for storage of information such as computer-readable instructions, data structures, program modules or other data. Memory 304 stores a basic input/output system (BIOS) 308 for controlling low-level operation of network computer 300. The memory also stores an operating system 306 for controlling the operation of network computer 300. It will be appreciated that this component may include a general-purpose operating system such as a version of UNIX, or Linux®, or a specialized operating system such as Microsoft Corporation's Windows® operating system, or the Apple Corporation's macOS® operating system. The operating system may include, or interface with one or more virtual machine modules, such as, a Java virtual machine module that enables control of hardware components or operating system operations via Java application programs. Likewise, other runtime environments may be included.

Memory 304 may further include one or more data storage 310, which can be utilized by network computer 300 to store, among other things, applications 320 or other data. For example, data storage 310 may also be employed to store information that describes various capabilities of network computer 300. The information may then be provided to another device or computer based on any of a variety of methods, including being sent as part of a header during a communication, sent upon request, or the like. Data storage 310 may also be employed to store social networking information including address books, friend lists, aliases, user profile information, or the like. Data storage 310 may further include program code, data, algorithms, and the like, for use by a processor, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, file storage 314, file system logs (including transaction logs) 316, or the like.

Applications 320 may include computer executable instructions which, when executed by network computer 300, transmit, receive, or otherwise process messages (e.g., SMS, Multimedia Messaging Service (MMS), Instant Message (IM), email, or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include file system engine 322, web services 329, or the like, that may be arranged to perform actions for embodiments described below. In one or more of the various embodiments, one or more of the applications may be implemented as modules or components of another application. Further, in one or more of the various embodiments, applications may be implemented as operating system extensions, modules, plugins, or the like.

Furthermore, in one or more of the various embodiments, file system engine 322, web services 329, or the like, may be operative in a cloud-based computing environment. In one or more of the various embodiments, these applications, and others, that comprise the management platform may be executing within virtual machines or virtual servers that may be managed in a cloud-based based computing environment. In one or more of the various embodiments, in this context the applications may flow from one physical network computer within the cloud-based environment to another depending on performance and scaling considerations automatically managed by the cloud computing environment. Likewise, in one or more of the various embodiments, virtual machines or virtual servers dedicated to file system engine 322, web services 329, or the like, may be provisioned and de-commissioned automatically.

Also, in one or more of the various embodiments, file system engine 322, web services 329, or the like, may be located in virtual servers running in a cloud-based computing environment rather than being tied to one or more specific physical network computers.

Further, network computer 300 may also comprise hardware security module (HSM) 360 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 360 may be a stand-alone network computer, in other cases, HSM 360 may be arranged as a hardware card that may be installed in a network computer.

Additionally, in one or more embodiments (not shown in the figures), network computer 300 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include one or more hardware microcontrollers instead of a CPU. In one or more embodiments, the one or more microcontrollers may directly execute their own embedded logic to perform actions and access their own internal memory and their own external Input and Output Interfaces (e.g., hardware pins or wireless transceivers) to perform actions, such as System On a Chip (SOC), or the like.

Illustrative Logical System Architecture

Figure 4:
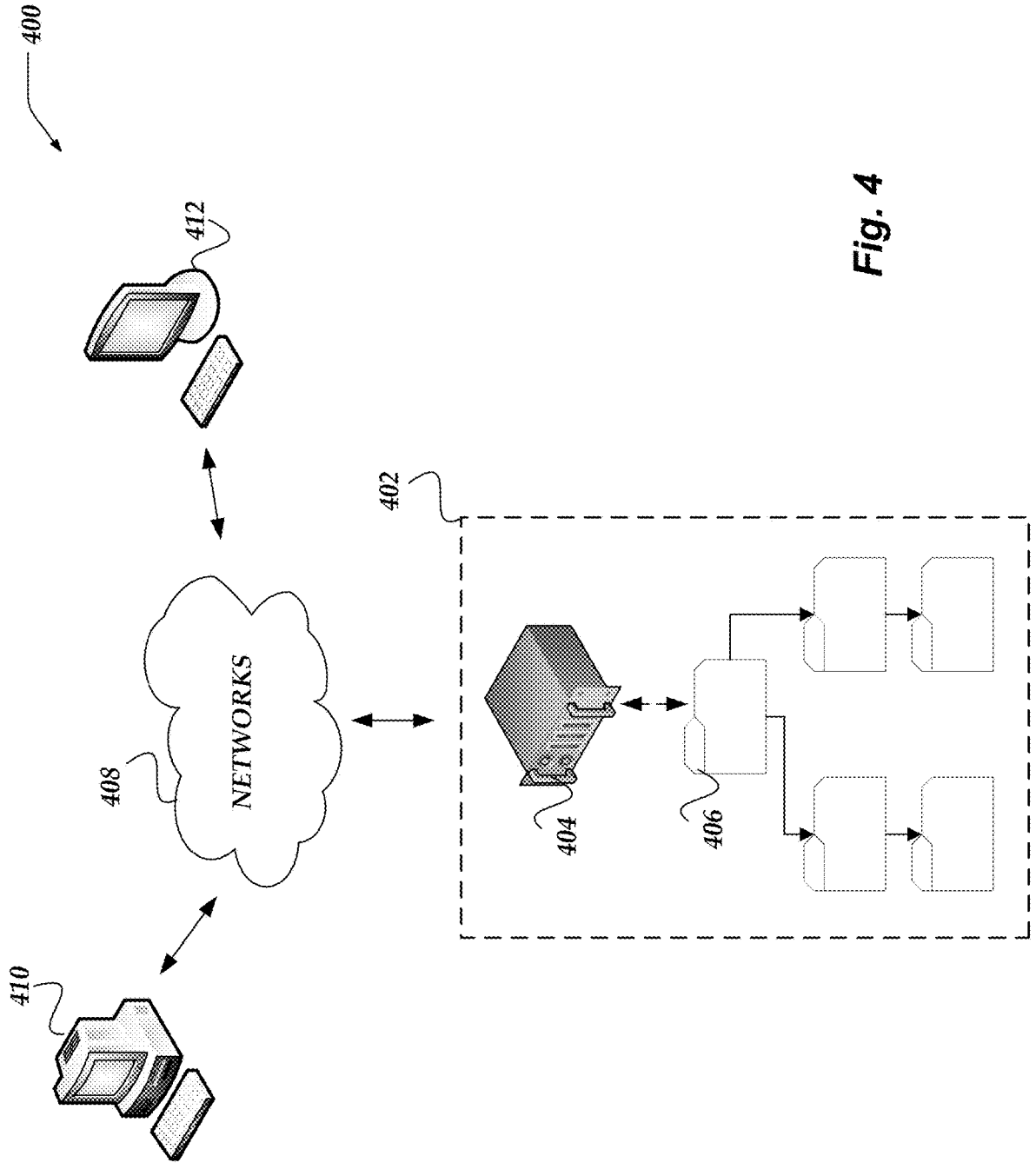
FIG. 4 illustrates a logical architecture of a system for managing file system transaction dependencies in accordance with one or more of the various embodiments.

FIG. 4 illustrates a logical architecture of system 400 for managing file system transaction dependencies in accordance with one or more of the various embodiments. In one or more of the various embodiments, one or more file systems, such as, file system 402 may be arranged to be communicatively coupled to one or more networks, such as, networks 408. Accordingly, in one or more of the various embodiments, one or more clients, such as, client computer 410 or client computer 412 may be arranged to access file system 402 over networks 408. In some embodiments, clients of file system 402 may include users, services, programs, computers, devices, or the like, that may be enabled to perform one or more data related operations, such as, creating, reading, updating, moving, renaming, or deleting data (e.g., files, directories, documents, file system meta-data, or the like) that may be stored in file system 402.

In some embodiments, file system 402 may comprise one or more file system management computers, such as file system management computer 404. Also, in one or more of the various embodiments, file systems, such as file system 402 may include one or more file system items, such as item 406. In one or more of the various embodiments, item 406 may be considered to represent the various file system items, such as, documents, files, or the like, that may be stored in file system 402. In some embodiments, file system items may include, files, documents, directories, folders, backups, snapshots, or the like. In some embodiments, some file system items may be comprised of smaller file system items. Accordingly, in some embodiments, blocks or data blocks may be considered to be file system items that comprise other more complex file system items, such as, files, documents, or the like.

In some embodiments, file system management computers may be automatically selected from among the one or more cluster nodes in a distributed file system rather than being reserved to a particular computer or cluster node. Accordingly, in some embodiments, if a file system management computer may be needed, cluster nodes may be arranged to elect a file system management computer from among their peer nodes.

In one or more of the various embodiments, the implementation details that enable file system 402 to provide file system services may be hidden from clients, such that they may use file system 402 the same way they use other conventional local or remote file systems. Accordingly, in one or more of the various embodiments, clients may be unaware that they are using a distributed file system that supports managing file system transaction dependencies because file system engines may be arranged to mimic the interface or behavior of one or more conventional file systems.

Also, while file system 402 is illustrated as using one file system management computer with one set of file system items, one of ordinary skill in the art will appreciate that these innovations are not so limited. Innovations herein contemplate file systems that may include one or more file system management computers or one or more file system item data stores. In some embodiments, file system items may be located remotely from one or more file system management computers. Also, in some embodiments, file systems may be spread across cloud computing environments, cloud environment geographic regions, storage clusters, disparate data centers, or the like.

Figure 5:
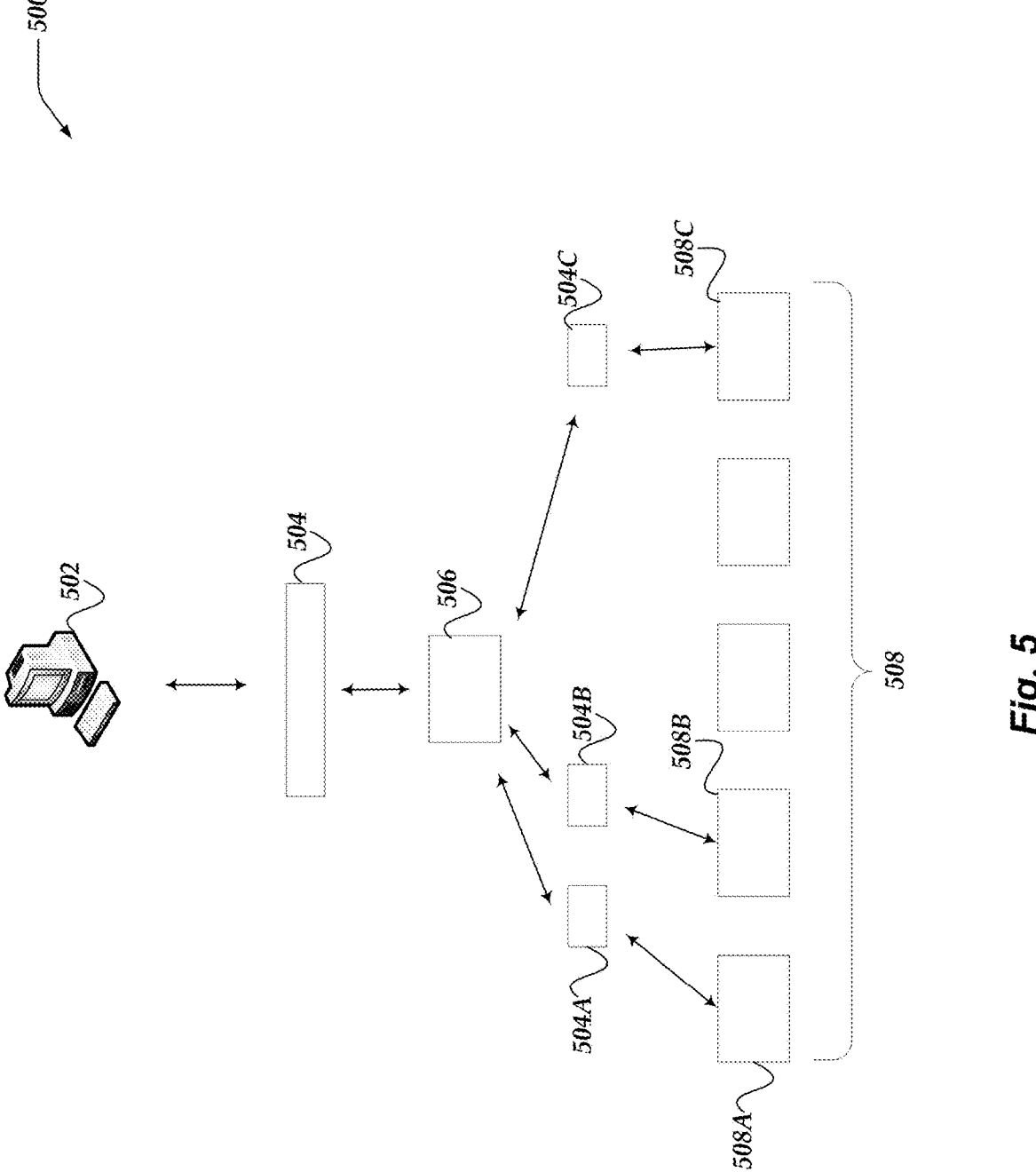
FIG. 5 illustrates a logical schematic of a file system for managing file system transaction dependencies in accordance with one or more of the various embodiments.

FIG. 5 illustrates a logical schematic of file system 500 for managing file system transaction dependencies in accordance with one or more of the various embodiments. FIG. 5 is provided to help illustrate how file system-wide command transactions may be broken down into parts (e.g., requests) that may be distributed to different nodes or protection stores in distributed file systems. Note, in this example, a protection store may be considered a portion of addressable file system storage that may be available in a file system. In some embodiments, each protection store may represent a portion of the address space of a given file system. In some embodiments, protection stores may be allocated or distributed according to one or more data protection schemes, striping schemes, RAID configurations, or the like, that may provide a desired level of data protection, performance, high-availability, or the like, that may vary depending on the given file system.

In some embodiments, file system clients, such as file system client 502 may be enabled to issue various file system commands (e.g., read file, remove file, move file, rename file, save file, or the like) to a file system engine that may initiate one or more command transactions. Accordingly, in some embodiments, file system engines may be arranged to determine which portion of the command transaction may be satisfied by which of the various nodes or protection stores in the greater file system. In some embodiments, portions of the command transaction may be provided to designated nodes or protection stores as directed by file system engines as read requests or write requests. In some embodiments, if each request associated with a command transaction may be completed, the command transaction may be considered committed. Similarly, in some embodiments, if one or more requests (portions of the command transaction) fail to commit locally in their designated node or protection store, the other requests associated with the same command transaction that may have locally succeeded may be rolled back.

In this example, for some embodiments, file system client 502 may submit a file system command to file system engine 506 that initiates a command transaction, such as, as transaction 504. In practice, command transaction 504 may be a read transaction or a write transaction. Accordingly, in some embodiments, read transactions may be directed to reading file system items (e.g, files, documents, directory listings, or the like) from the file system. Likewise, in some embodiments, write transactions may be providing data to be stored as file system items in the file system, modifying existing file system items, or deleting existing file system items.

In some embodiments, file system engines, such as file system engine 506 may receive transaction 504. Accordingly, in some embodiments, file system engine 506 may be arranged to divide the transaction across one or more protection stores, cluster nodes, or the like. Note, different file systems may employ different or distinct strategies for data protection, parallelism, high-availability, or the like, that may influence how the work or data for command transactions may be distributed in a file system. Thus, for brevity, details of these various data protection strategies or performance strategies are omitted here.

In this example, for some embodiments, request 504A, request 504B, and request 504C may represent portions of command transaction 504 that may be distributed to different nodes or protection stores in a file system.

Accordingly, in some embodiments, nodes/protection stores 508 may be provided requests that may be part of the larger command transaction. In this example, for some embodiments, node/protection store 508A, node/protection store 508B, and node/protection store 508C may be selected for servicing the requests that make up command transaction 504.

In some cases, for some embodiments, nodes/protection stores may receive read requests that may be requesting one or more data blocks as defined by file system addresses, address ranges, or the like. Accordingly, in some embodiments, the nodes/protection stores may be arranged to locate and load the data blocks for the read requests they may be directed to service. These data blocks may be returned to contribute to completing the entire read transaction. In some embodiments, if each read request completes successfully, the read transaction may be considered successful and the data blocks provided for the read requests may be returned to the calling client.

Similarly, some requests may be write requests for a write command transaction. Accordingly, in some embodiments, each write request may include one or more data blocks to store at the determined node/protection store. Also, in some embodiments, delete operations may be considered write requests. However, delete requests may include information about which data blocks are to be deleted rather than including the data blocks themselves. If each write request succeeds the write transaction may be considered successful. Accordingly, the file system may provide an acknowledgment to the file system client that the write transaction completed successfully. In some embodiments, if one or more of the write requests fail, the write transaction may be considered failed. Accordingly, in some embodiments, any associated successful write requests associated with the failed transaction may be determined and rolled back.

Further, in some embodiments, each single node may include or be associated with multiple storage drives/disks, cloud-based block storage devices, object stores, or the like. Thus, in some cases, multiple protection stores may be allocated on the same node such that the separate protection stores may be distributed across different storage systems (e.g., disks, cloud-based block storage, objects, or the like) associated with the single node.

Note, in some embodiments, file systems may be arranged to include a single node/protection store such that each transaction may essentially be considered a request.

For brevity and clarity, innovations disclosed herein are generally described in the context of a single node/protection store that is handling read requests or write requests that may be part of larger read transaction or write transaction. Accordingly, in some embodiments, mechanisms, such as those associated with allocating protection stores across a file system, data protection (e.g., erasure coding), encryption, rebalancing of data stored in a file system, routing requests, dividing transactions into requests, or the like, are omitted. One of ordinary skill in the art will appreciate that disclosures herein are at least sufficient for integrating the disclosed and recited innovations into a wide variety of file systems or file system architectures.

FIG. 6 illustrates a logical schematic of distributed file system 600 for managing file system transaction dependencies in accordance with one or more of the various embodiments. File systems are described in more detail in FIG. 4. In some embodiments, two or more separate file systems, such as, file system 602A, file system 604A, file system 606A, or the like, may be configured with hub and spoke relationships. In some embodiments, hub file systems may be configured to allow one or more spoke file systems to access particular portions of the hub file system. In some embodiments, spoke file systems may be remote or otherwise separate from the hub file system. Note, the term spoke file system denotes a file system that includes a spoke relationship with a hub file system. Accordingly, in some embodiments, spoke file systems may be considered to include (or enable access to) spoke items shared from a hub as well as one or more local file system items. In some embodiments, the particular file system items shared from a hub file system may be referred to as spoke items in a spoke file system. Note, in some embodiments, each separate file system may have its own separate file system engine.

In one or more of the various embodiments, spoke file systems may share one or more portions of the namespace and data with their corresponding hub(s). In one or more of the various embodiments, hub file systems may be configured to share file system items with one or more spoke file systems. Accordingly, in this example, spoke 612A and spoke 614A may each represent file system items shared from hub file system 602A.

In one or more of the various embodiments, spokes may enable file system items from the hub to be accessed by clients as if the shared file system items were stored locally in the spoke file system. In one or more of the various embodiments, each spoke file system may be configured to access the same or different portions of the same hub file system. In this example, for some embodiments, directory 602B may represent the root of hub file system 602A, directory 604B may represent the root directory of file system 604A, and directory 606B may represent the root directory of file system 606A. Likewise, in this example, directory 608B may represent directory 608A and directory 610B may represent directory 610A in a simplified tree illustration.

In some embodiments, file system engines may be arranged to provide one or more user interfaces that enable file system administrators to establish hub-spoke relationships. In some embodiments, file system administrators that intend to establish a spoke in their local file system may submit a request to the administrator of the file system intended to be the hub for the impending spoke. Accordingly, in some embodiments, upon acknowledgment and approval by the hub file system administrators, file system engines may be arranged to establish the requested hub-spoke relationship. In some embodiments, administrators requesting to create a spoke may declare a local mount point in the spoke file system where file system items shared from hub file system will be located in the spoke file system.

In some embodiments, if a spoke may be established, users may observe and use the file system items included in the spoke as if they were located in their file system. In this example, directory 612B may appear to users of file system 604B as if it is part of the local file system even though it is a spoke from hub file system 602A. Likewise, in this example, directory 614B may appear to users of file system 606B as if it may be local to file system 606A.

In one or more of the various embodiments, file system engines may be arranged to enable the same portion of a hub file system to be shared with two or more spokes. Also, in some embodiments, file system engines may be arranged to enable spokes or portions of spoke file systems to act as hubs that share one or more portions of a spoke file systems to other file system as a spoke. Thus, in some embodiments, a given file system may be configured to be spoke file system and a hub file system at the same time. In some cases, for some embodiments a spoke file system may be configured to share some or all items in a spoke (e.g., items shared to it from another hub) with other file systems. In this case, for some embodiments, the spoke file system may become a hub file system for another spoke file system even though it may be sharing file system items from a local spoke with another spoke file system.

For example, a hub may provide file system items for a first spoke and that first spoke may be configured to act as hub for a second spoke. In general, the number of 'chained' spokes may be unbounded. However, in some embodiments, file system policies may be configured to limit the length of hub-spoke-spoke chains. Likewise, in some embodiments, file system policies may be configured to limit or restrict self-referencing spokes, cyclic/loop configurations, or the like.

Further, in some embodiments, file system engines may be arranged to provide user interfaces that enable administrators to establish file system policies that exclude portions of file systems from sharing file system items for spokes.

In one or more of the various embodiments, if users access file system items via a spoke, file system engines may be arranged to determine which portions of the file system items that user may be accessing and obtain a lock from a distributed lock manager to enable access to the file system items. In some embodiments, locks may be fine grained such that the 'size' of the lock may be restricted to an amount of data that may be copied from the corresponding hub file system in a given time.

Figure 7:
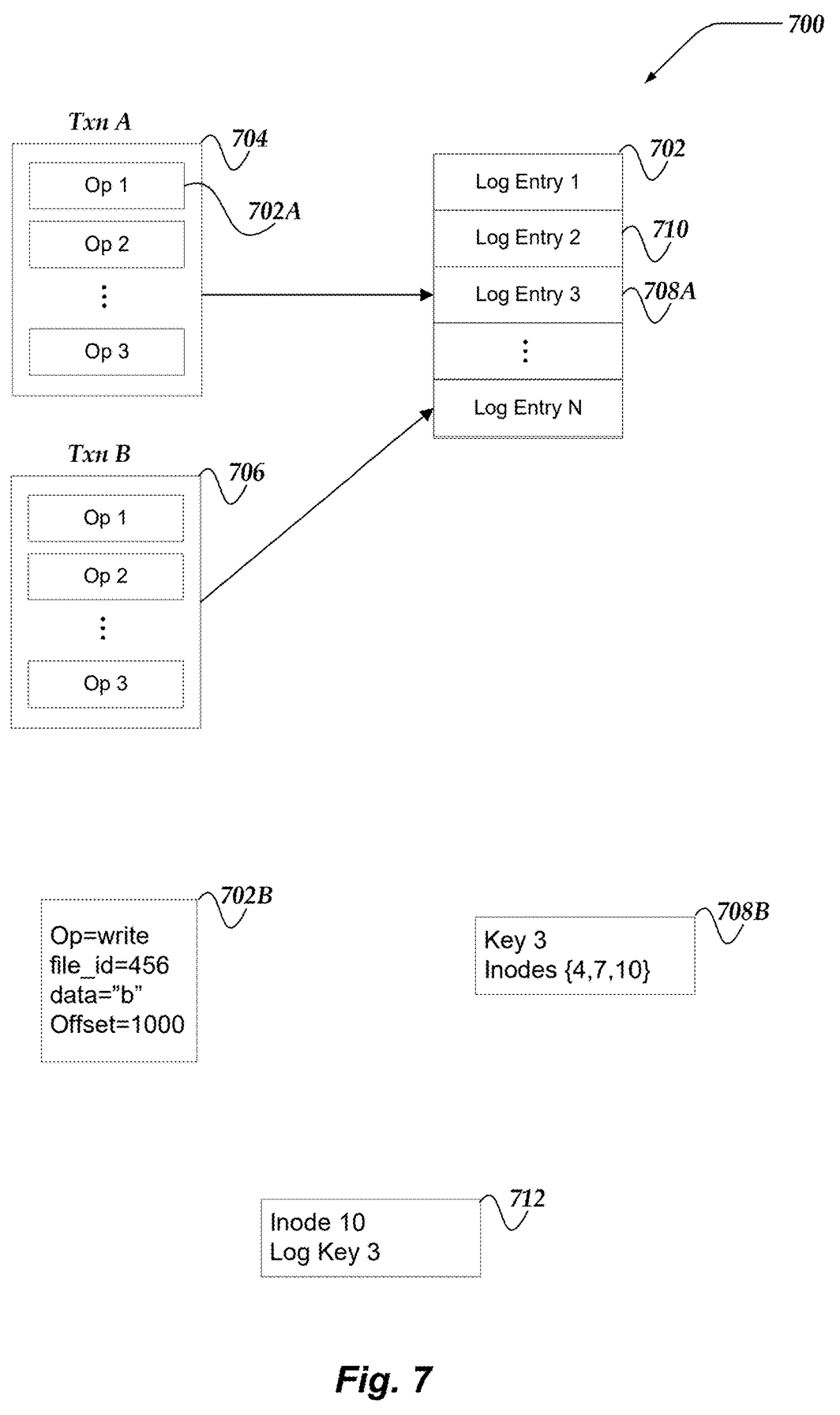

FIG. 7 illustrates an logical schematic for system 700 for managing file system transaction dependencies in accordance with one or more of the various embodiments.

As described above, file systems may be distributed logically (e.g., via network configuration) or geographically. In some cases, high availability clusters may be distributed across different data centers, locations, networks, or the like. Accordingly, in some embodiments, a critical feature of file systems may include a transaction log system that may be used for (among other things) providing high performance file system consistency across nodes, clusters, spoke file systems, hub systems, or the like.

In some embodiments, transaction logs, such as transaction log 702 may be located on nodes in file system clusters. In some embodiments, each node may maintain its own transaction log. Also, in some embodiments, one or more nodes may be configured to share a transaction log. The particular transaction log configuration may vary depending on local requirements, local circumstances, one or more qualities of the particular file system, or the like. In some embodiments, transaction logs may be considered to be part of file system engines or otherwise available to file system engines.

In one or more of the various embodiments, transaction log 702 may be arranged to record one or more file system operations as log entries. The one or more file system operations may be organized into transactions that are added to transaction logs. In some embodiments, the data structures used for implementing transaction logs may vary depending on local requirements or file system architectures. For example, for some embodiments, transaction logs may be implemented using data structures, such as files, arrays, lists, B-trees, database tables, or the like. In this example, for brevity or clarity, transaction log 702 is represented as a list.

In this example, for some embodiments, transactions, such as transaction 704 or transaction 706 may be considered to be file system transactions that include one or more file system operations. In this example, file system operation 702A represents a file system operation that may be one or more of a read operation, write operation, move operation, meta-data update, or the like. In some embodiments, the determination of the exact file system operations that may be included in a transaction may depend on the requirements or configuration of the particular file system employing the transaction log. However, it may be assumed that every file system operation executed on a shared or spoke file system, including read operations, may be organized as transactions that include at least one file system operation. Here, the details of organizing file system operations into transactions is omitted for brevity or clarity. However, one of ordinary skill in the art will appreciate the descriptions included herein are at least sufficient for providing enablement of the disclosed innovations for managing file system transaction dependencies.

Accordingly, in some embodiments, in this example, file system operation 702B may illustrate a data structure that includes various information or data associated with a file system operation. In some embodiments, each file system operation associated with a transaction may be represented in the same log entry. In this example, file system operation 702B represents a write operation that writes the data "b" to a file system item with a file identifier of 456 at location offset 1000 within the file system item. This represents that data is intended to be written to a file in a shared or spoke file system. There may be similar file system operations for reads, renames, moves, creating directories, or other file system operations. However, one of ordinary skill in the art will appreciate that the data structures for different types of file system operations may include different fields or values than those described here without departing from the scope of the innovations disclosed herein.

Accordingly, in some embodiments, transaction logs, such as transaction log 702 may include at least one log entry for each transaction. In this example, transaction log 702 includes log entries 1-3, . . . N where log entry 708A represents the log entry for a single transaction.

In some embodiments, log entry 708B may be considered to correspond to log entry 708A. In some embodiments, log entries may include or reference their corresponding transaction. Further, in some embodiments, each log entry may be associated with a key value that may be used to identify a log entry in a transaction log. In some embodiments, keys may be provided by file system engines as log entries are generated. One of ordinary skill in the art will appreciate that file systems or file system engines may employ various methods for assigning key values to transaction log entries without departing from the scope of these disclosed innovations. For example, a distributed file system may employ various methods for associating key values with transaction log entries, such as monotonically increasing counters, physical clock timestamps, hybrid logical clocks, Lamport logical clocks, various composite keys, vector clocks, or the like. Each mechanism for providing transaction log entry keys may have different benefits or drawbacks but here it may be assumed they enable the assignment of key values to log entries that correspond to the order the transactions occurred in the file system. Note, in some cases, log entries may arrive to transaction logs out of order, but the assigned key will still represent the order the file system transaction occurred. For example, log entry 708A may be recorded in log 702 before log entry 710 was recorded in the same log. However, the assigned key values may be assumed to represent the sequence that the operations occurred in the file system.

Also, in some embodiments, log entries, such as log entry 708B may include the set of inodes that were affected by the operations associated with the transaction. In this example, for some embodiments, log entry 708B indicates that inode 4, inode 7, and inode 10 were impacted by log entry 3. Note, one of ordinary skill in the art will appreciate that inodes or inode-like data structures may represent data structures used for storing information, meta-data, pointers to data, or the like that file systems use to organize or manage data stored in file systems. Different file systems may organize or arrange inodes differently, but they generally serve the same purpose across different types of file systems, such as providing low level representations or information about file system items.

Further, in some embodiments, file system engines may be arranged to update each inode (or inode-like data structures) associated with transactions with the transaction log entry key associated with the most recent change to the inode. In some cases, inodes may be stored in caches on spoke file systems before being flushed to a home hub file system. In other cases, the inodes may be stored as usual data blocks in the file system with the last log entry key stored in inode meta-data. In this example, for some embodiments, inode 712 represents a portion of an inode data structure that includes the identifier of the inode and a log key associated with the most recent transaction that modified the inode. One of ordinary skill in the art will appreciate that inodes may be data structures for storing/managing information or data associated with file system items arranged for to meet the requirements of particular file systems.

In some embodiments, file system engines may be arranged to employ log entries representing operations directed to source file system (spoke file systems) to keep target file systems (hub file systems) consistent such that operations performed on spoke file systems may be consistently reflected on the hub file systems. Accordingly, in some embodiments, file system engines may be arranged to apply log entries to target file system. In some embodiments, applying a log entry includes executing the file system operations represented by the log entry on the target file system. Note, one of ordinary skill in the art will appreciate that apply a log entry to a target file system may include communicating the log entry over a network to a file system engine on the target file system such that the target file system engine may execute the included file system operations on the target file system.

Also, one of ordinary skill in the art will appreciate that file system operations, transactions, log entries, inodes, or the like may be represented using various data structures rather than being limited to the data structures illustrated here. Further, in some embodiments, file system operations, transactions, log entries, inodes, or the like may include different or various information depending on the implementation details of the particular file system. For example, some file systems may support different file system operations than other file systems. Likewise, for example, inodes may include one or more additional fields for representing other information or meta-data, such as file type, file size, various timestamps (e.g., last access time, last modification time, or the like), lock/lease information, file system policy indicators, or the like. For brevity and brevity additional details of these types of file system data structures is omitted here. However, one of ordinary skill in the art will appreciate that these disclosures are at least sufficient for enabling the innovations disclosed herein.

Further, one of ordinary skill in the art will appreciate that transaction logs or transaction log systems may include other features, such as distributed locking, data protection, buffering, caching, or the like for implementing distributed file systems that for brevity and clarity are omitted from this disclosure as different file systems may employ different techniques or methods for implementing transaction logs depending on the requirements or circumstances for those particular file systems.

FIG. 8 illustrates a logical schematic for system 800 for managing file system transaction dependencies in accordance with one or more of the various embodiments.

As described above, file system engines may be arranged to use transaction logs to support consistency or performance in distributed file systems. For example, absent transaction logs, file system clients of remote or distance file system may experience undesirable latency while waiting for file system operations to be persisted. In contrast, for some embodiments, using local or relatively local transaction logs that guarantee persistence of file system operations may improve file system client performance in remote file systems or widely distributed systems.

In this example, for some embodiments, transaction log 802A represents a transaction log for a spoke file system or other remote portion of a file system. In some embodiments, it may be assumed that if transactions are added to a transaction log, the underlying operations may be preserved or recovered using the data protection services of the file system. Thus, in some embodiments, if the file system transaction is recorded in the transaction log, the file system client may consider that the transaction has been committed to storage in a data protected/persistent state. Accordingly, in some embodiments, file system engines may be arranged to perform various operations to apply the transactions in the log entry to hub file systems or other target file systems without interrupting or otherwise disturbing the file system or other file system clients. Note, as mentioned this may include using distributed locking, cache management, network communications, or the like that may be considered beyond scope of these innovations for managing file system transaction dependencies.

Accordingly, for some embodiments, transaction log 802A may include one or more transaction log entries, such as log entry 804A, log entry 806A, log entry 808A, log entry 810A, log entry 812A, or the like. In this example, each log entry is associated with a key or log entry key that corresponds to the order the transaction represented by the log entry was executed in the file system. For example, log entry 804A has a Key of 1 indicating that it was executed before the transaction represented by log entry 806A was executed because log entry 806A has a key value of 2 which is greater than the key value for log entry 804A which is key value 1.

Further, as mentioned above, in addition to log key values, log entries may include or reference a list of the inodes that were involved in the transaction corresponding to each log entry. In this example, for some embodiments: log entry 804A corresponds to a transaction that involved inode 4; log entry 806A corresponds to a transaction that involved inode 8; log entry 808A corresponds to a transaction that involved inode 4, 7, and 10; log entry 810A corresponds to another transaction that involved inode 4; and log entry 812A corresponds to another transaction that involved inode 7 and 11; and so on. Note, as described above, log entries may include additional information such as references to the transaction data or transaction information, real-time timestamps, other meta-data, or the like. Likewise, in some embodiments, log entries may include the operations, data, or other information associated with the transactions. Note, inodes are listed for each operation included in a transaction, including read operations.

In some embodiments, file system engines may be arranged to apply log entries by communicating them to target file systems which may replay the log entries (e.g., run the same file system operation on the target file system) on the target file system. Accordingly, in some embodiments, by replaying all the log entries, file system engines may keep the target file systems consistent with operations that occur on the source file system (e.g., spoke file systems). A critical requirement for maintaining file system consistency may include applying the log entries in the same order their underlying transactions were executed.

In some cases, for some embodiments, target file systems, such as hub file systems, may receive one or more log entry communication messages out of key order. Accordingly, in some embodiments, it may be assumed that target file systems may include facilities, such as buffers, state machines, or the like for tracking the received log entries to ensure that they may be applied in log entry key value order to the target file system. In some embodiments, file system engines may be arranged to employ one or more rate limiting or flow control mechanism to avoid flooding or overfilling receiving buffers on target file systems.

Further, in some embodiments, it may be critical for log entries that are considered dependent on other log entries to be applied to target file systems after their dependent log entries are applied. In this context, a log entry may be considered dependent on another log entry if the represented file system operations involve the same (or some of the same) inodes. Accordingly, in some embodiments, file system engines may arranged to track log entry/transaction dependency to ensure that log entries may be applied to target file system in the correct order. Also, in some embodiments, file system engines may be arranged to execute one or more actions to ensure dead locks involving dependent log entries may be avoided as described below.

Accordingly, in this example, for some embodiments, log entry 810A may be considered dependent on log entry 808A because they both involve inode 4. Likewise, in this example, log entry 812A may be considered dependent on log entry 808A because both log entry 812A and log entry 808A involve inode 7.

In this example, transaction log 802B represents the same transaction log as transaction log 802A rearranged into dependencies trees based on the key values and involved inodes. Accordingly, in some embodiments, log entry 804B-812B may be considered to represent the same log entry as their counterpart log entries 804A-812A.

Accordingly, in some embodiments, transaction log 802B may include dependency tree 814 and dependency tree 816 representing the dependencies relationships for the log entries in transaction log 802A/B.

In some embodiments, file system engines may be arranged to determine one or more log entries in transaction logs that may be independent from each other based on an absence of dependencies. In this example, dependency tree 814 and dependency tree 816 may be considered independent trees because they do not share operations associated with the same inodes.

In some embodiments, file system engines may be arranged to apply log entries to target file systems in ascending order based on the log entry key values. Further, in some embodiments, log entries may be applied to the target file system if all of the other log entries that it may depend on have been previously applied to the target file system.

Further, in some embodiments, file system engines may be arranged to apply log entries from separate dependency trees (e.g., subgraphs) in parallel to the same target file system. For example, in some embodiments, file system engines may be arranged to apply log entries (in ascending key value order) from dependency tree 814 and dependency tree 816 in parallel. Thus, in some embodiments, file system engines may be arranged to take advantage of available network bandwidth or compute availability to rapidly apply log entries to target file systems to bring them into a state that is consistent with the source file system.

Figure 9:
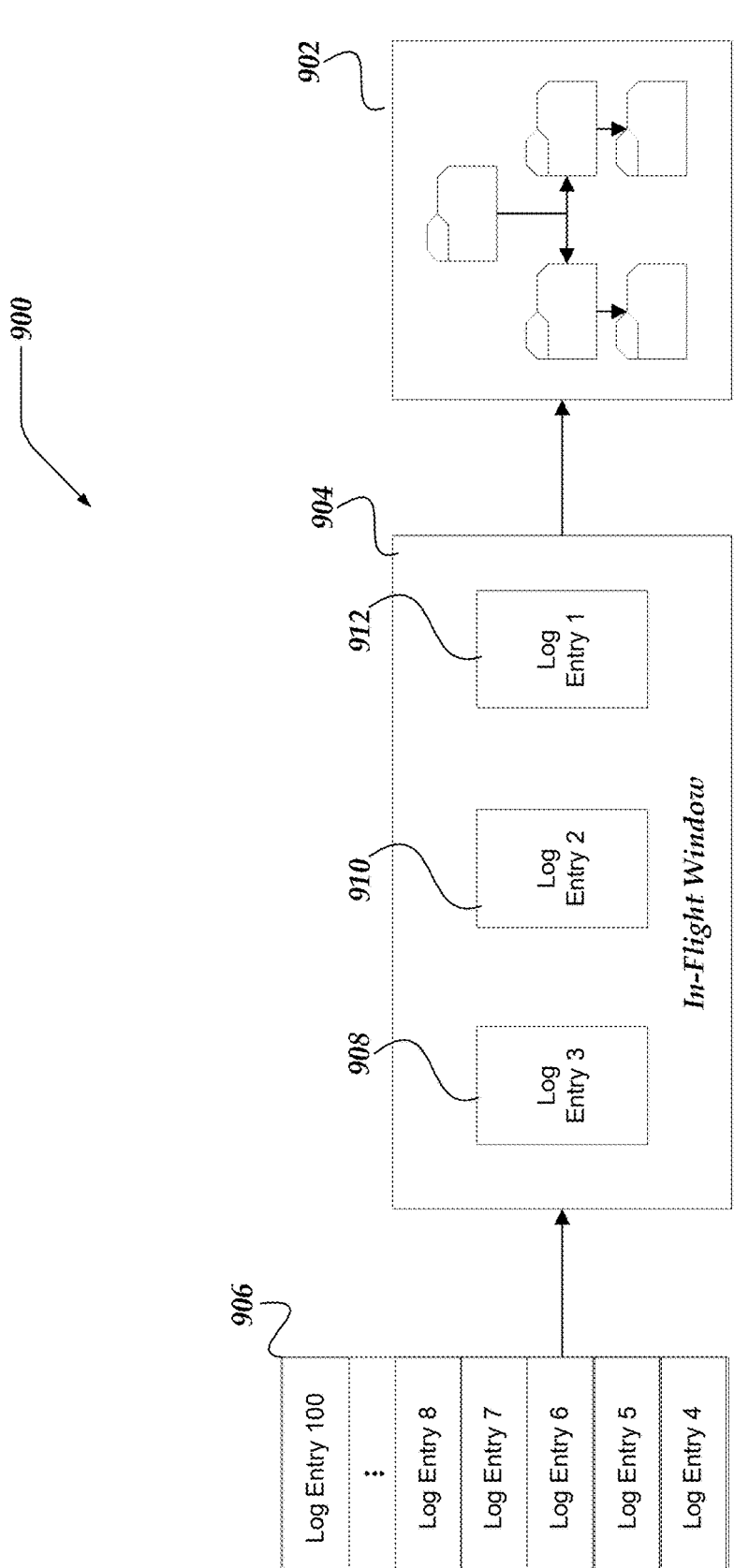
FIG. 9 illustrates a logical schematic of a system for managing file system transaction dependencies in accordance with one or more of the various embodiments.

FIG. 9 illustrates a logical schematic of system 900 for managing file system transaction dependencies in accordance with one or more of the various embodiments.

As described above, transaction logs may be located on nodes in spoke file systems or other remote locations separate from a target file system. Accordingly, in some embodiments, file system engines may be arranged to communicate log entries to a file system engine of a another file system or portion of a file system to enable the changes represented by the log entries to be applied to the target file system. In general, one of ordinary skill in the art will appreciate that distributed file system transaction log systems may execute various operations not described here to maintain or update file system consistency in view of the file system operations represented by the transaction log entries, such as managing locking, or the like.

As described above, in some embodiments, target file system engines may be arranged to apply changes represented by the log entries in the order they occurred on the source file system (e.g., spoke file system). Accordingly, as described above, file system engines may be arranged to employ the key value associated with each log entry to determine the order the file system operations represented by the log entry may be applied.

Also, as described above, in some embodiments, file system engines may be arranged to track the dependencies between or among log entries to ensure that log entries that are dependent on other log entries may be applied after their dependent log entries may be applied to the target file system. However, in some embodiments, the size of the transaction logs may be considered to be unbounded such that it could grow to a size that makes keeping dependencies trees in memory consume too much memory or otherwise cause performance issues. For example, if the target file system may be stored on cluster of nodes that use slower or otherwise less performance storage technology, log entries on source file systems may in some cases accumulate to such a degree that the local dependency tree may become too large for reading the entire transaction log into memory. See, FIG. 10 for more details regarding iterative transaction log processing.

Similarly, in some embodiments, file system engines on source file systems may overwhelm the target file system (or their connecting networks) with log entries if the rate of communicating log entries to the target file system may be left unrestricted. For example, in some embodiments, the source file system (a spoke file system) may be configured to have several high performance nodes and storage devices to enable users of the spoke file system to have low latency while the hub file system may be configured to use fewer nodes and slower (cheaper) storage devices. Accordingly, in some embodiments, it may be that the source file system (spoke file system) may accumulate log entries such that attempting to communicate them all for application on the target file system (hub file system) may overwhelm the target file system or its networks.

Accordingly, in some embodiments, file system engines may be arranged to use in-flight windows, such as in-flight window 904 to manage the rate of log entries that may be communicated to target file systems. In some embodiments, in-flight windows may be considered to be managed memory buffers that enable flow control of the communication of log entries to target file system.

Accordingly, in some embodiments, file system engines may be arranged to reduce the probability of buffer overflow, memory starvation, or memory exhaustion that may be caused sending more log entries than the target file system can process timely. For example, in some embodiments, if transaction logs has a million log entries, a file system engine may be configured to support an in-flight window that can hold 100 log entries at a time. Similarly, in some embodiments, file system engines may be configured enforce in-flight window using memory capacity rather than log entry counts. For example, an in-flight window may be configured to have 100 mb capacity to limit rate of log entries being communicated to the target file system.

In some embodiments, in-flight window 904 may represent data structures for managing the time and (memory) space for in-flight log entries. Accordingly, in some embodiments, in-flight windows, such as in-flight window 904 may be associated with memory buffers, cache memory, or the like of a limited size such that in some cases, one or more log entries may be delayed from being applied to target file system if the memory buffers associated with their in-flight window may be in danger of being exhausted or otherwise filled to capacity.

Accordingly, in some embodiments, file system engines may be arranged to incrementally communicate log entries from transaction log 906 to target file system 902 by adding them to the in-flight window buffer. Note, in some cases, in-flight windows may be implemented using accounting methods (e.g., keeping counts) rather than enforcing a tangible/fixed size memory buffer such that file system engines may be arranged to track which log entries are "in" the in-flight window rather than monitoring the memory capacity of a buffer.

In some embodiments, file system engines may be arranged to slow, stop, or pause the rate of communicating log entries to the target file system if the in-flight window limits may be exceeded. However, in some embodiments, if this is done naively, it may cause a deadlock if the in-flight window is filled while a log entry dependency remains outside of the in-flight window. Accordingly, in some embodiments, file system engines may be arranged to determine that before a log entry may be added to an in-flight window, all of the log entries that it depends on have been previously applied to the target file system or that they are in the in-flight window.

Accordingly, in some embodiments, file system engines may be arranged to avoid dependency deadlocks for log entries in the in-flight window may not be deadlocked because they may be dependent on a log entry that cannot be placed in the in-flight window. In some embodiments, if this scenario occurs, the dependencies of log entries in the in-flight window may not be met because they are outside of the now full/at-capacity in-flight window and may not be applied to target file systems.

Accordingly, in some embodiments, file system engines may be arranged to evaluate if a log entry may be dependent on other log entries before submitting them or adding them to the in-flight window. In some embodiments, if the log entry may be dependent on other log entries, file system engines may be arranged to ensure that the log entries it may be dependent on may be in the in-flight window before the log entry is added to the in-flight window.

Referring to FIG. 8, log entry 806B has no dependencies, thus it may be added to the in-flight window without restriction as long as there is capacity in the in-flight window. In contrast, in some embodiments, before log 810B may be added to the in-flight window, the file system engine may be required to ensure that the in-flight window includes the log entries that log entry 810B depends on, such as log entry 804B, log entry 808B, and log entry 812B, or the like.

In general, for some embodiments, if a log entry depends on another log entry, that log entry creating the dependency either has to be already applied to the target file system and thus removed from the transaction log or all of the log entries that are depended on must fit in the in-flight window at the same time. Otherwise, it may be possible the target file system may be receive log entries out of order and be deadlocked because of the filled/blocked in-flight window.

Accordingly, in this example, for some embodiments, transaction log 906 may be collecting log entries that need to be applied to a target file system. In some embodiments, in-flight window 904 may represent a in-flight window used for enforcing flow control with respect to applying log entries to target file system 902. Further, in this example, for some embodiments, log entry 908, log entry 910, and log entry 912 may represent log entries that may be considered to be in the in-flight window and on their way to being applied to file system 902.

In some embodiments, if a log entry may be applied to its target file system, the log entry may be removed from the transaction log. In some cases, this may eliminate one or more dependencies which may enable one or more opportunities for parallel execution of other log entries that remain in the transaction log. Note, while log entries from a transaction log may be applied to target file system, more/ new log entries may be added to the transaction logs as file system clients interact with the source/spoke file system.

Further, in some embodiments, using in-flight windows for flow control may support combining log entries into single communication that may be sent to target file system. For example, in some cases, the target file system may be configured to be high latency with high bandwidth such that the rate of transactions may be less than what the source file system support but the amount of data that may be sent in one communication may be high enough to allow large-size data communications. Thus, in some embodiments, file system engines may be arranged to combine two or more log entries into a single communication operation to reduce the number of communication operations to the target file system.

Accordingly, in some embodiments, file system engines may be configured combine a defined number/size of log entries into a single communication as long as the communication includes all the known dependencies for the combined log entries. Further, in some embodiments, independent dependency tree or log entries may be combined as well into the same communication if needed. In some embodiments, file system engines may be arranged to use rules, instructions, or the like provided via configuration information to determine the particular maximum communication size for a given target file system.

For example, referring to FIG. 8 again, each log entry in dependency tree 814 may be combined into a single communication message that may be sent to the target file system. This would reduce the number of communication operations from four to one. Also, in this example, dependency tree 816 could also be combined into the same communication message because it also has no outstanding dependencies.

Figure 10:
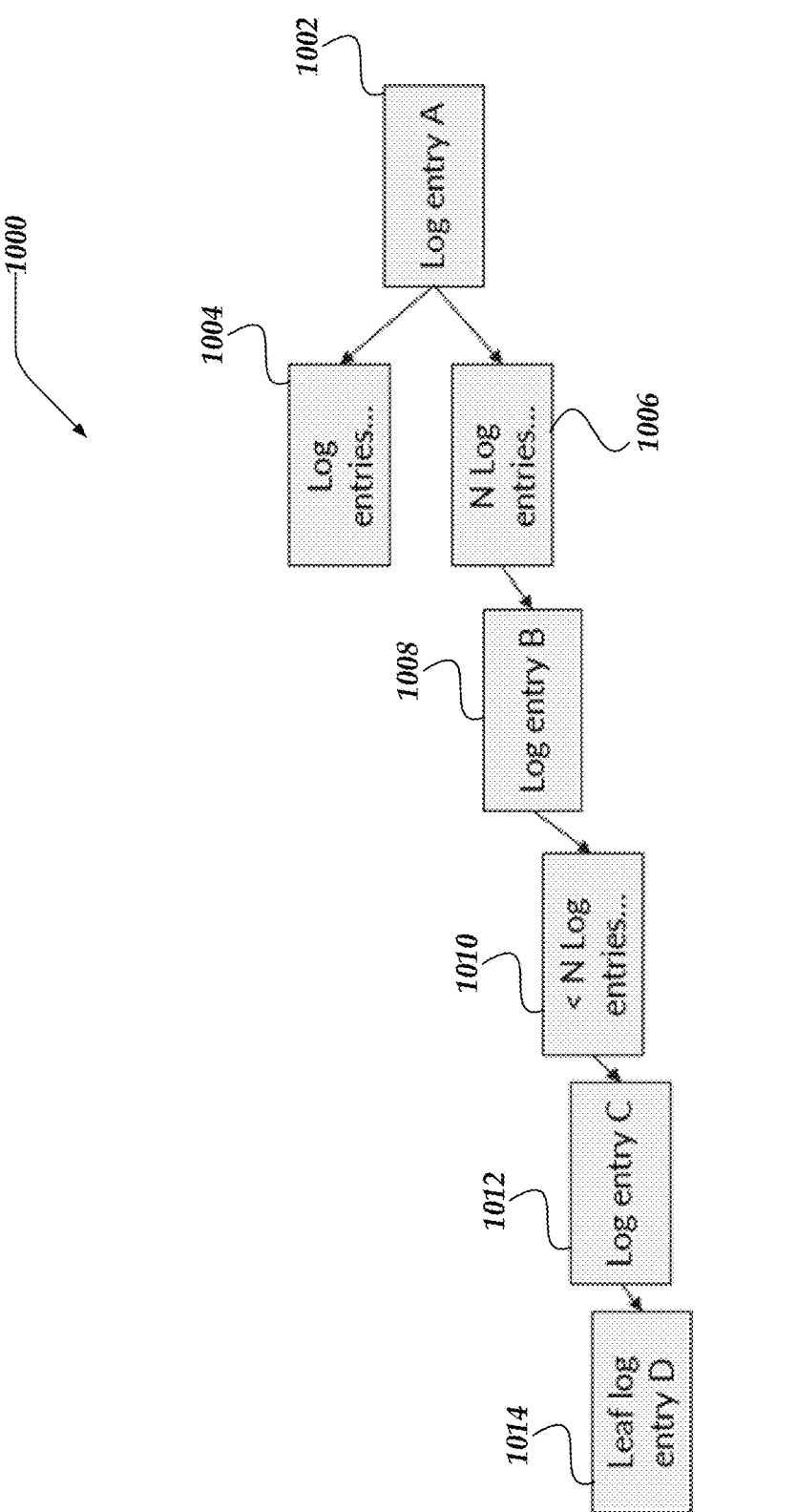
FIG. 10 illustrates a logical schematic of a transaction log for managing file system transaction dependencies in accordance with one or more of the various embodiments.

FIG. 10 illustrates a logical schematic of transaction log 1000 for managing file system transaction dependencies in accordance with one or more of the various embodiments.

As mentioned above, in some embodiments, transaction logs may grow or shrink in size as the rate of file system operations varies. Likewise, other factors such as the performance characteristics (or performance configurations) of nodes/file system clusters, network bandwidth, storage device performance metrics, or the like may impact how transaction logs may perform. For example, in some embodiments, if spoke file system nodes may be capable of performing more operations per second than hub file system nodes (either because of compute performance, storage device performance, network performance, or the like), transaction logs may tend to grow larger than if the spoke file system nodes perform fewer file system operations.

In some embodiments, as described above, file system engines may employ various methods, including combining multiple log entries into single communication messages, parallel processing of independent transaction log dependency trees, managing in-flight windows, or the like.

However, in some cases, for some embodiments, naively executing these or other performance operations may require the entire transaction log to be evaluated/traversed to identify dependencies or other features. Accordingly, in some embodiments, as the size of transaction logs may be unbounded, there may the real danger of memory exhaustion if the transaction logs grow too large. Note, large transaction logs may be accumulated without harm because log entries may be stored in high capacity storage devices/services as they are accumulated. However, processing/traversing the transaction logs to identify dependencies, or the like may require loading some or all of the transaction log into memory (RAM) which may introduce a risk of memory exhaustion.

Accordingly, in some embodiments, file system engines may be arranged to iteratively traverse transaction log as a graph to enable the amount of memory used to be managed to avoid memory exhaustion or otherwise exceeding a memory usage quota/threshold.

In some embodiments, file system engines may be arranged to employ depth first search to traverse the transaction log graphs until N log entries have been explored. If N entries have been evaluated, file system engines may be arranged to suspend the traversal and return a continuation value, such as the log entry key of the N+1th log entry. Thus, in some embodiments, the file system engine may then later continue the traversal of the transaction log graph starting from the log entry associated with continuation value. In some embodiments, the continuation itself may be considered to be a root of a subgraph of the transaction log graph such that if the log entries from that subgraph have been applied to the target file system, file system engines may be arranged to restart a traversal of the transaction log graph at the new/current root of the transaction log graph.

Accordingly, in this example, for some embodiments, file system engines may be arranged to initiate a traversal of the transaction log graph at log entry 1002 which may be considered to be original root of the transaction log. In this example, if N log entries may be visited during the traversal, the log entry key associated with log entry 1008 may be returned as a continuation value. Note, log entries 1004 may be considered a branch of the transaction log graph that may be traversed later. Also, in this example, N Log entries 1006 may represent the log entries traversed by the file system engine during the DFS traversal.

In some embodiments, file system engines may be arranged to provide a graph iterator that can recall that log entry 1002 is the original root A, which enables the start of another traversal of the transaction log graph at log entry 1008 which may correspond to the continuation value of the initial traversal.

Accordingly, in some embodiments, file system engines may be arranged to continue the traversal of the transaction log graph from starting at log entry 1008, which after some number of visited log entries may again return another continuation value associated with log entry 1012. Now, the transaction log graph iterator may recall the original root (log entry 1002) and the new continuation point log entry 1012 (log entry C) from which to start a next DFS traversal of the transaction log graph starting at log entry 1012. Eventually, in some embodiments, the file system engine may continue this iterative traversal process until it reaches a leaf node of the transaction log graph, such as log entry 1014 (leaf log entry D) indicating that the subgraph being traversed has been fully evaluated. Further, in this example, for some embodiments, since the leaf node of the transaction log has been discovered, it may be applied to the target file system. Also, in this example, if log entry 1012, or the like has no dependencies (or subgraph branches) it may be applied to the target file system as well.

Thus, in some embodiments, if the traversal reaches a leaf node of a subgraph, file system engines may be arranged to restart (or continue) the DFS traversal of the transaction log graph at the top root, in this example, at log entry 1002.

The iterator now remembers the original root A and the new continuation C and starts a third traversal from C. The third traversal returns leaf log entry D and C itself to be applied, since that subgraph is fully explored. The iterator then restarts at A, and the process repeats, but progress was made (C and D were applied).

Figure 11:
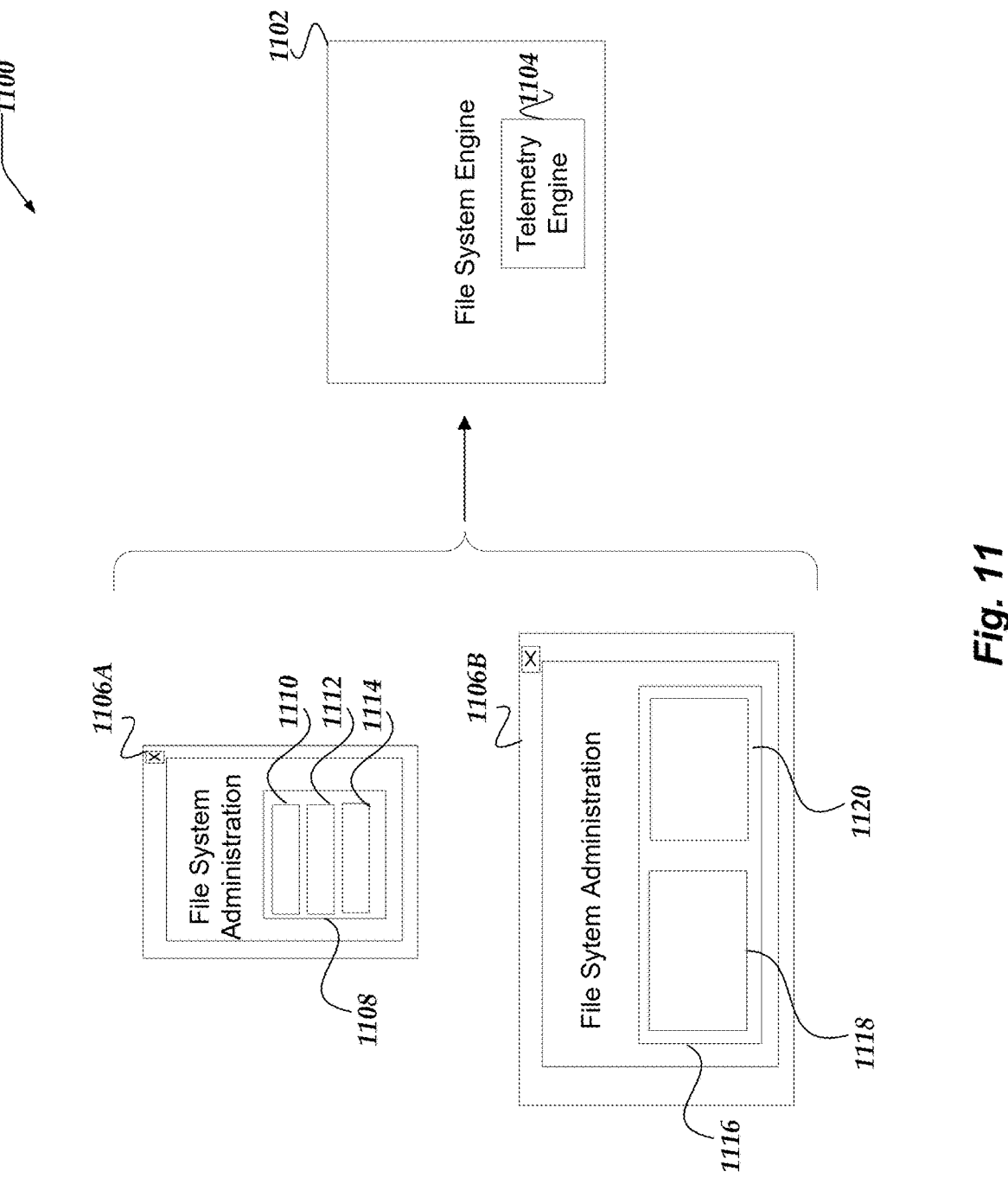
FIG. 11 illustrates a logical schematic of a system for collecting and applying telemetry information and telemetry metrics for file system administration and managing file system transaction dependencies in accordance with one or more of the various embodiments.

FIG. 11 illustrates a logical schematic of system 1100 for collecting and applying telemetry information and telemetry metrics for file system administration and managing file system transaction dependencies accordance with one or more of the various embodiments.

In some embodiments, system 1100 may include various constituents, including: file system engine 1102; telemetry engine 1104; one or more client user interfaces, such as user interface 1106A or user interface 1106B; or the like.

In some embodiments, file system engines, such as file system engine 1102 may be arranged to perform one or more actions to support the operation, organization, management, or execution of caching for object stores and file system administration.

Further, in some embodiments, systems, such as system 1100 may include one or more telemetry engines, such as telemetry engine 1104. In some embodiments, telemetry engines may be arranged to monitor or evaluate interactions with applications or user interfaces such as user interface 1106A, user interface 1106B, or the like. In some embodiments, this may include monitoring how users or even other applications may interact with user interfaces, interactive reports, various applications, or one or more system features related to cache management, object store operations, file system configuration, or the like. Accordingly, in some embodiments, one or more telemetry metrics or user interaction metrics may be employed to adapt or rearranged user interfaces or the like in view of the telemetry metrics or user interaction metrics. In some embodiments, user interface 1106A may represent the presentation or display of a user interface in a first adapted arrangement while user interface 1106B may represent the presentation or display of the same user interface having a second adapted arrangement. For example, in some embodiments, user interface 1106A may be the user interface displayed in portrait mode while user interface 1106B may be considered to be the user interface in landscape mode after a hardware display has been rotated.

In some embodiments, user interfaces, such as user interface 1106A or user interface 1106B may include various windows, controls, or other user interface features. In some embodiments, user interfaces may include various user interface panels, such as panel 1108, panel 1116, or the like. For example, in some embodiments, panel 1108, or the like may represent a user interface that enables users, such as system administrators, to review cache configuration information, object store performance metrics, or perform file system administration displayed in a portrait (vertical) orientation while user interface 1106B may represent file system administration information displayed in a landscape (horizontal) orientation. Further, in some embodiments, element 1110, element 1111, element 1114, element 1118, element 1120, or the like may be considered to represent various user interface elements, controls, buttons, list items, report features, user interface components, displayed content, formatted content, or the like that may be included in user interfaces.

Also, for example, in some embodiments, user interface 1106A or 1106B may be considered a user interface that enables administrative users to work with cache management, object store configuration, file system monitoring, or the like. For example, panel 1108 may be used to select, generate, or modify cache policies, object store settings, file system parameters, provide supplemental configuration data, or the like. For example, display panel 1108 may be used to display quality or effectiveness rankings for one or more cache configurations, object store policies, file system operations, or the like ordered based on inferred importance, performance characteristics, or the like. Likewise, in some embodiments, panels such as panel 1108 may be used to display cache utilization schema information, object store sections, candidate configuration sections, display reports regarding cache performance records or their relevance to pending or previous file system optimization operations, or the like.

In some embodiments, file system engines, such as file system engine 1102 (as well as telemetry engines, or the like) may be arranged to generate or display user interfaces, such as user interface 1106A or user interface 1106B to users using one or more of video interface 242, projector 246, display 250, or the like, of a client computer, such as client computer 200. Similarly, in some embodiments, file system engine 1102 may be arranged to generate or display user interface 1106A, user interface 1106B, or the like to users using a one or more of input/output interface 338, display 350, audio interface 356, or the like, of a network computer, such as network computer 300.

In some embodiments, file system engines, such as file system engine 1102 (as well as telemetry engines, or the like) may be arranged to collect various telemetry or other metrics associated with user interactions with user interfaces. In some embodiments, telemetry may include tracking or monitoring if users may be in agreement with the generated cache configurations, object store policy selection or execution, report arrangement or organization, or the like. In some embodiments, file system engines, or the like may be enabled to employ telemetry information or telemetry metrics collected or determined by telemetry engines, such as telemetry engine 1104. In some embodiments, telemetry engines may be separate from file system engines, or the like as shown in FIG. 11. Also, in some embodiments, telemetry engines may be part of or otherwise embedded in file system engines, or the like.

Also, in one or more embodiments, various types of collected user telemetry may include a user's selection or non-selection of one or more particular elements or content in a display panel, pointing device (mouse) hover time over particular content or elements in a display panel, user dwell time between actions in a display panel, dwell time for viewing a display panel by a user, or the like.

In one or more of the various embodiments, file system engines, or the like may be arranged to monitor telemetry information associated with one or more users.

Accordingly, in some embodiments, file system engines, or the like may be arranged to provide one or more user interface facilities to collect direct feedback from one or more of the users that may interact with information displayed in the one or more user interfaces. For example, in some embodiments, user interfaces may include controls that enable authorized users to grade one or more cache performance reports, candidate configurations, candidate policy sections, cache profiles, or the like.

In some embodiments, grades or scores may be binary (e.g., like or dislike), discrete (e.g., one-four stars, letter grades), continuous values, or the like.

Also, in one or more of the various embodiments, file system engines, or the like may be arranged to provide user interfaces that monitor how users interact with input information, events, cache performance reports, recommended configuration actions, or the like. In some embodiments, telemetry information employed to monitor user preferences may be based on monitoring user interactions as well as direct feedback. Accordingly, in some embodiments, input information, cache configurations, candidate policy sections, or the like, that may appear well-formed but are ignored or discarded by users may be inferred to be poorly received. For example, in some embodiments, if the top ranked results provided in response to user actions, user queries, or the like, are ignored or lower ranked results are favored by users, it may be inferred that there may be a problem with the data or the display of the data.

Further, in some embodiments, file system engines, or the like may be arranged to receive telemetry information from other services or applications. Accordingly, in one or more of the various embodiments, file system engines, or the like may not be required to directly monitor activity associated with the input information, candidate policy sections, cache configurations, file system performance reports, recommend configuration actions, or the like. For example, in some embodiments, user interfaces, such as user interface 1106A or user interface 1106B may be displayed to users via desktop computer applications, mobile applications, web-based applications, or the like. In some embodiments, such applications may collect the telemetry information or provide some or all it to file system engines, or the like rather than requiring the file system engines, or the like to include monitoring facilities on user-facing applications.

Accordingly, in some embodiments, file system engine 1102, or the like may be arranged to collect metrics or telemetry associated with user interactions with user interface 1106A or user interface 1106B using a one or more of input/output interface 238, cameras 240, touch interface 244, keypad 252, audio interface 256, GPS, 258, open air gesture interface 260, haptic interface 264, pointing device interface 266, or the like, of a client computer, such as client computer 200. Similarly, in some embodiments, file system engine 1102, or the like may be arranged to collect metrics or telemetry associated with user interactions with user interface 1106A, or user interface 1106B using a one or more of input/output interface 338, GPS 340, keyboard 352, audio interface 356, pointing device interface 358, or the like, of a network computer, such as network computer 300.

In some embodiments, file system engines, or the like may be arranged to track mouse movement, eye movement, keystrokes, or the like, to determine how users may interact with information (e.g., input information, events, cache performance reports, candidate policy sections, configuration sections, recommended optimization actions, or the like) displayed in user interfaces. Accordingly, in some embodiments, file system engines, or the like may be arranged to evaluate at least the quality of various cache recommendations, policy section selection, report characteristics, or the like based on how users interact with them via the user interfaces. For example, if users consistently select or otherwise favor interacting with items or candidate policy sections ranked lower than others, it may indicate that one or more models performing the ranking or item selection may be experiencing diminished or diminishing effectiveness. Likewise, in some embodiments, users may reject or ignore report results, suggested actions, configuration section suggestions, optimization conclusions, or the like which may indicate that one or more associated models or systems may be experiencing diminished or diminishing effectiveness.

In some embodiments, file system engines, or the like may be arranged to associate a performance score with user interfaces used in the system based on the user interaction metrics or telemetry. Accordingly, in some embodiments, if the performance score associated with a user interface or user interface element falls below a defined threshold value, file system engines, or the like may be arranged to suspend those user interfaces (or portions thereof) from operation. Or, in some embodiments, file system engines, or the like may be arranged to automatically modify the deficient user interfaces.

Also, in some embodiments, telemetry engines may be arranged to collect or determine telemetry information that includes user telemetry, user feedback, or telemetry metrics that may be used to dynamically transform user interfaces, display panels, or the like. The dynamic transformation may include arrangement, re-arrangement, elimination, addition, or adaptation of content or visual elements in user interfaces or display panels based on at least the collected telemetry information.

Additionally, in some embodiments, telemetry engines may collect metrics associated with the one or more user interactions with the system including content within the user interfaces or display panels. In some embodiments, user profiles may be configured to dynamically include user interface preferences based on collected user telemetry metrics or user feedback. Accordingly, in some embodiments, file system engines, or the like may dynamically change the visual appearance of the user interfaces to improve the efficiency or effectiveness of the system or its user interfaces for the user. Accordingly, in some embodiments, file system engines, or the like may be arranged to dynamically select, position, size, shape, remove, hide, inactivate, disable, highlight, or style one or more visual user interface components such as display panels, controls, elements or content based on one or more of user telemetry metrics or user feedback. For example, if user interactions with the user interface are tracked focusing on or navigating to particular user interface views, components or user interface panels, system components, such as file system engines, or the like may be arranged to dynamically highlight or size the preferred user interface elements or display panels. For example, if users are determined to rarely interact with a user interface element, such as element 1114, file system engines, or the like may be arranged to dynamically reduce the size, diminish the shape, disable its controls, or re-position element 1114 by displaying a smaller sized greyed out version of element 1114 in its display panel.

Also, in some embodiments, file system engines, or the like may be arranged to adapt user interfaces based on the size or type of display, input methods, user status, or the like. For example, in some embodiments, if a user is determined to be operating using a mobile device, one or more user interface elements may be dynamically positioned differently. In some cases, in some embodiments, depending on the display type or display size, one or more user interface elements may be hidden from view. For example, in some embodiments, a file system engine may be arranged to dynamically modify or re-arrange user interface 1106A to obtain user interface 1106B based on telemetry associated with the display or associated user interactions. Accordingly, in this example, display panel 1116 may be considered to be dynamically modified or rearranged to accommodate the modified physical orientation of the display. Further, in this example, user interface 1106B now may be considered to display two elements (element 1118 or element 1120) rather than three elements as were displayed in user interface 1106A. Thus, in this example, file system engine 1102 may display two elements for the landscape (horizontal) orientation instead of the three elements displayed in the portrait (vertical) orientation based on one or more telemetry metrics.

Thus, in some embodiments, file system engines, or the like may be arranged to tangibly modify user interfaces, display panels, interactive reports, input collection, input selection, input data representation, configuration sections, cache management interfaces, object store administration tools, or the like, based on the efficient or effective performance of processes or activities associated with various types input information, events, configuration sections, cache policies, file system optimization results, or the like as determined by telemetry information, or the like.

Generalized Operations

FIGS. 12-18 represent generalized operations for managing file system transaction dependencies in accordance with one or more of the various embodiments. In one or more of the various embodiments, processes 1200, 1300, 1400, 1500, 1600, 1700, and 1800 described in conjunction with FIGS. 12-18 may be implemented by or executed by one or more processors on a single network computer, such as network computer 300 of FIG. 3. In other embodiments, these processes, or portions thereof, may be implemented by or executed on a plurality of network computers, such as network computer 300 of FIG. 3. In yet other embodiments, these processes, or portions thereof, may be implemented by or executed on one or more virtualized computers, such as, those in cloud-based environments. However, embodiments are not so limited and various combinations of network computers, client computers, or the like may be utilized. Further, in one or more of the various embodiments, the processes described in conjunction with FIGS. 12-18 may perform actions for managing file system transaction dependencies in accordance with at least one of the various embodiments or architectures such as those described in conjunction with FIGS. 1-11. Further, in one or more of the various embodiments, some or all of the actions performed by processes 1200, 1300, 1400, 1500, 1600, 1700, and 1800 may be executed in part by one or more of file system engine 322, or the like.

Figure 12:
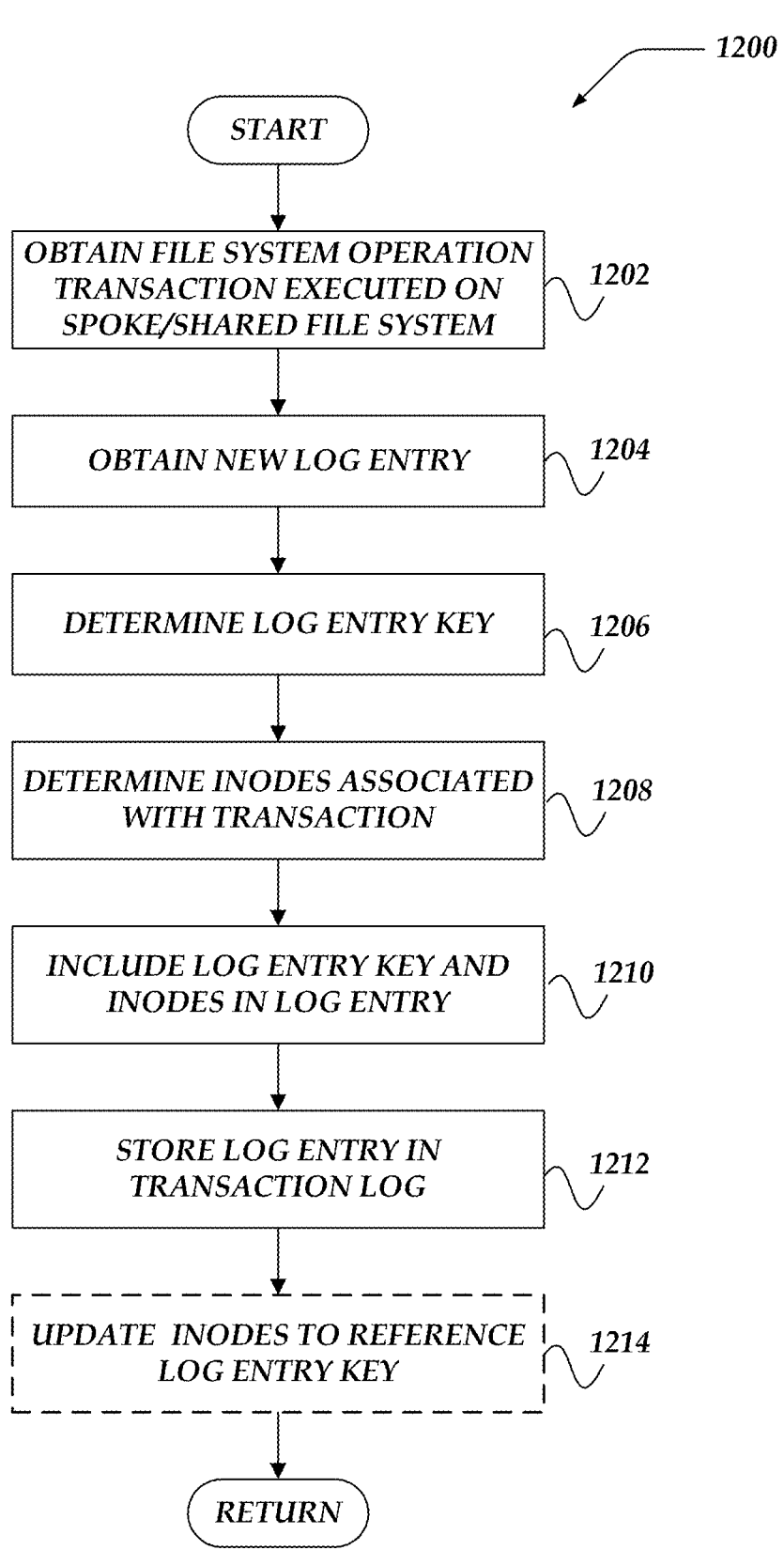
FIG. 12 illustrates an overview flowchart for a process for managing file system transaction dependencies in accordance with one or more of the various embodiments.

FIG. 12 illustrates an overview flowchart for process 1200 for managing file system transaction dependencies in accordance with one or more of the various embodiments. At flowchart block 1202, in one or more of the various embodiments, file system engines may be arranged to obtain one or more file system operation transactions that may have been executed on a shared or spoke file system.

In some embodiments, file system engines may be arranged to monitor file system operations that may be initiated by one or more file system clients accessing shared portions of a distributed file system. In some embodiments, file system operations may include various actions, such as reading file system items, writing data to file system items, modifying file system item meta-data, moving file system items between directories, creating new file system items, deleting existing file system items, or the like. Accordingly, in some embodiments, file system engines may be arranged to organize one or more related file system operations into transactions that represent atomic units of work that may be committed or rolled back as a unit to maintain file system consistency.

In some embodiments, transactions may be composed of a prepare phase that acquires locks, reads objects, stages modifications, or the like, followed by a commit phase that persists changes to the transaction system. Accordingly, in some embodiments, during the prepare phase, file system engines may be arranged to identify which inodes may be accessed by the transaction, including inodes that may be read or written during the transaction operations. In some embodiments, file system engines may be arranged to track both read dependencies that occur if a transaction reads data from an inode without modifying it, as well as write dependencies that occur if a transaction modifies data associated with an inode.

In some embodiments, file system engines may be arranged to ensure that all inodes spanned by a transaction may be included in dependency tracking to maintain namespace consistency across the distributed file system. Accordingly, in some embodiments, transactions that span multiple inodes may create dependency relationships that must be preserved if log entries are replayed on target file systems to prevent corruption of the file system namespace. Thus, in some embodiments, file system engines may be arranged to capture complete dependency information for each transaction to enable correct serialization of operations across geographically distributed file system clusters.

At flowchart block 1204, in one or more of the various embodiments, file system engines may be arranged to generate or obtain a new log entry.

In some embodiments, file system engines may be arranged to create log entry data structures that represent transactions executed on the source file system. In some embodiments, log entry data structures may include various fields or attributes, such as transaction identifiers, operation types, file system addresses, data payloads, timestamps, logical time indicators, or the like that enable the transaction to be replayed on one or more target file systems.

In some embodiments, file system engines may be arranged to allocate storage space for the new log entry in one or more transaction log data structures that may be maintained on each node or protection store in the distributed file system. Accordingly, in some embodiments, file system engines may be arranged to populate log entry fields with information that describes the file system operations included in the transaction, such as operation codes, inode identifiers, data block addresses, modification data, operation sequences, or the like. In some embodiments, file system engines may be arranged to ensure that log entries include sufficient information to enable replay of the transaction operations on target file systems without requiring additional data retrieval from the source file system.

In some embodiments, file system engines may be arranged to associate log entries with transaction completion status information that indicates if the transaction has been successfully committed to durable storage on the source file system. Accordingly, in some embodiments, committing transactions may include generating corresponding log entries that may be later communicated to target file systems. In some embodiments, file system engines may be arranged to discard log entries associated with uncommitted or rolled-back transactions, if any. Thus, in some embodiments, file system engines may be arranged to generate log entries as part of their associated transactions.

At flowchart block 1206, in one or more of the various embodiments, file system engines may be arranged to determine a log entry key for the new log entry.

In some embodiments, file system engines may be arranged to assign unique key values to each log entry that establish a total ordering of transactions across the distributed file system. In some embodiments, log entry keys may be generated using various mechanisms, such as monotonically increasing counters, Lamport logical clocks, hybrid logical clocks, vector clocks, composite keys that combine sequence numbers with timestamps, or the like. Accordingly, in some embodiments, file system engines may be arranged to employ logical time mechanisms that enable different nodes in the same file system cluster or nodes in different remote file systems to maintain consistent ordering of log entries even if the entries may be generated or received out of sequence order.

At flowchart block 1208, in one or more of the various embodiments, file system engines may be arranged to determine one or more inodes associated with the transaction.

In some embodiments, file system engines may be arranged to identify all inodes that may be accessed during the execution of the transaction, including inodes that may be read during the prepare phase as well as inodes that may be modified during the commit phase. In some embodiments, file system engines may be arranged to collect inode identifiers from operation records, transaction metadata, lock acquisition records, or the like that document which file system items may have been involved in the transaction.

Accordingly, in some embodiments, file system engines may be arranged to ensure that both read dependencies that occur if the transaction reads an inode without modifying it, as well as write dependencies that occur if the transaction modifies an inode, may be included in the dependency tracking information. In some embodiments, including read dependencies may be critical for maintaining file system namespace consistency because transactions that depend on reading an inode that has other pending changes in the transaction log must not be applied out of order on target file systems. In some embodiments, failing to include read dependencies could result in inconsistent views on target file systems, particularly for operations such as moving files between directories, renaming file system items, or modifying directory structures.

In some embodiments, file system engines may be arranged to review file system operation records to extract the complete set of inode identifiers that may be associated with the transaction. Accordingly, in some embodiments, if a transaction includes multiple operations that affect different inodes, file system engines may be arranged to collect the union of all inode identifiers from all operations included in the transaction. In some embodiments, file system engines may be arranged to handle transactions that span multiple directories, affect file system metadata structures, or modify relationships between file system items by ensuring that all affected inodes may be properly tracked for dependency determination. Thus, in some embodiments, file system engines may be arranged to build comprehensive dependency information that enables correct serialization of transaction replay operations on one or more target file systems.

At flowchart block 1210, in one or more of the various embodiments, file system engines may be arranged to include the log entry key and the one or more inodes in the log entry.

In some embodiments, file system engines may be arranged to populate log entry data structures with the assigned log entry key value that establishes the transaction's position in the ordering of file system operations. In some embodiments, file system engines may be arranged to store the list of inode identifiers associated with the transaction in the log entry to enable dependency graph construction to support transaction operations. Accordingly, in some embodiments, log entry data structures may include fields or attributes for the log entry key, the set of inodes affected by the transaction, references to other log entries associated with the affected inodes, references to transaction data or operation information, transaction timestamps, logical time values, or the like. For example, for some embodiments, a log entry may include a list of affected inodes and a list of log entry keys that correspond to the last modifications to those inodes.

In some embodiments, file system engines may be arranged to modify the affected inodes to include a reference to the log entry associated with the last time the inode was modified. In some embodiments, this may include a log entry key of the log entry representing the most recent modifications to the inode. Thus, in some embodiments, file system engines may rapidly determine the log entries or log entry key associated with the most recent changes to a given inode.

At flowchart block 1212, in one or more of the various embodiments, file system engines may be arranged to store the log entry in a transaction log.

In some embodiments, file system engines may be arranged to persist log entries to durable storage using the data protection mechanisms provided by the file system to ensure transaction information survives node failures, system restarts, or other interruption events. In some embodiments, transaction logs may be organized using various data structures, such as files, arrays, linked lists, B-trees, log-structured merge trees, database tables, or the like that enable efficient append operations for new log entries while supporting ordered traversal of existing log entries.

At flowchart block 1214, in one or more of the various embodiments, optionally, file system engines may be arranged to update the one or more inodes to include the log entry key.

In some embodiments, file system engines may be arranged to modify inode data structures to store references to the most recent log entry key that affected each inode. In some embodiments, storing log entry keys in inode metadata enables file system engines to quickly determine entry points into the transaction dependency graph for selective log entry flushing operations, or the like. For example, in some embodiments, if a distributed lock manager requests that log entries associated with a specific inode be flushed to a target file system, file system engines may be arranged to use the log entry key stored in the inode metadata to identify the starting point for dependency graph traversal operations.

Note, this flowchart block is indicated as being optional because in some embodiments updating the last log entry for the inodes may be omitted.

Next, in one or more of the various embodiments, control may be returned to a calling process.

Figure 13:
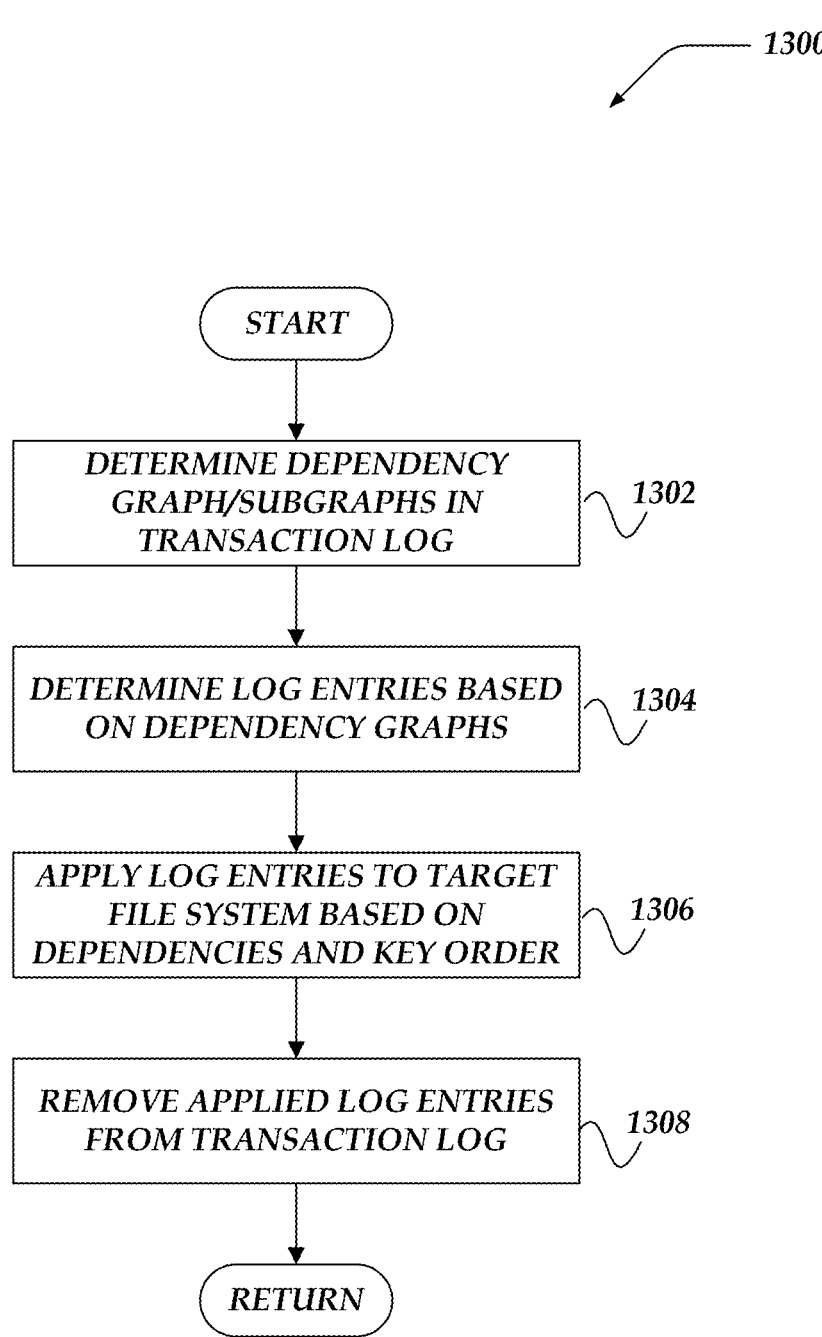
FIG. 13 illustrates a flowchart for a process for managing file system transaction dependencies in accordance with one or more of the various embodiments.

FIG. 13 illustrates a flowchart for process 1300 for managing file system transaction dependencies in accordance with one or more of the various embodiments. At flowchart block 1302, in one or more of the various embodiments, file system engines may be arranged to collect or determine one or more dependency graphs or subgraphs based on the transaction log.

In some embodiments, file system engines may be arranged to analyze the transaction log to construct directed acyclic graph (DAG) representations of transaction dependencies based on the inodes associated with each log entry. In some embodiments, file system engines may be arranged to examine log entry metadata that includes log entry keys, lists of affected inodes, or the like to determine which log entries may be dependent on other log entries based on shared inode references. Accordingly, in some embodiments, if two or more log entries reference one or more of the same inodes, file system engines may be arranged to establish a dependency relationship between those log entries such that the log entry with the earlier log entry key may be considered a dependency of the log entry with the later log entry key.

In some embodiments, file system engines may be arranged to construct dependency graphs by treating each log entry as a node in the graph with edges representing dependency relationships between log entries that share one or more inode references. In some embodiments, the graph may be represented as a map keyed by log entry key values, wherein the value associated with each key may be a log entry data structure that contains dependency information, including adjacency lists that identify other log entries in the dependency graph. Accordingly, in some embodiments, file system engines may be arranged to employ graph traversal algorithms, such as depth-first search or breadth-first search, to explore the dependency relationships starting from one or more entry points into the graph.

In some embodiments, file system engines may be arranged to identify independent subgraphs within the larger dependency graph based on the absence of shared inode references between different portions of the graph. In some embodiments, two or more subgraphs may be considered independent if they do not share any common inode dependencies such that operations represented by log entries in one subgraph do not affect the same file system items as operations represented by log entries in another subgraph. Accordingly, in some embodiments, file system engines may be arranged to partition the transaction log dependency graph into one or more independent subgraphs to enable parallel processing of log entries from different subgraphs without violating transaction ordering requirements or namespace consistency constraints.

At flowchart block 1304, in one or more of the various embodiments, file system engines may be arranged to determine or collect one or more log entries based on the dependency graphs or subgraphs.

In some embodiments, file system engines may be arranged to select log entries from the identified dependency graphs or subgraphs based on various criteria, such as dependency completion status, or the like. In some embodiments, file system engines may be arranged to determine that a log entry may be ready for application if all of its dependency log entries have already been applied to the target file system or have been removed from the transaction log. Accordingly, in some embodiments, file system engines may be arranged to identify leaf nodes in the dependency graph that represent log entries with no remaining unapplied dependencies, wherein leaf log entries may be candidates for immediate application to target file systems.

At flowchart block 1306, in one or more of the various embodiments, file system engines may be arranged to apply the one or more log entries to the target file system based on the dependencies and the log entry key order.

In some embodiments, file system engines may be arranged to replay the collected log entries on the target file system by executing the file system operations represented by each log entry in a sequence that respects both the log entry key ordering or dependency relationships between log entries. In some embodiments, file system engines may be arranged to ensure that log entries may be applied in ascending order based on their log entry key values to maintain the temporal ordering of transactions as they occurred on the source file system. Accordingly, in some embodiments, file system engines may be arranged to verify that each log entry's dependency requirements have been satisfied before applying that log entry to the target file system such that dependency requirements may be satisfied if all log entries that the current log entry depends on have already been applied or removed from the transaction log.

At flowchart block 1308, in one or more of the various embodiments, file system engines may be arranged to remove the applied log entries from the transaction log.

In some embodiments, file system engines may be arranged to delete log entry data structures from transaction log storage if their corresponding transactions have been successfully applied to the target file system or acknowledged by the target file system as having been received or processed.

Figure 14:
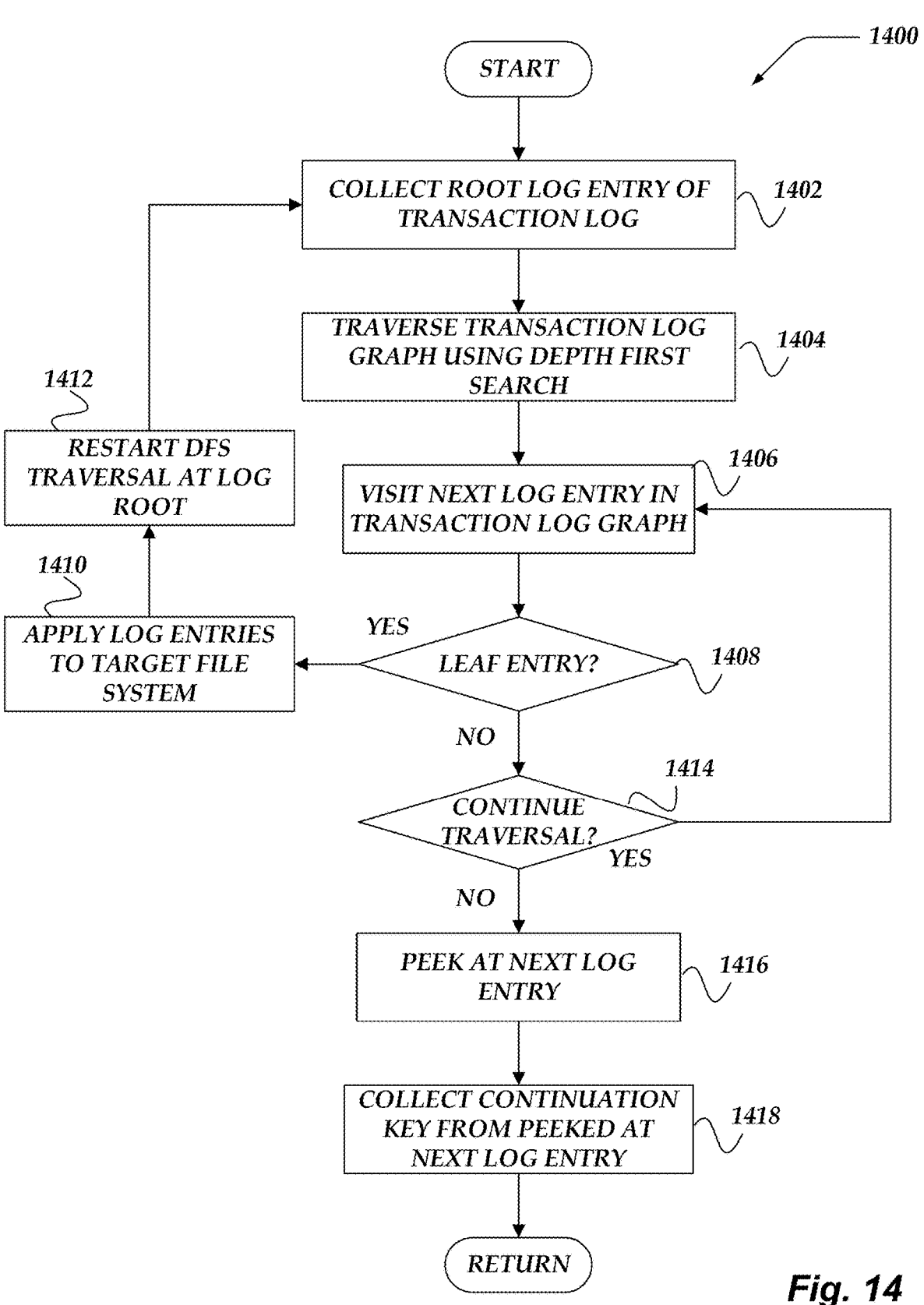
FIG. 14 illustrates a flowchart for a process for managing file system transaction dependencies in accordance with one or more of the various embodiments.

Next, in one or more of the various embodiments, control may be returned to a calling process FIG. 14 illustrates a flowchart for process 1400 for managing file system transaction dependencies in accordance with one or more of the various embodiments. At flowchart block 1402, in one or more of the various embodiments, file system engines may be arranged to collect or determine a root log entry of the transaction log.

In some embodiments, file system engines may be arranged to identify one or more root log entries in the transaction log dependency graph that may provide starting points for graph traversal operations. In some embodiments, root log entries may be considered to be log entries that have one or more unresolved dependencies from other log entries in the transaction log such that they may serve as entry points for depth-first search traversal algorithms to determine or collect the one or more dependent log entries. Accordingly, in some embodiments, file system engines may be arranged to examine log entry metadata, including log entry key values, associated inode lists, dependency references, or the like to determine which log entries may be eligible to serve as root nodes for graph traversal operations. Also, in some embodiments, file system engines may be arranged to examine an inode's last modified log entry key to determine the root for graph traversals, such that the dependency subgraph of all changes that must be applied to synchronize this inode may be discovered.

In some embodiments, file system engines may be arranged to select the earliest unprocessed log entry in the transaction log as the initial root for traversal operations based on log entry key ordering. In some embodiments, root log entries may change over time as log entries may be applied to target file systems or removed from the transaction log such that previously dependent log entries become new root entries if their dependencies have been satisfied. Accordingly, in some embodiments, file system engines may be arranged to maintain iterator data structures that track the current root of the transaction log graph to enable resumption of traversal operations from the appropriate starting point.

At flowchart block 1404, in one or more of the various embodiments, file system engines may be arranged to traverse the transaction log graph using depth first search (DFS).

In some embodiments, file system engines may be arranged to execute depth-first search algorithms that explore transaction log dependency graphs by following dependency relationships from root log entries toward leaf log entries that have no remaining dependencies. In some embodiments, depth-first search traversal may enable file system engines to systematically explore dependency chains by visiting each log entry in the graph or subgraph in turn, evaluating its dependencies, following those dependencies to deeper levels in the graph until reaching leaf nodes or processing limits. Accordingly, in some embodiments, file system engines may be arranged to implement iterative depth-first search algorithms that enable controlled traversal of arbitrarily large transaction log graphs without requiring the entire graph structure to be loaded into memory simultaneously.

In some embodiments, file system engines may be arranged to maintain traversal state information using iterator data structures that record the current position in the graph, visited log entries, pending branches to explore, continuation points for resuming traversal operations, or the like.

At flowchart block 1406, in one or more of the various embodiments, file system engines may be arranged to visit the next log entry in the transaction log graph.

In some embodiments, file system engines may be arranged to advance the depth-first search traversal to the next log entry in the transaction log dependency graph by following dependency relationships from the current log entry to one of its dependent log entries. Accordingly, in some embodiments, file system engines may be arranged to evaluate the dependency relationships of the visited log entry to determine if the log entry has additional dependencies that require further traversal deeper into the dependency graph or if the log entry represents a leaf node with no remaining unapplied dependencies. For example, if a log entry has one or more dependencies and each of those dependencies has previously been applied to the target file system, a log entry may be considered a leaf node.

In some embodiments, file system engines may be arranged to increment a traversal counter that tracks the number of log entries visited during the current depth-first search iteration to enforce memory consumption limits or traversal quotas. In some embodiments, file system engines may be arranged to compare the traversal counter against a configured threshold value N that represents the maximum number of log entries that may be visited before the traversal operation should be suspended to preserve memory resources.

At flowchart decision block 1408, in one or more of the various embodiments, if the visited log entry may be a leaf log entry of the transaction log, control may flow to flowchart block 1410; otherwise, control may flow to flowchart decision block 1414.

In some embodiments, file system engines may be arranged to determine if the currently visited log entry represents a leaf node in the transaction log dependency graph by evaluating if the log entry has any remaining dependencies on other log entries that have not yet been applied to the target file system. In some embodiments, a log entry may be considered a leaf entry if all of the log entries that it depends on have already been successfully applied to the target file system, removed from the transaction log, or are positioned earlier in the log entry key ordering such that they fall outside the current flush window or traversal scope. Accordingly, in some embodiments, file system engines may be arranged to examine dependency metadata associated with the visited log entry, including lists of inode identifiers, references to dependent log entry keys, or the like to determine if any outstanding dependencies remain unresolved.

At flowchart block 1410, in one or more of the various embodiments, file system engines may be arranged to apply one or more log entries to the target file system.

In some embodiments, file system engines may be arranged to replay the file system operations represented by one or more leaf log entries on the target file system by executing the transaction operations included in each log entry in ascending order based on log entry key values. In some embodiments, applying log entries may include communicating log entry data structures or transaction operation information over one or more networks to file system engines operating on the target file system such that the target file system engines may execute the file system operations locally on the target file system storage. Accordingly, in some embodiments, file system engines may be arranged to ensure that log entries may be applied to target file systems in a sequence that maintains file system consistency, respects dependency relationships between log entries, preserves namespace integrity across the distributed file system infrastructure, or the like.

In some embodiments, file system engines may be arranged to remove successfully applied log entries from the transaction log to free storage space, eliminate satisfied dependencies that may enable additional log entries to become eligible for application, update in-flight window boundaries to reflect log processing progress, or the like.

At flowchart block 1412, in one or more of the various embodiments, file system engines may be arranged to restart the depth first search traversal at the root log entry.

In some embodiments, file system engines may be arranged to resume transaction log graph traversal operations from the original root log entry or the current effective root log entry after completing the application of one or more leaf log entries to target file systems. In some embodiments, restarting traversal at the root log entry may enable file system engines to discover additional log entries that may have become eligible for application because their dependencies were satisfied by the previously applied leaf log entries. Accordingly, in some embodiments, file system engines may be arranged to employ iterator data structures that maintain references to the current root of the transaction log graph such that the root may be updated dynamically as log entries may be applied or removed from the transaction log.

At flowchart decision block 1414, in one or more of the various embodiments, if the traversal may continue, control may loop back to flowchart block 1406; otherwise, control may flow to flowchart block 1416.

In some embodiments, file system engines may be arranged to determine if the current depth-first search traversal operation should continue exploring the transaction log dependency graph or if the traversal should be suspended to enable other file system operations to execute. In some embodiments, traversal continuation decisions may be based on various criteria, such as the number of log entries visited during the current traversal iteration, available memory resources, time elapsed since traversal initiation, scheduling priorities for competing file system operations, or the like. Accordingly, in some embodiments, file system engines may be arranged to compare the traversal counter that tracks visited log entry counts against one or more configured threshold values to determine if the traversal has examined sufficient log entries during the current iteration.

At flowchart block 1416, in one or more of the various embodiments, file system engines may be arranged to peek at the next log entry.

In some embodiments, file system engines may be arranged to examine the next log entry in the depth-first search traversal path without fully processing or visiting that log entry to collect information for generating continuation keys.

At flowchart block 1418, in one or more of the various embodiments, file system engines may be arranged to collect or determine a continuation key from the peeked at next log entry.

In some embodiments, file system engines may be arranged to extract the log entry key value from the peeked-at log entry to establish a continuation point that enables the current depth-first search traversal to be suspended or resumed during a subsequent traversal iteration. In some embodiments, continuation keys may be log entry key values that represent specific positions in the transaction log dependency graph from which traversal operations may be restarted without requiring redundant processing of previously visited portions of the graph.

Next, in one or more of the various embodiments, control may be returned to a calling process.

Figure 15:
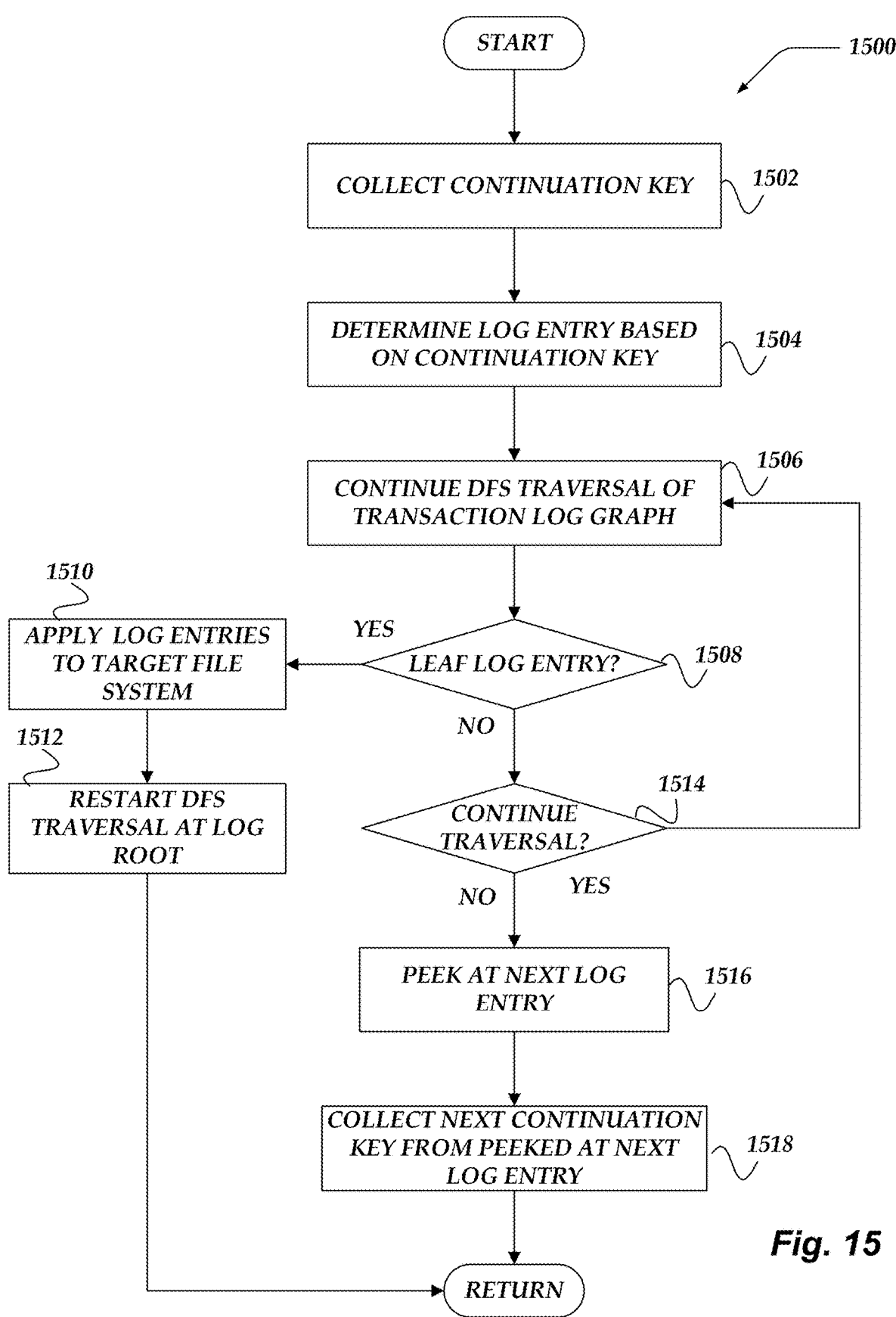
FIG. 15 illustrates a flowchart for a process for managing file system transaction dependencies in accordance with one or more of the various embodiments.

FIG. 15 illustrates a flowchart for process 1500 for managing file system transaction dependencies in accordance with one or more of the various embodiments. Note, some of the flowchart blocks for this process may be the same or similar to flowchart block described above for process 1400. Accordingly, for brevity or clarity redundant descriptions may be omitted.

At flowchart block 1502, in one or more of the various embodiments, file system engines may be arranged to collect or determine a continuation key.

In some embodiments, continuation keys may represent specific positions in the transaction log dependency graph from which a previous depth-first search traversal operation was suspended to preserve memory resources or to enable other file system operations to execute. In some embodiments, file system engines may be arranged to retrieve continuation key values from iterator data structures, scheduling system records, or graph traversal state machines that track the progress of ongoing transaction log processing operations. Accordingly, in some embodiments, continuation keys may be log entry key values that identify specific log entries in the transaction log that serve as resumption points for continuing suspended graph traversal operations without requiring redundant processing of previously visited portions of the dependency graph.

In some embodiments, file system engines may be arranged to maintain one or more continuation keys for each active transaction log flush operation such that multiple independent flush operations targeting different portions of the transaction log may be proceeding concurrently with separate traversal states. In some embodiments, file system engines may be arranged to store continuation keys in durable storage structures using data protection mechanisms that ensure continuation state information survives node failures, system restarts, or other interruption events. Accordingly, in some embodiments, continuation keys may be associated with metadata that describes the context of the suspended traversal operation, including the original root log entry, the number of log entries visited during previous iterations, the subgraph being explored, or the like.

At flowchart block 1504, in one or more of the various embodiments, file system engines may be arranged to collect or determine a log entry based on continuation key.

In some embodiments, file system engines may be arranged to locate the specific log entry in the transaction log that corresponds to the continuation key value by employing transaction log indexes, lookup tables, log entry maps, or other data structures that enable rapid retrieval of log entries based on their associated log entry key values.

In some embodiments, file system engines may be arranged to load log entry data structures into memory buffers, or cache structures that support subsequent depth-first search traversal operations starting from the continuation point. Thus, in some embodiments, retrieving the continuation log entry may enable file system engines to resume transaction log graph exploration from the position where the previous traversal iteration was suspended such that redundant processing of already-explored portions of the dependency graph may be avoided while maintaining consistent forward progress through the transaction log.

At flowchart block 1506, in one or more of the various embodiments, file system engines may be arranged to restart or continue a depth first search traversal of the transaction log.

In some embodiments, file system engines may be arranged to resume depth-first search operations starting from the log entry identified by the continuation key rather than restarting traversal operations from the original root of the transaction log dependency graph. In some embodiments, file system engines may be arranged to employ traversal algorithms that follow dependency relationships from the continuation log entry toward leaf log entries that have no remaining dependencies on other log entries in the transaction log. Accordingly, in some embodiments, file system engines may be arranged to maintain traversal counters, visited log entry sets, exploration depth indicators, or other state information that enables controlled iteration through the transaction log dependency graph while enforcing memory consumption limits or traversal quotas.

At flowchart decision block 1508, in one or more of the various embodiments, if the leaf log entry may be visited, control may flow to block 1510; otherwise, control may flow to flowchart decision block 1514.

In some embodiments, file system engines may be arranged to determine if the currently visited log entry represents a leaf node in the transaction log dependency graph by evaluating if the log entry has any remaining dependencies on other log entries that have not yet been applied to the target file system or removed from the transaction log.

At flowchart block 1510, in one or more of the various embodiments, file system engines may be arranged to apply one or more log entries to the target file system.

In some embodiments, file system engines may be arranged to replay the file system operations represented by one or more discovered leaf log entries on one or more target file systems by executing the transaction operations included in each log entry according to their log entry key ordering. In some embodiments, applying log entries may include communicating log entry data structures, or the like over one or more networks to file system engines operating on target file systems such that the target file system engines may execute the file system operations locally on target file system storage infrastructure. Accordingly In some embodiments, file system engines may be arranged to remove successfully applied log entries from the transaction log.

At flowchart block 1512, in one or more of the various embodiments, file system engines may be arranged to restart the depth first search traversal of the at the root log entry of transaction log.

In some embodiments, file system engines may be arranged to resume transaction log dependency graph traversal operations from the original root log entry or the current effective root log entry after completing the application of one or more leaf log entries to target file systems.

At flowchart decision block 1514, in one or more of the various embodiments, if the depth first search traversal may continue, control may loop back to flowchart block 1506; otherwise, control may flow to flowchart block 1516.

In some embodiments, file system engines may be arranged to determine if the current depth-first search traversal operation should continue exploring the transaction log dependency graph or if the traversal should be suspended to enable other file system operations to execute, to preserve memory resources, or to avoid exceeding configured traversal iteration limits.

At flowchart block 1516, in one or more of the various embodiments, file system engines may be arranged to peek at the next log entry in the transaction log.

In some embodiments, file system engines may be arranged to examine the next log entry in the depth-first search traversal path without fully processing, visiting, or applying that log entry to collect information for generating continuation keys that enable the current traversal operation to be suspended or resumed during a subsequent traversal iteration.

At flowchart block 1518, in one or more of the various embodiments, file system engines may be arranged to collect or determine a next continuation key from the peeked at log entry.

In some embodiments, file system engines may be arranged to extract the log entry key value from the peeked-at log entry to establish a continuation point that enables the current depth-first search traversal to be suspended or resumed during a subsequent traversal iteration without losing progress through the transaction log dependency graph.

Next, in one or more of the various embodiments, control may be returned to a calling process.

Figure 16:
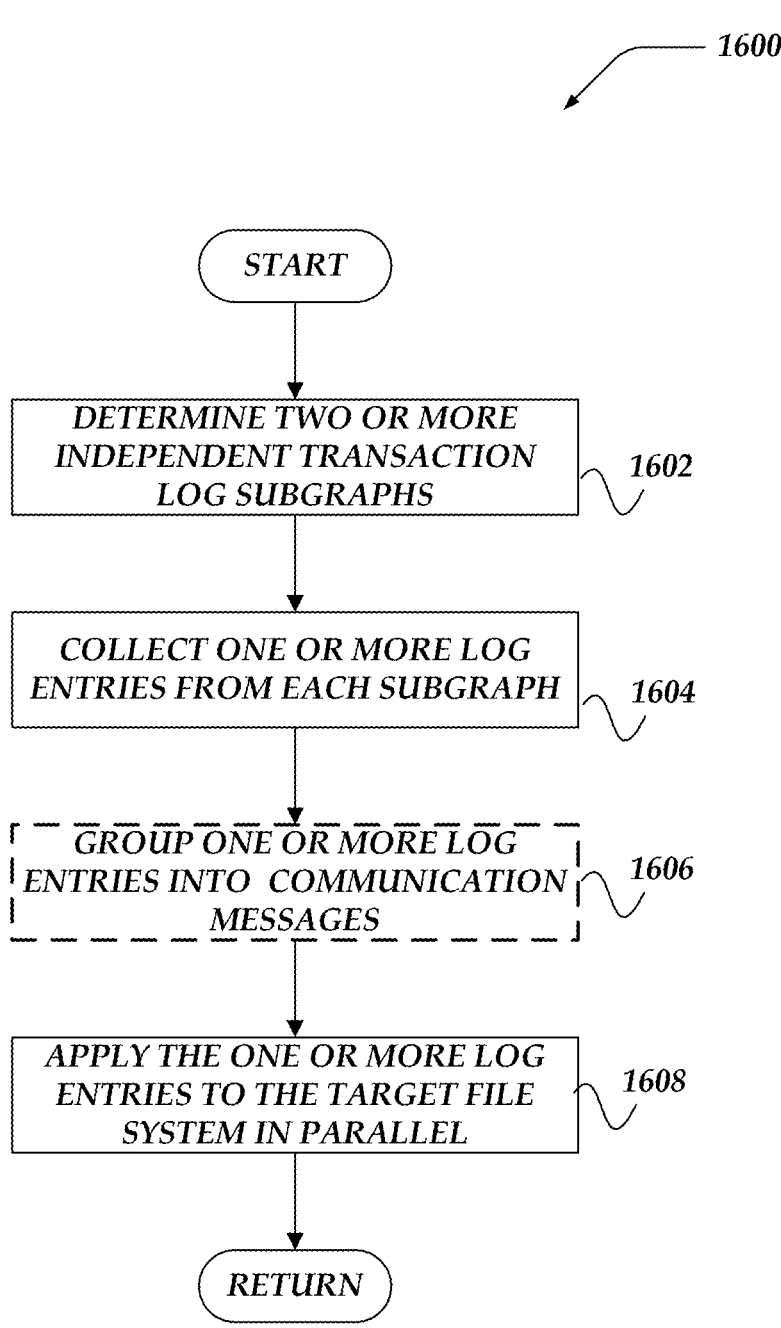
FIG. 16 illustrates a flowchart for a process for managing file system transaction dependencies in accordance with one or more of the various embodiments.

FIG. 16 illustrates a flowchart for process 1600 for managing file system transaction dependencies in accordance with one or more of the various embodiments. At flowchart block 1602, in one or more of the various embodiments, file system engines may be arranged to determine two or more independent transaction log subgraphs.

In some embodiments, file system engines may be arranged to analyze the transaction log dependency graph to identify two or more subgraphs that may be considered independent based on the absence of shared inode dependencies between the subgraphs. In some embodiments, two subgraphs may be considered independent if they do not reference any common inodes such that file system operations represented by log entries in one subgraph do not affect the same file system items as operations represented by log entries in another subgraph. Accordingly, in some embodiments, file system engines may be arranged to examine log entry metadata, including lists of affected inode identifiers, dependency relationships, or the like to determine which portions of the transaction log dependency graph may be processed independently without violating transaction ordering requirements or consistency constraints. Also, in some embodiments, file system engines may be arranged to examine dependent log entry key values stored or referenced in a log entry to determine dependent log entries rather than using application specific values, such as inodes which may enable transaction logs and log entries to be employed in other contexts.

In some embodiments, file system engines may be arranged to employ graph partitioning algorithms that analyze the structure of the transaction log dependency graph to identify disconnected subgraphs, independent branches, or separate dependency chains that do not share common vertices representing shared inodes. In some embodiments, file system engines may be arranged to construct subgraph representations by grouping log entries that share transitive dependency relationships through common inode references while separating log entries that lack any dependency path connecting them through shared inodes. Accordingly, in some embodiments, file system engines may be arranged to validate that identified subgraphs maintain internal consistency by ensuring that all dependency relationships within each subgraph may be preserved such that log entries within a subgraph may be applied in correct dependency order based on their log entry key values.

At flowchart block 1604, in one or more of the various embodiments, file system engines may be arranged to collect one or more log entries from each transaction log subgraph.

In some embodiments, file system engines may be arranged to select log entries from each identified independent subgraph based on various criteria, such as dependency completion status, log entry key ordering, in-flight window capacity constraints, or the like. In some embodiments, file system engines may be arranged to determine which log entries within each subgraph may be ready for application to the target file system by evaluating if all dependency requirements for those log entries have been satisfied such that all log entries that a candidate log entry depends on have already been applied to the target file system or have been removed from the transaction log. Accordingly, in some embodiments, file system engines may be arranged to identify leaf nodes within each independent subgraph that represent log entries with no remaining unapplied dependencies such that these leaf log entries may be candidates for immediate parallel application across the independent subgraphs.

In some embodiments, file system engines may be arranged to employ dependency graph traversal algorithms, such as depth-first search or breadth-first search, to explore each independent subgraph separately to locate log entries that satisfy application readiness criteria. In some embodiments, file system engines may be arranged to maintain separate traversal state information for each independent subgraph to enable concurrent exploration of multiple subgraphs without interference between the separate traversal operations. Accordingly, in some embodiments, file system engines may be arranged to collect log entries from each subgraph in batches that respect in-flight window capacity limitations, memory resource constraints, network bandwidth availability, or the like that may limit the number of log entries that may be processed simultaneously.

At flowchart block 1606, in one or more of the various embodiments, optionally, file system engines may be arranged to group one or more log entries into one or more communication messages.

In some embodiments, file system engines may be arranged to combine multiple log entries from one or more independent subgraphs into one or more consolidated communication messages that may be transmitted to target file systems in a single network operation. In some embodiments, grouping log entries into communication messages may be advantageous if the target file system may be configured to have higher per-operation latency but sufficient aggregate bandwidth to process larger batches of log entries such that reducing the number of communication operations may improve overall throughput. Accordingly, in some embodiments, file system engines may be arranged to evaluate the performance characteristics of target file systems, including per-transaction latency metrics, available bandwidth capacity, network round-trip times, or the like to determine optimal communication message sizes that maximize log entry application throughput.

In some embodiments, file system engines may be arranged to implement combining policies that specify maximum communication message sizes, preferred batch sizes, timeout thresholds for buffering log entries, or the like based on observed performance characteristics of the network infrastructure or target file system processing capabilities. In some embodiments, file system engines may be arranged to ensure that communication messages include all dependency information required for the grouped log entries such that the target file system may determine correct application ordering for log entries within the combined message. Accordingly, in some embodiments, file system engines may be arranged to validate that combining operations do not violate dependency constraints by verifying that if a log entry may be included in a communication message, all log entries that it depends on may also be included in the same communication message or have already been successfully applied to the target file system.

In some embodiments, file system engines may be arranged to optimize communication message construction by grouping log entries from independent subgraphs into the same messages to enable the target file system to process multiple independent dependency chains in parallel upon receipt of the combined message. In some embodiments, file system engines may be arranged to include log entries from dependent chains in the same communication message if all dependencies for the included log entries may be satisfied by other log entries in the message or by previously applied log entries on the target file system. Accordingly, in some embodiments, file system engines may be arranged to employ rules, instructions, or the like provided via configuration information to determine communication message grouping strategies, maximum message sizes, batching thresholds, or the like to account for local requirements, network characteristics, target file system capabilities, or the like.

Note, this flowchart block is indicated as being optional because in some cases for some embodiments file system engines may be configured to communicate log entries individually without grouping operations, such as if the target file system may have low per-operation latency that makes batching unnecessary, if network characteristics favor smaller frequent communications over larger batched messages, or if file system policies prioritize immediate log entry application over batched processing efficiency.

At flowchart block 1608, in one or more of the various embodiments, file system engines may be arranged to apply the one or more log entries to the target file system in parallel.

In some embodiments, file system engines may be arranged to execute coordinated parallel replay operations that apply log entries from multiple independent subgraphs to the target file system concurrently using multiple processing resources, network connections, or target file system nodes. In some embodiments, file system engines may be arranged to distribute log entry application operations across available compute resources on the target file system cluster by assigning log entries from different independent sub-graphs to different nodes or processing threads that operate simultaneously without requiring serialization between independent log entry streams. Accordingly, in some embodiments, parallel application of independent log entries may enable file system engines to utilize the full capacity of target file system infrastructure, including multiple nodes in a cluster, parallel storage systems, distributed processing capabilities, or the like that would remain underutilized if log entries were applied serially.

In some embodiments, file system engines may be arranged to handle scenarios if the target file system may be composed of fewer nodes or may have less aggregate processing capacity than the source file system by employing combining operations that enable a higher-latency but higher-bandwidth target file system to keep up with a lower-latency but lower-bandwidth source file system. In some embodiments, file system engines may be arranged to execute quality of service policies that prioritize application of log entries associated with interactive user workloads, such as user home directory operations, over log entries associated with background batch processing, such as render jobs or data analysis operations. Accordingly, in some embodiments, file system engines may be arranged to employ scheduling algorithms that enable prioritization policies based on user identity information, data category classifications, file system path hierarchies, or other hints that may be provided by file system clients or determined from file system metadata. Thus, in some embodiments, parallel application of independent log entry subgraphs may enable file system engines to maximize the utilization of target file system resources while maintaining transactional consistency, preserving namespace integrity, respecting quality of service priorities, or the like across geographically distributed file system infrastructure.

Next, in one or more of the various embodiments, control may be returned to a calling process.

Figure 17:
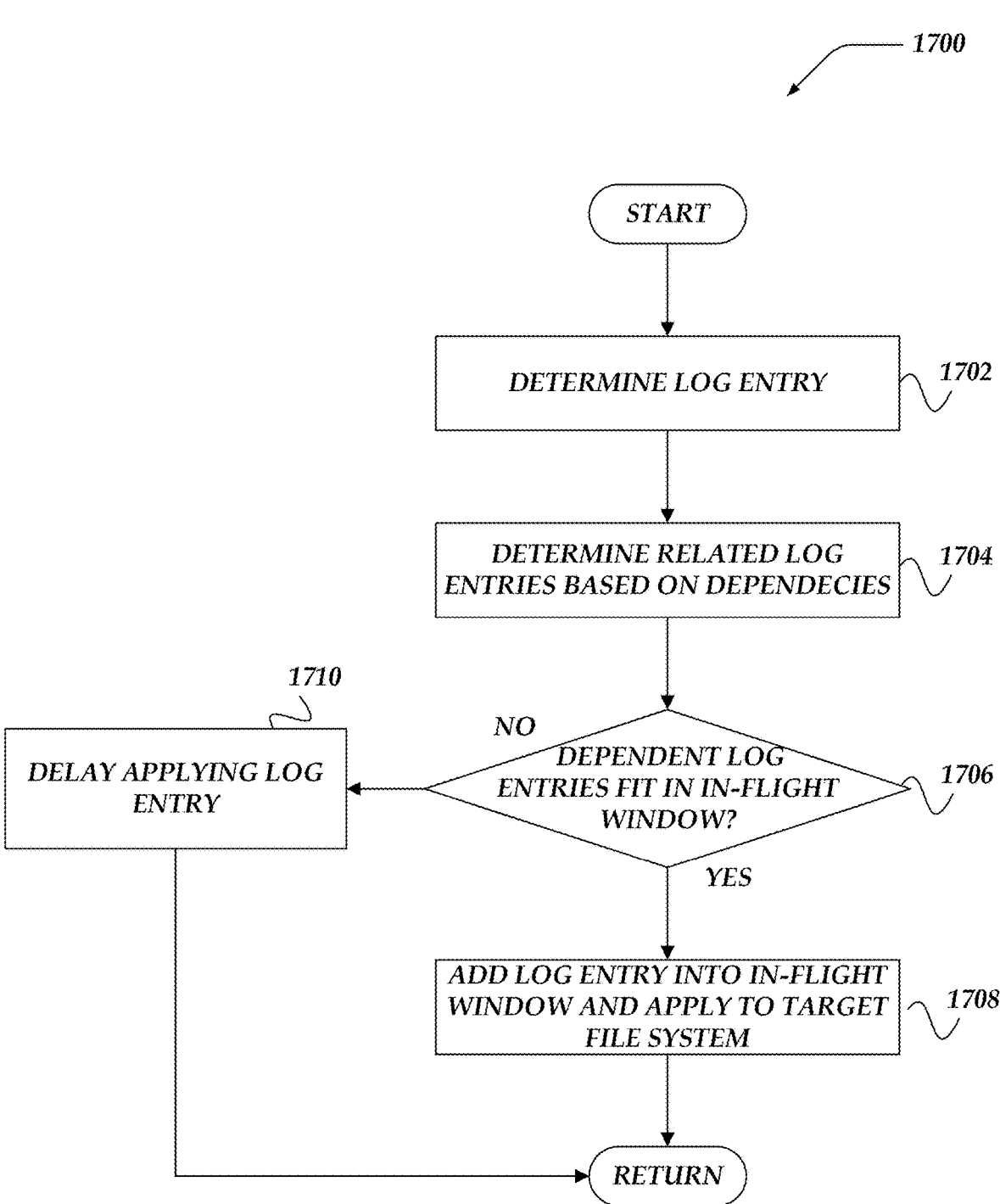
FIG. 17 illustrates a flowchart for a process for managing file system transaction dependencies in accordance with one or more of the various embodiments.

FIG. 17 illustrates a flowchart for process 1700 for managing file system transaction dependencies in accordance with one or more of the various embodiments. After a start flowchart block, at flowchart block 1702, in one or more of the various embodiments, file system engines may be arranged to determine or collect a log entry from the transaction log.

In some embodiments, file system engines may be arranged to select one or more candidate log entries from the transaction log that may be ready for communication to one or more target file systems for application to those target file systems. In some embodiments, candidate log entries may be selected based on various criteria, such as log entry key ordering, dependency graph position, in-flight window capacity constraints, flush policies, priority hints associated with user workloads, data categories, or the like. Accordingly, in some embodiments, file system engines may be arranged to evaluate the current state of the transaction log to identify log entries that may be eligible for processing based on their position in the dependency graph, completion status of their dependencies, in-flight window availability, or the like.

At flowchart block 1704, in one or more of the various embodiments, file system engines may be arranged to determine one or more log entries related to the log entry.

In some embodiments, file system engines may be arranged to identify all log entries in the transaction log that may be dependencies of the candidate log entry by analyzing the dependency relationships encoded in the transaction log dependency graph. In some embodiments, file system engines may be arranged to examine the log entry metadata associated with the candidate log entry to determine which inodes may be referenced by the transaction operations represented by that log entry. Accordingly, in some embodiments, file system engines may be arranged to search the transaction log dependency graph to locate other log entries that reference the same inodes or have log entry key values that establish dependency ordering relationships with the candidate log entry.

At flowchart decision block 1706, in one or more of the various embodiments, if the dependent log entries for the log entry fit into the in-flight window, control may flow to flowchart block 1708; otherwise, control may flow to flowchart block 1710.

In some embodiments, file system engines may be arranged to evaluate whether all log entries that the candidate log entry depends on may be accommodated within the available capacity of the in-flight window that manages flow control for log entry communication to target file systems. In some embodiments, the in-flight window may be considered a bounded memory buffer or accounting mechanism that tracks log entries currently being transmitted to or processed by target file systems to prevent overwhelming target file system resources, exhausting network bandwidth, or causing buffer overflow conditions. Accordingly, in some embodiments, file system engines may be arranged to calculate the memory consumption, log entry count, or aggregate size of the candidate log entry together with all of its outstanding dependencies to determine if they collectively fit within the remaining capacity of the in-flight window.

In some embodiments, file system engines may be arranged to recognize that adding a candidate log entry to the in-flight window without first ensuring that all of its dependencies may also fit in the in-flight window could create a deadlock scenario. In some embodiments, such deadlock scenarios may occur if the in-flight window becomes full with the candidate log entry that depends on other log entries that cannot be added to the now-full in-flight window such that the candidate log entry cannot be applied to the target file system because its dependencies remain unsatisfied, yet the in-flight window has no available capacity to accommodate the missing dependencies. Accordingly, in some embodiments, file system engines may be arranged to implement deadlock avoidance policies that require dependencies of a candidate log entry to either already be present in the in-flight window, already be applied to the target file system, or be able to fit in the remaining in-flight window capacity before the candidate log entry may be added to the in-flight window.

At flowchart block 1708, in one or more of the various embodiments, file system engines may be arranged to add the log entry into the in-flight window and apply it to the target file system.

In some embodiments, file system engines may be arranged to allocate space within the in-flight window memory buffer or tracking structures for the candidate log entry together with any of its dependencies that may not already be present in the in-flight window. In some embodiments, adding log entries to the in-flight window may include updating in-flight window accounting data structures, such as maps, lists, sets, or the like that track which log entries may be currently in transit to the target file system or awaiting application on the target file system. Accordingly, in some embodiments, file system engines may be arranged to mark the candidate log entry, its dependencies, or the like as being in-flight to prevent duplicate processing attempts, to support progress tracking, or to enable scheduling decisions for subsequent log entry processing operations.

In some embodiments, file system engines may be arranged to communicate the candidate log entry to the target file system by serializing log entry data structures, including log entry keys, inode lists, operation information, transaction data, logical time timestamps, or the like into one or more network messages that may be transmitted to file system engines operating on the target file system infrastructure. In some embodiments, file system engines may be arranged to employ network protocols, data serialization formats, compression algorithms, or the like that optimize log entry transmission efficiency, minimize network bandwidth consumption, or ensure reliable delivery of log entry information to target file system components.

In some embodiments, file system engines may be arranged to update in-flight window boundary information, such as the oldest log entry key in the in-flight window or the newest log entry key in the in-flight window, to reflect the addition of the candidate log entry to the in-flight processing pipeline. In some embodiments, file system engines may be arranged to employ these boundary markers to implement flow control policies that prevent the in-flight window from growing beyond configured capacity limits that could exhaust memory resources, overwhelm target file system processing capabilities, or introduce excessive latency in log entry application operations. Accordingly, in some embodiments, file system engines may be arranged to monitor in-flight window utilization metrics, such as the number of log entries currently in-flight, the aggregate memory consumption of in-flight log entries, the duration that log entries remain in-flight before being applied, or the like to detect potential performance issues, capacity constraints, or deadlock risks.

Next, in one or more of the various embodiments, control may be returned to a calling process.

At flowchart block 1710, in one or more of the various embodiments, file system engines may be arranged to delay applying the log entry to the target file system.

In some embodiments, file system engines may be arranged to defer processing of the candidate log entry if its dependencies cannot be accommodated within the available capacity of the in-flight window such that attempting to add the candidate log entry would create a deadlock scenario or violate in-flight window capacity constraints. In some embodiments, deferring log entry processing may include removing the candidate log entry from active consideration in the current processing cycle while maintaining records of the deferred log entry to enable scheduling systems to retry processing the log entry during subsequent processing cycles. Accordingly, in some embodiments, file system engines may be arranged to update scheduling data structures, job queues, processing backlogs, or the like to reflect that the candidate log entry remains pending or requires future processing attempts if sufficient in-flight window capacity becomes available.

In some embodiments, file system engines may be arranged to monitor the progress of in-flight log entry application operations to detect if completion of currently in-flight log entries may free sufficient in-flight window capacity to enable subsequent processing attempts for the deferred candidate log entry. In some embodiments, file system engines may be arranged to establish callback mechanisms, event notification systems, or polling strategies that enable the scheduling system to be informed if in-flight window capacity becomes available such that deferred log entries may be reconsidered for processing. Accordingly, in some embodiments, file system engines may be arranged to implement adaptive scheduling strategies that continuously re-evaluate deferred log entries to identify opportunities to resume their processing if system conditions change, such as if dependent log entries complete application to target file systems, if in-flight window capacity increases, or if alternative dependency satisfaction paths become available through parallel processing of independent subgraphs.

In some embodiments, file system engines may be arranged to update performance metrics, telemetry data, administrative monitoring dashboards, or the like to reflect the deferral of log entry processing to enable file system administrators to observe transaction log processing patterns, identify potential bottlenecks caused by in-flight window capacity limitations, or evaluate the effectiveness of configured in-flight window sizing parameters. In some embodiments, file system engines may be arranged to generate alerts, warnings, or recommendations if deferred log entry counts exceed configured thresholds, if average deferral durations increase beyond acceptable limits, or if patterns of repeated deferrals indicate potential system configuration issues that may require administrative intervention. Thus, in some embodiments, file system engines may be arranged to support adaptive capacity management by providing telemetry information that enables administrators to tune in-flight window parameters, adjust scheduling priorities, or allocate additional resources to improve transaction log processing performance across distributed file system deployments.

Next, in one or more of the various embodiments, control may be returned to a calling process.

Figure 18:
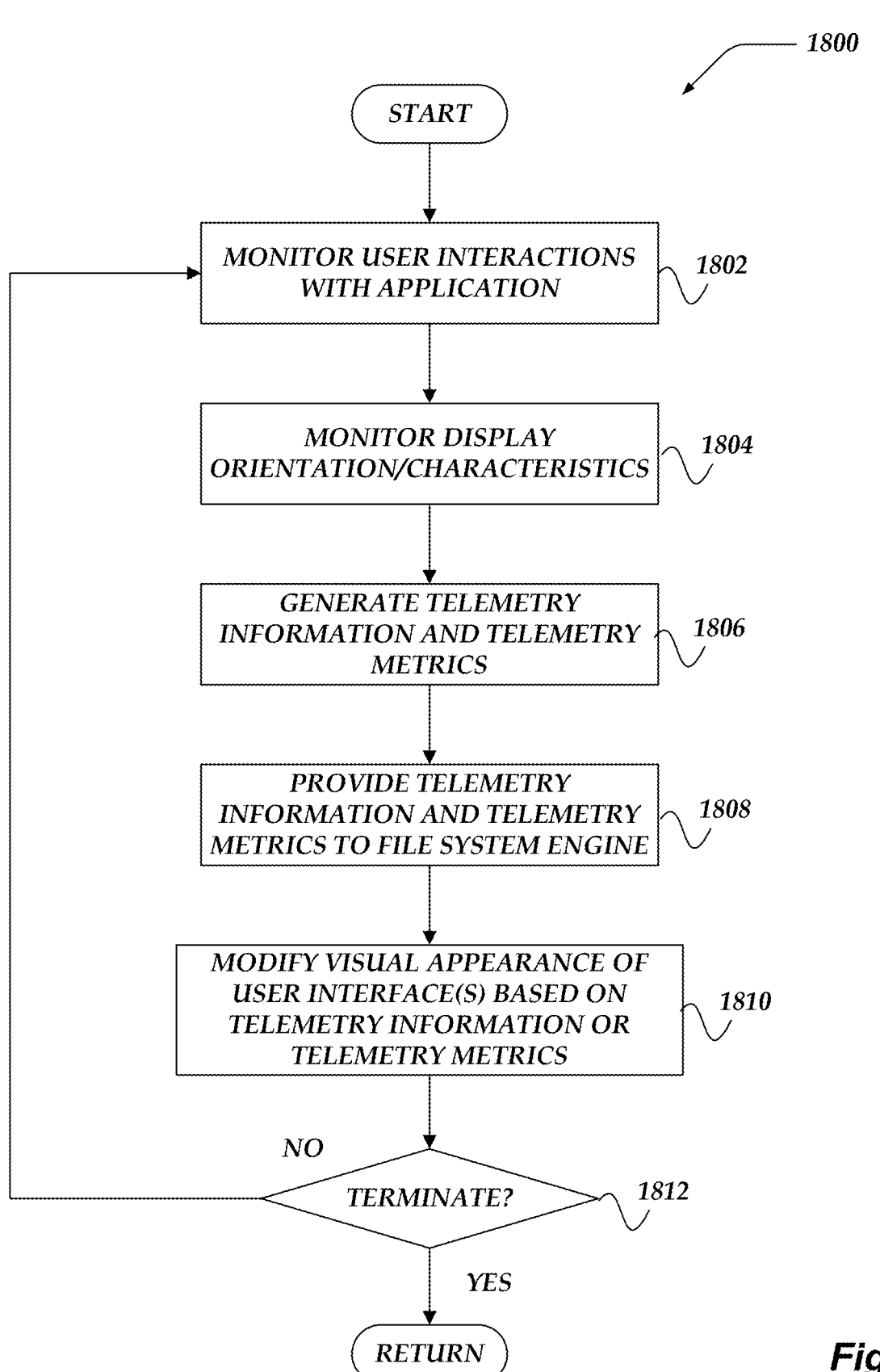
FIG. 18 illustrates a flowchart for a process for collecting and applying telemetry information and telemetry metrics for managing file system transaction dependencies in accordance with one or more of the various embodiments.

FIG. 18 illustrates a flowchart of process 1800 for collecting and applying telemetry information and telemetry metrics for managing file system transaction dependencies in accordance with one or more of the various embodiments. After a start flowchart block, at flowchart block 1802, in one or more of the various embodiments, telemetry engines may be arranged to monitor one or more user interactions with one or more applications. As described above, telemetry engines may be arranged to monitor or track how users may physically interact with one or more user interfaces associated with the one or more applications. In some embodiments, user interactions may include active interactions associated with user activity or passive interactions associated with user inactivity. Also, in one or more embodiments, various types of collected user telemetry may be based on a user's selection or non-selection of one or more particular elements or content in a display panel, pointing device (mouse) hover time over particular content or elements in a display panel, user dwell time between actions in a display panel, dwell time for viewing a display panel by a user, and the like. Also, in some embodiments, telemetry engines may be arranged to track mouse movement, eye movement, keystrokes, or the like, to determine how users may interact with information displayed in user interfaces. See, description for FIG. 11 for additional details.

At flowchart block 1804, in one or more of the various embodiments, telemetry engines may be arranged to monitor one or more display characteristics or display orientation characteristics.

As described above, in some embodiments, telemetry engines may be arranged to monitor various display characteristics employed for displaying the user interfaces, including the size/type of display, screen resolution, screen orientation, number of active displays, screen brightness, refresh rate, aspect ratio, color dynamic range, windowed or full screen modes, or the like. In some embodiments, screens, monitors, or operating systems may provide interfaces or APIs that enable telemetry engines to obtain information about the current state or status of the display screen. In some cases, for some embodiments, operating systems or other services may be configured to actively notify telemetry engines if one or more screen characteristics may change.

At flowchart block 1806, in one or more of the various embodiments, telemetry engines may be arranged to generate telemetry information or one or more telemetry metrics. In some embodiments, the monitored interactions or display characteristics may be represented as telemetry information or telemetry metrics. The particular format of the telemetry information or telemetry metrics may vary depending on the type interactions or characteristics being represented. Accordingly, in some embodiments, telemetry information or telemetry metrics may be included in one or more data structures that may be communicated to other applications or services. For example, in some embodiments, telemetry information or telemetry metrics may be represented using key-value pair data structures that include a key field representing the label or type of metric and a value field that represents the value of the metric.

At flowchart block 1808, in one or more of the various embodiments, telemetry engines may be arranged to provide the telemetry information and telemetry metrics to a runtime engine.

In some embodiments, telemetry engines may be arranged to provide one or more interfaces or APIs that enable other applications or services, such as file system engines, or the like, to gain access to the telemetry information or telemetry metrics. In some embodiments, telemetry engines may be configured to push some or all of the telemetry information or telemetry metrics to one or more subscribing application or services. Also, in some embodiments, telemetry engines may be configured to enable other application or services to poll or otherwise request-on-demand some or all of the telemetry information or telemetry metrics.

At flowchart block 1810, in one or more of the various embodiments, analysis engines or playbook engines may be arranged to modify the visual appearance of one or more user interfaces based on the telemetry information or telemetry metrics.

Accordingly, in some embodiments, analysis engines or playbook engines may be arranged to dynamically change the visual appearance of the one or more user interfaces to improve the efficiency and effectiveness of the user interfaces based on some or all of the telemetry information or telemetry metrics. For example, analysis engines may be arranged to dynamically select, position, size, shape, remove, hide, inactivate, disable, highlight, or style one or more visual user interface components such as display panels, controls, elements, or content based on, among other things, one or more telemetry metrics. For example, if telemetry information or telemetry metrics indicate that users are focusing on or navigating to particular user interface views, components or user interface panels, analysis engines or playbook engines may be arranged to highlight or size the preferred user interface elements or display panels. For example, if users are determined to rarely interact with a particular display panel, playbook engines may be arranged to reduce the size, diminish the shape, disable its controls, and re-position that display panel to improve the efficiency of display screen usage. See, also FIG. 12 and its description.

At decision flowchart block 1812, in one or more of the various embodiments, if the telemetry engine or file system engine may be terminated, control may be returned to a calling process; otherwise, control may loop back to flowchart block 1802. In some embodiments, telemetry engines may be arranged to continuously or periodically provide updated/current telemetry information or telemetry metrics to enable file system engines to dynamically change the visual appearance of the one or more user interfaces. Accordingly, in some embodiments, process 1800 may continue operation until it may be explicitly terminated or the operation of the associated file system engines may be terminated.

It will be understood that each flowchart block in each flowchart illustration, and combinations of flowchart blocks in each flowchart illustration, can be implemented by computer program instructions. These program instructions may be provided to a processor to produce a machine, such that the instructions, which execute on the processor, create means for implementing the actions specified in each flowchart block or flowchart blocks. The computer program instructions may be executed by a processor to cause a series of operational steps to be performed by the processor to produce a computer-implemented process such that the instructions, which execute on the processor, provide steps for implementing the actions specified in each flowchart block or flowchart blocks. The computer program instructions may also cause at least some of the operational steps shown in the flowchart blocks of each flowchart to be performed in parallel. Moreover, some of the steps may also be performed across more than one processor, such as might arise in a multi-processor computer system. In addition, one or more flowchart blocks or combinations of flowchart blocks in each flowchart illustration may also be performed concurrently with other flowchart blocks or combinations of flowchart blocks, or even in a different sequence than illustrated without departing from the scope or spirit of the invention.

Accordingly, each flowchart block in each flowchart illustration supports combinations of means for performing the specified actions, combinations of steps for performing the specified actions and program instruction means for performing the specified actions. It will also be understood that each flowchart block in each flowchart illustration, and combinations of blocks in each flowchart illustration, can be implemented by special purpose hardware based systems, which perform the specified actions or steps, or combinations of special purpose hardware and computer instructions. The foregoing example should not be construed as limiting or exhaustive, but rather, an illustrative use case to show an implementation of at least one of the various embodiments of the invention.

Further, in one or more embodiments (not shown in the figures), the logic in the illustrative flowcharts may be executed using an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. In one or more embodiments, a microcontroller may be arranged to directly execute its own embedded logic to perform actions and access its own internal memory and its own external Input and Output Interfaces (e.g., hardware pins or wireless transceivers) to perform actions, such as System On a Chip (SOC), or the like.

53

54

What is claimed as new and desired to be protected by Letters Patent of the United States is:

1. A method for managing data in a file system over a network using one or more processors to execute instructions that are configured to cause performance of actions, comprising:

obtaining a transaction log that includes a plurality of log entries, wherein each log entry is associated with a transaction that includes one or more file system operations, and wherein each log entry corresponds to an execution time and one or more inodes associated with its associated transaction;

collecting one or more dependency graphs based on one or more of the plurality of log entries, wherein each log entry in a dependency graph shares at least one inode with at least one adjacent log entry in the same dependency graph, and wherein a root log entry of each dependency graph is associated with latest execution time in the dependency graph based on a highest log entry key value among log entries included in the dependency graph;

collecting one or more leaf log entries based on one or more traversals of the one or more graphs, wherein a number of log entries are visited in each dependency graph until a traversal threshold is reached, and wherein a continuation key associated with a continuation log entry in each dependency graph is collected for a first unvisited log entry following visitation of one or more log entries during the continuing traversal of the dependency graph;

communicating the one or more leaf log entries to a target file system, wherein the target file system applies each communicated transaction associated with the communicated leaf log entries to execute each file system operation associated with each communicated transaction on the target file system; and obtaining a user interface that includes one or more display panels for content that includes a transaction log performance metrics and other information associated with the file system, wherein the content is dynamically transformed and arranged for display to a user based on one or more of user interaction telemetry, user feedback or a metric.

2. The method of claim 1, wherein the traversal of the one or more dependency graphs, further comprises:

suspending the traversal at each continuation log entry; and resuming the traversal from each continuation log entry based on the continuation key, wherein the continuation key enables traversal of each dependency graph.

3. The method of claim 1, further comprising:

collecting one or more first log entries from a first dependency graph of the one or more dependency graphs;

collecting one or more second log entries from a second dependency graph of the one or more dependency graphs, wherein the first dependency graph and the second dependency graph are independent based on an intersection of log entry keys in the first dependency graph and the second dependency graph being empty; and communicating the one or more first log entries and the one or more second log entries to the target file system in parallel, wherein the target file system applies one or more transactions associated with the one or more first log entries and one or more other transactions associated with the one or more second log entries in parallel.

4. The method of claim 1, further comprising:

collecting one or more read operations for a new transaction based on one or more first inodes that are accessed without modification during the new transaction; and collecting one or more write operations for the other new transaction based on one or more second inodes that are modified during the new transaction, wherein the one or more read operations and the one or more write operations are included in a log entry associated with the new transaction.

5. The method of claim 1, wherein collecting the one or more leaf log entries, further comprises:

obtaining an in-flight window that includes a bounded capacity for tracking one or more in-flight log entries pending communication to the target file system;

collecting one or more candidate log entries for communication to the target file system; and using the in-flight window to perform further actions, including:

collecting one or more dependency log entries associated with each candidate log entry; and adding the one or more candidate log entries to the in-flight window based on the capacity of the in-flight window accommodating the one or more candidate log entries and the one or more dependency log entries to avoid one or more deadlock conditions.

6. The method of claim 1, further comprising:

collecting a first group of the one or more log entries from a first dependency graph of the one or more dependency graphs;

collecting a second group of the one or more log entries from a second dependency graph of the one or more dependency graphs; and combining the first group of the one or more log entries and the second group of the one or more log entries into a same communication message, wherein the same communication message is communicated to the target file system.

7. The method of claim 1, further comprising:

updating one or more inodes associated with each log entry to include an associated key value based on storage of the log entry in the transaction log, wherein the associated key value is used to selectively collect one or more log entries associated with a particular inode.

8. A network computer for managing data in a file system over a network, comprising:

a memory that stores at least instructions; and one or more processors that execute instructions that are configured to cause performance of actions, including:

obtaining a transaction log that includes a plurality of log entries, wherein each log entry is associated with a transaction that includes one or more file system operations, and wherein each log entry corresponds to an execution time and one or more inodes associated with its associated transaction;

collecting one or more dependency graphs based on one or more of the plurality of log entries, wherein each log entry in a dependency graph shares at least one inode with at least one adjacent log entry in the same dependency graph, and wherein a root log entry of each dependency graph is associated with latest execution time in the dependency graph based on a highest log entry key value among log entries included in the dependency graph;

collecting one or more leaf log entries based on one or more traversals of the one or more graphs, wherein a number of log entries are visited in each dependency graph until a traversal threshold is reached, and wherein a continuation key associated with a continuation log entry in each dependency graph is collected for a first unvisited log entry following visitation of one or more log entries during the continuing traversal of the dependency graph;

communicating the one or more leaf log entries to a target file system, wherein the target file system applies each communicated transaction associated with the communicated leaf log entries to execute each file system operation associated with each communicated transaction on the target file system; and obtaining a user interface that includes one or more display panels for content that includes a transaction log performance metrics and other information associated with the file system, wherein the content is dynamically transformed and arranged for display to a user based on one or more of user interaction telemetry, user feedback or a metric.

9. The network computer of claim 8, wherein the traversal of the one or more dependency graphs, further comprises:

suspending the traversal at each continuation log entry; and resuming the traversal from each continuation log entry based on the continuation key, wherein the continuation key enables traversal of each dependency graph.

10. The network computer of claim 8, further comprising:

collecting one or more first log entries from a first dependency graph of the one or more dependency graphs;

collecting one or more second log entries from a second dependency graph of the one or more dependency graphs, wherein the first dependency graph and the second dependency graph are independent based on an intersection of log entry keys in the first dependency graph and the second dependency graph being empty; and communicating the one or more first log entries and the one or more second log entries to the target file system in parallel, wherein the target file system applies one or more transactions associated with the one or more first log entries and one or more other transactions associated with the one or more second log entries in parallel.

11. The network computer of claim 8, further comprising:

collecting one or more read operations for a new transaction based on one or more first inodes that are accessed without modification during the new transaction; and collecting one or more write operations for the new transaction based on one or more second inodes that are modified during the new transaction, wherein the one or more read operations and the one or more write operations are included in a log entry associated with the new transaction.

12. The network computer of claim 8, wherein collecting the one or more leaf log entries, further comprises:

obtaining an in-flight window that includes a bounded capacity for tracking one or more in-flight log entries pending communication to the target file system;

collecting one or more candidate log entries for communication to the target file system; and using the in-flight window to perform further actions, including:

collecting one or more dependency log entries associated with each candidate log entry; and adding the one or more candidate log entries to the in-flight window based on the capacity of the in-flight window accommodating the one or more candidate log entries and the one or more dependency log entries to avoid one or more deadlock conditions.

13. The network computer of claim 8, further comprising:

collecting a first group of the one or more log entries from a first dependency graph of the one or more dependency graphs;

collecting a second group of the one or more log entries from a second dependency graph of the one or more dependency graphs; and combining the first group of the one or more log entries and the second group of the one or more log entries into a same communication message, wherein the same communication message is communicated to the target file system.

14. The network computer of claim 8, further comprising:

updating one or more inodes associated with each log entry to include an associated key value based on storage of the log entry in the transaction log, wherein the associated key value is used to selectively collect one or more log entries associated with a particular inode.

15. A processor readable non-transitory storage media that includes instructions for managing data in a file system over a network, wherein execution of the instructions by one or more processors on one or more network computers performs actions, comprising:

obtaining a transaction log that includes a plurality of log entries, wherein each log entry is associated with a transaction that includes one or more file system operations, and wherein each log entry corresponds to an execution time and one or more inodes associated with its associated transaction;

collecting one or more dependency graphs based on one or more of the plurality of log entries, wherein each log entry in a dependency graph shares at least one inode with at least one adjacent log entry in the same dependency graph, and wherein a root log entry of each dependency graph is associated with latest execution time in the dependency graph based on a highest log entry key value among log entries included in the dependency graph;

collecting one or more leaf log entries based on one or more traversals of the one or more graphs, wherein a number of log entries are visited in each dependency graph until a traversal threshold is reached, and wherein a continuation key associated with a continuation log entry in each dependency graph is collected for a first unvisited log entry following visitation of one or more log entries during the continuing traversal of the dependency graph;

communicating the one or more leaf log entries to a target file system, wherein the target file system applies each communicated transaction associated with the communicated leaf log entries to execute each file system operation associated with each communicated transaction on the target file system; and obtaining a user interface that includes one or more display panels for content that includes a transaction log performance metrics and other information associated with the file system, wherein the content is dynamically transformed and arranged for display to a user based on one or more of user interaction telemetry, user feedback or a metric.

16. The processor readable non-transitory storage media of claim 15, wherein the traversal of the one or more dependency graphs, further comprises:

suspending the traversal at each continuation log entry; and resuming the traversal from each continuation log entry based on the continuation key, wherein the continuation key enables traversal of each dependency graph.

17. The processor readable non-transitory storage media of claim 15, further comprising:

collecting one or more first log entries from a first dependency graph of the one or more dependency graphs;

collecting one or more second log entries from a second dependency graph of the one or more dependency graphs, wherein the first dependency graph and the second dependency graph are independent based on an intersection of log entry keys in the first dependency graph and the second dependency graph being empty; and communicating the one or more first log entries and the one or more second log entries to the target file system in parallel, wherein the target file system applies one or more transactions associated with the one or more first log entries and one or more other transactions associated with the one or more second log entries in parallel.

18. The processor readable non-transitory storage media of claim 15, further comprising:

collecting one or more read operations for a new transaction based on one or more first inodes that are accessed without modification during the new transaction; and collecting one or more write operations for the new transaction based on one or more second inodes that are modified during the new transaction, wherein the one or more read operations and the one or more write operations are included in a log entry associated with the new transaction.

19. The processor readable non-transitory storage media of claim 15, wherein collecting the one or more leaf log entries, further comprises:

obtaining an in-flight window that includes a bounded capacity for tracking one or more in-flight log entries pending communication to the target file system;

collecting one or more candidate log entries for communication to the target file system; and using the in-flight window to perform further actions, including:

collecting one or more dependency log entries associated with each candidate log entry; and adding the one or more candidate log entries to the in-flight window based on the capacity of the in-flight window accommodating the one or more candidate log entries and the one or more dependency log entries to avoid one or more deadlock conditions.

20. The processor readable non-transitory storage media of claim 15, further comprising:

collecting a first group of the one or more log entries from a first dependency graph of the one or more dependency graphs;

collecting a second group of the one or more log entries from a second dependency graph of the one or more dependency graphs; and combining the first group of the one or more log entries and the second group of the one or more log entries into a same communication message, wherein the same communication message is communicated to the target file system.

\* \* \* \* \*